US012732842B2

(12) United States Patent
Chou et al.

(10) Patent No.: US 12,732,842 B2
(45) Date of Patent: Sep. 8, 2026

(54) PERFORMANCE MEASUREMENTS FOR NETWORK FUNCTIONS SUPPORTING EDGE COMPUTING AND SUBSCRIBER DATA MANAGEMENT

(71) Applicant: Intel Corporation, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 18/573,715

(22) PCT Filed: Oct. 18, 2022

(86) PCT No.: PCT/US2022/047004
§ 371 (c)(1),
(2) Date: Dec. 22, 2023

(87) PCT Pub. No.: WO2023/076074
PCT Pub. Date: May 4, 2023

(65) Prior Publication Data

US 2024/0292247 A1 Aug. 29, 2024

Related U.S. Application Data

(60) Provisional application No. 63/274,857, filed on Nov. 2, 2021, provisional application No. 63/274,422, filed on Nov. 1, 2021.

(51) Int. Cl.
*H04W 24/08* (2009.01)
*H04L 43/04* (2022.01)
(Continued)

(52) U.S. Cl.
CPC ............. *H04W 24/08* (2013.01); *H04L 43/04* (2013.01); *H04L 43/065* (2013.01); *H04W 8/18* (2013.01)

(58) Field of Classification Search
CPC ....... H04W 24/04; H04W 24/08; H04W 8/18; H04L 43/04; H04L 43/065; H04L 43/20;
(Continued)

(56) References Cited

U.S. PATENT DOCUMENTS 12,490,133 B2 * 12/2025 Gautam ................ H04W 24/08
2019/0253907 A1 * 8/2019 Yao ........................ H04W 24/02
(Continued)

FOREIGN PATENT DOCUMENTS

WO WO-2018022951 A2 * 2/2018 .......... G06F 11/3466
WO WO-2018200397 A1 * 11/2018 ........... G06F 9/5077
(Continued)

OTHER PUBLICATIONS

European Search Report for EP Application No. 22887947.4, dated Sep. 8, 2025, 13 pages.
(Continued)

*Primary Examiner* — Siu M Lee
(74) *Attorney, Agent, or Firm* — KDW FIRM PLLC

(57) ABSTRACT

Some embodiments are related to a fifth generation (5G) or sixth generation (6G) wireless communications system and network components to generate performance measurements for subscriber data and parameter provisioning in a unified data management system. Some embodiments are related to a wireless communications system and network components to generate data volume performance measurement for network functions supporting edge computing. Other embodiments are described and claimed.

20 Claims, 16 Drawing Sheets

(51) Int. Cl.
*H04L 43/065* (2022.01)
*H04W 8/18* (2009.01)

(58) Field of Classification Search
CPC ....... H04L 67/52; H04L 67/51; H04L 67/289; H04L 67/125; H04L 67/306
See application file for complete search history.

(56) References Cited

U.S. PATENT DOCUMENTS

| | | | | |
|---|---|---|---|---|
| 2020/0107213 | A1* | 4/2020 | Park | H04L 12/1407 |
| 2021/0160147 | A1* | 5/2021 | Chou | H04L 41/147 |
| 2021/0168643 | A1* | 6/2021 | Yao | H04M 15/66 |
| 2022/0086698 | A1* | 3/2022 | Yao | H04W 28/0268 |
| 2025/0184831 | A1* | 6/2025 | Youn | H04W 28/0268 |

FOREIGN PATENT DOCUMENTS

| | | | | |
|---|---|---|---|---|
| WO | WO-2020033697 | A1 * | 2/2020 | H04W 24/08 |
| WO | 2020146376 | A1 | 7/2020 | |
| WO | 2022232038 | A1 | 11/2022 | |
| WO | 2023076074 | A1 | 5/2023 | |

OTHER PUBLICATIONS

3GPP, "5G; Management and orchestration; 5G performance measurements(3GPP TS 128.552 version 16.6.0 Release 16), vol. 3GPP SA, No. V16.6.0 Aug. 6, 2020 (Aug. 6, 2020), pp. 1-196,XP014379609".

Intel: "Add measurements related to subscriber data management forUDM, 3GPP Draft; S5-216354, 3rd Generation Partnership Project(3GPP), Mobile Competence Centre; 650, Route Deslucioles ; F-06921 Sophia-Antipolis Cedex, vol. SA WG5, No. E-meeting; Nov. 15, 2021-Nov. 24, 2021, Nov. 5, 2021 (Nov. 5, 2021), XP052077266, 7 pages".

Intel, "3GPP; TSG SA; Management and orchestration; Study on enhancements of edge computing management, (Release 17)," 3GPP TR 28.814 V17.0.0, dated Sep. 24, 2021, pp. 1-46 and Table 7.9.1-1.

Intel, "pCR 28.814 EAS performance assurance solution," S5-211514, 3GPP TSG-SA5 Meeting #135-e, dated Feb. 9, 2021, 1-4 pages.

Huawei et al., "Add QoS flow related performance measurements," S5-191388, 3GPP TSG-SA5 Meeting #123, Montreal Canada, dated Jan. 25, 2019, 1-5 pages.

Intel, "Add NF performance measurements related to VR, S5-187460, 3GPP TSG-SA5 Meeting #122," Spokane US, Nov. 16, 2018, 1-5 pages.

International Search Report and Written Opinion for International Application No. PCT/US2022/047004, mailed on Jan. 31, 2023, 11 pages.

* cited by examiner

OBTAIN RAW MEASUREMENTS OF NETWORK FUNCTIONS COMMUNICATIVELY COUPLED TO ONE ANOTHER VIA SERVICE BASED INTERFACES IN A 5G CORE (5GC) OF THE 5GS, WHEREIN ONE OF THE NETWORK FUNCTIONS IS A UNIFIED DATA MANAGEMENT (UDM) 702

GENERATE PERFORMANCE MEASUREMENTS CORRESPONDING TO ONE OR MORE NETWORK FUNCTIONS BASED ON THE RAW MEASUREMENTS, WHEREIN THE PERFORMANCE MEASUREMENTS ARE SUBSCRIBER DATA MANAGEMENT RELATED MEASUREMENTS 704

REPORT THE SUBSCRIBER DATA MANAGEMENT RELATED MEASUREMENTS TO A SERVICE CONSUMER 706

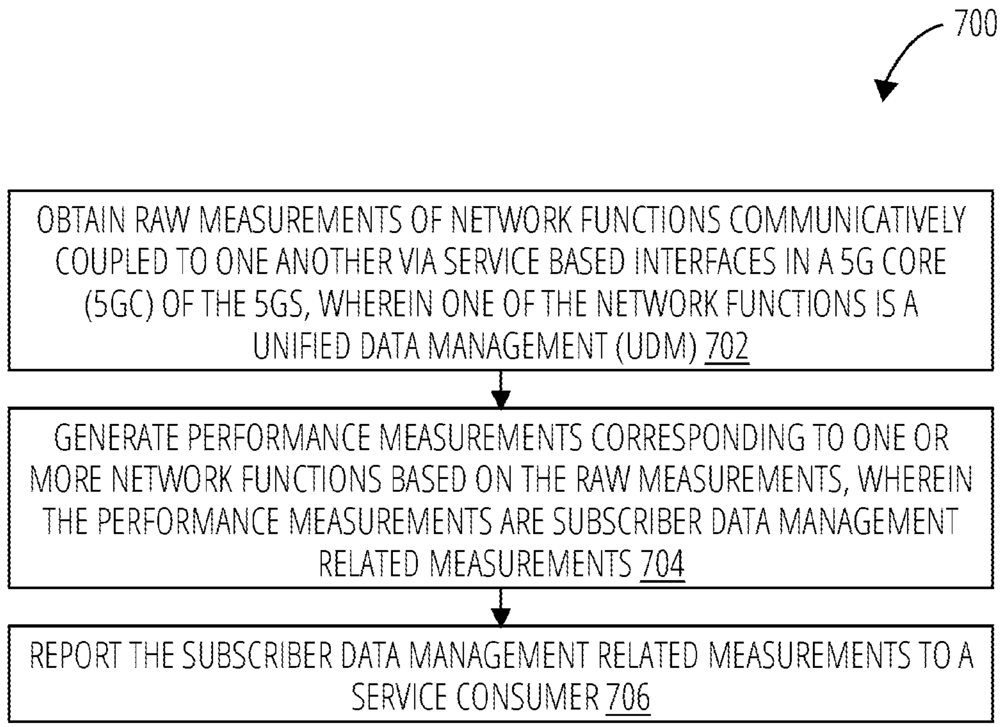

FIG. 7

OBTAIN RAW MEASUREMENTS OF NETWORK FUNCTIONS COMMUNICATIVELY COUPLED TO ONE ANOTHER VIA SERVICE BASED INTERFACES IN A 5G CORE (5GC) OF THE 5GS, WHEREIN ONE OF THE NETWORK FUNCTIONS IS A VIRTUALIZED NETWORK FUNCTION WITH A VIRTUALIZED RESOURCE (VR) TO SUPPORT EDGE COMPUTING 1002

GENERATE PERFORMANCE MEASUREMENTS CORRESPONDING TO ONE OR MORE NETWORK FUNCTIONS BASED ON THE RAW MEASUREMENTS, WHEREIN THE PERFORMANCE MEASUREMENTS ARE RELATED TO VR USAGE RELATED MEASUREMENTS FOR THE VIRTUALIZED NETWORK FUNCTION 1004

REPORT THE VR USAGE RELATED MEASUREMENTS TO A SERVICE CONSUMER 1006

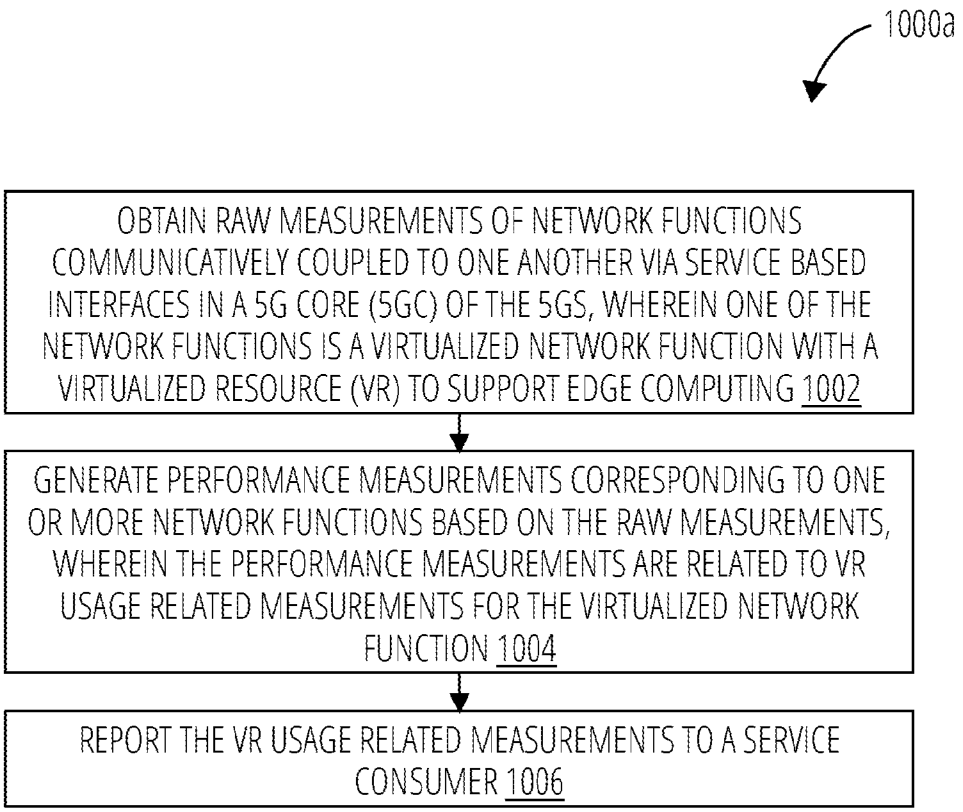

FIG. 10A

OBTAIN RAW MEASUREMENTS OF NETWORK FUNCTIONS COMMUNICATIVELY COUPLED TO ONE ANOTHER VIA SERVICE BASED INTERFACES IN A 5G CORE (5GC) OF THE 5GS, WHEREIN ONE OF THE NETWORK FUNCTIONS IS PERFORMED BY AN EDGE APPLICATION SERVER (EAS) IN AN EDGE DATA NETWORK 1008

GENERATE PERFORMANCE MEASUREMENTS CORRESPONDING TO ONE OR MORE NETWORK FUNCTIONS BASED ON THE RAW MEASUREMENTS, WHEREIN THE PERFORMANCE MEASUREMENTS ARE RELATED TO CONNECTION DATA VOLUME RELATED MEASUREMENTS FOR THE NETWORK FUNCTION PERFORMED BY THE EAS 1010

REPORT THE CONNECTION DATA VOLUME RELATED MEASUREMENTS TO A SERVICE CONSUMER 1012

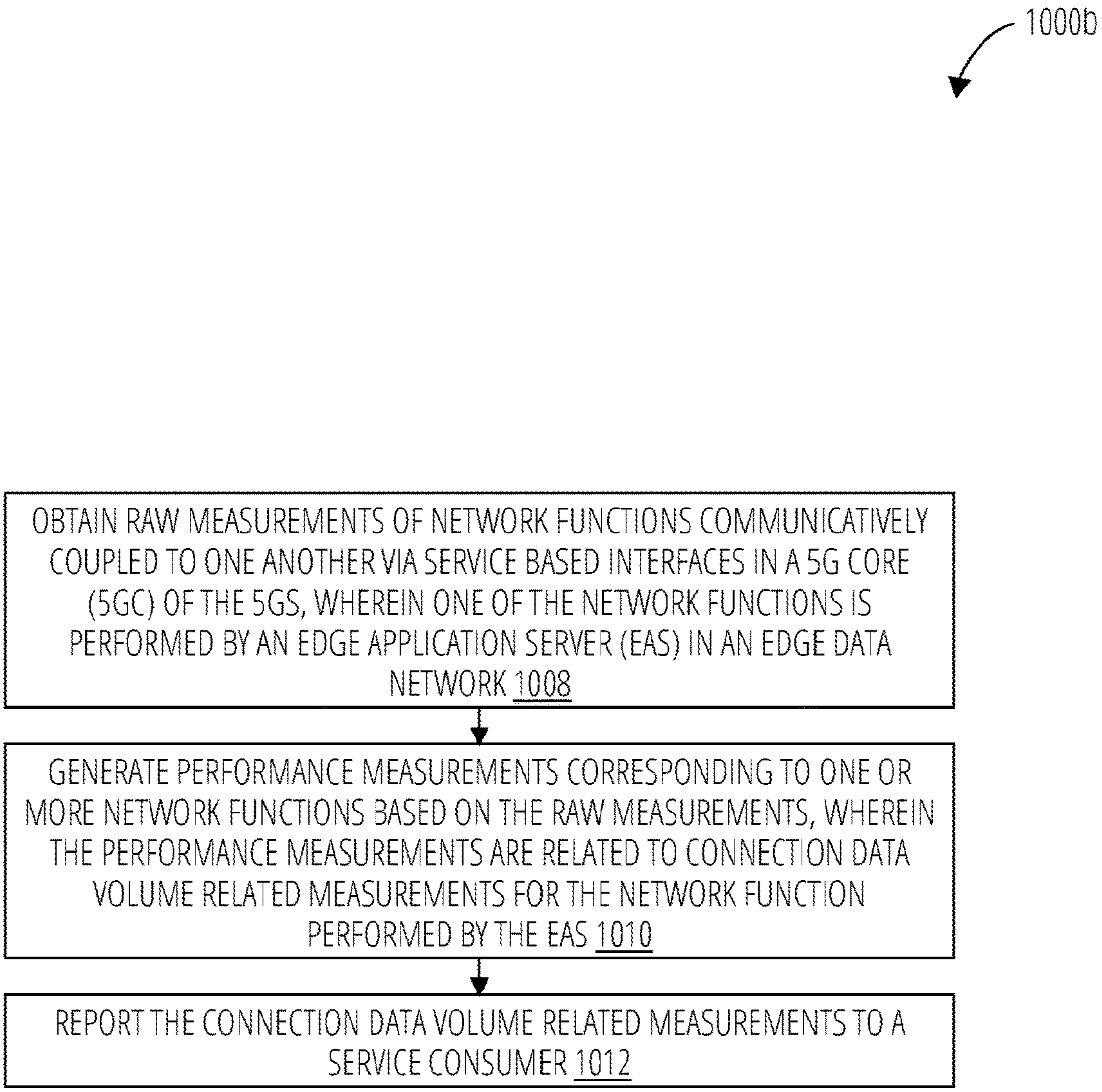

FIG. 10B

PERFORMANCE MEASUREMENTS FOR NETWORK FUNCTIONS SUPPORTING EDGE COMPUTING AND SUBSCRIBER DATA MANAGEMENT

CROSS-REFERENCE TO RELATED APPLICATIONS

This application claims the benefit of U.S. Provisional Application No. 63/274,857 filed Nov. 2, 2021, entitled "DATA VOLUME PERFORMANCE MEASUREMENTS FOR NETWORK FUNCTIONS SUPPORTING EDGE COMPUTING", and U.S. Provisional Application No. 63/247,422 filed Nov. 1, 2021, entitled "PERFORMANCE MEASUREMENTS FOR SUBSCRIBER DATA AND PARAMETER PROVISIONING IN UNIFIED DATA MANAGEMENT (UDM)", the contents of both which are herein incorporated by reference in their entireties.

BACKGROUND 5G networks and network slicing are designed to support enhanced Mobile Broadband (eMBB), Ultra-Reliable Low Latency communication (URLLC), and mobile Internet of Things (mIoT) services. Some services have ultra-low latency, high data capacity, and strict reliability requirements where faults or performance issues in the networks can cause service failure. Therefore, collection of real-time performance data or performance measurements that can be used by analytic applications (e.g., network optimization, Self-Organizing Network (SON), etc.) to detect the potential issues in advance, and take appropriate actions to prevent or mitigate the issues. Also, the performance data may be able to be consumed by multiple analytic applications with specific purposes. The 5G services (e.g., eMBB, URLLC, mIoT, and/or other like services) may have requirements for end-to end (e2e) performance of the 5G networks. Therefore, e2e performance measurements need to be defined for 5G networks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a first logic flow in accordance with one embodiment.

FIG. 10A illustrates a second logic flow in accordance with one embodiment.

FIG. 10B illustrates a third logic flow in accordance with one embodiment.

DETAILED DESCRIPTION

Figure 1:
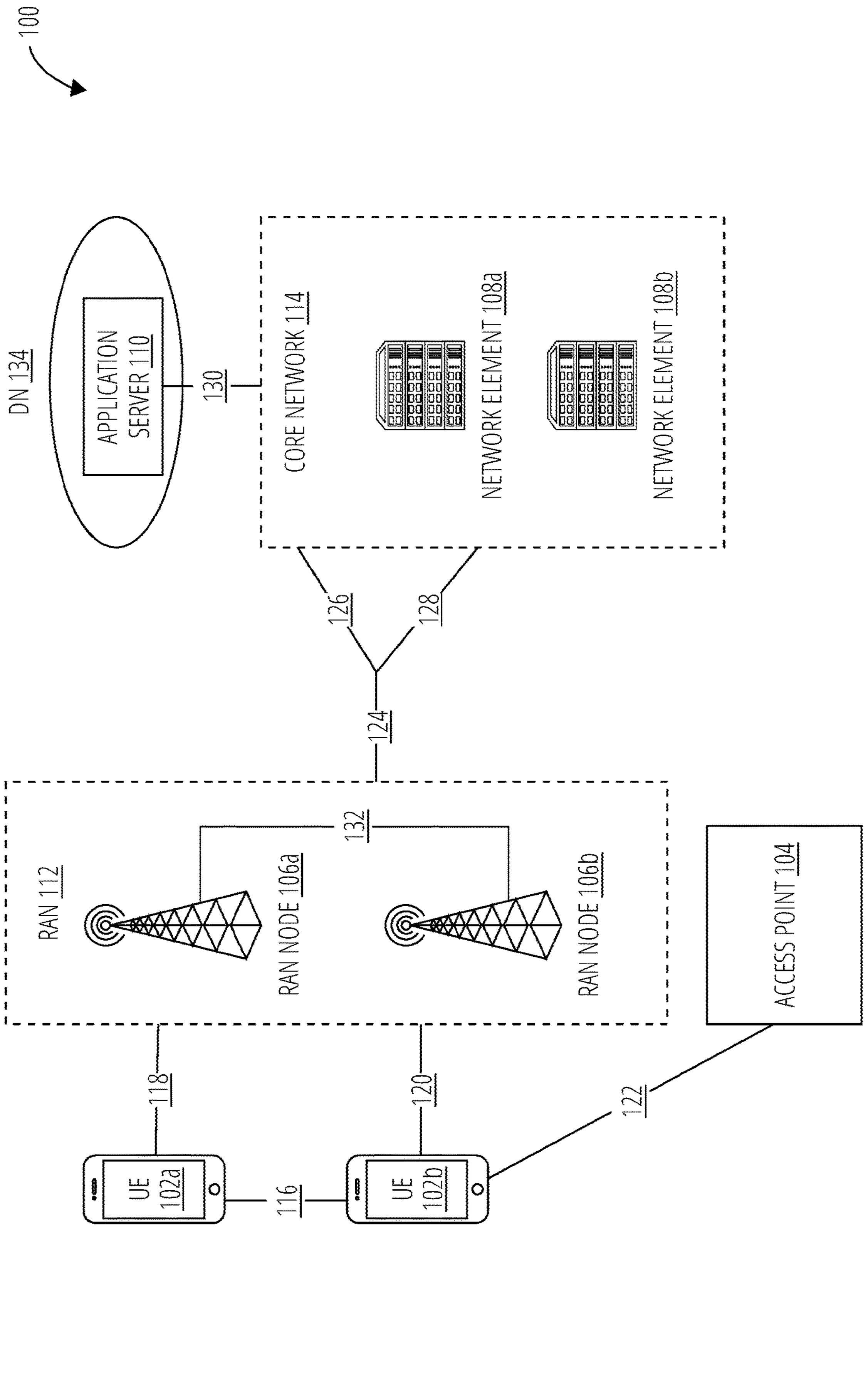
FIG. 1 illustrates a block diagram of network function components (NFs) and interfaces in connection with embodiments/aspects described herein.

The present disclosure generally relates to wireless technology, and more specifically to performance measurements for Fifth Generation (5G) System or Services (5GS) and 5G Core Network (5GC) network functions (NFs), as well as Sixth Generation (6G) System or Services (6GS) and 6G Core Network (6GC) NFs. Various embodiments specify performance measurements for 5G networks including network slicing. Some embodiments specify performance measurements for next-generation (NG) radio access network (NG-RAN). For example, the performance measurements may be related to subscription data managed in a unified data management (UDM) system and provided to various consumer network functions in 5GS. The performance measurements as described herein may be defined in accordance with the Third Generation Partnership Project (3GPP) technical standard (TS) 28.552 titled "Technical Specification Group Services and System Aspects; Management and orchestration; 5G performance measurements," version 17.7.1 (2022-06), including any progeny, revisions and variants, among other 3GPP and non-3GPP wireless standards. The performance measurements may be defined in clause 5.2 to 5.7 of the 3GPP TS 28.552. Related key performance indicators (KPIs) are defined to those measurements are defined in 3GPP TS 28.554. The performance measurements are defined based on the measurement template as described in 3GPP TS 32.404.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Modern 5G and 6G networks and network slicing are designed to support Enhanced Mobile Broadband (eMBB), Ultra-Reliable Low Latency Communications (URLLC), and Massive Internet of Things (mIoT) services. Some services have ultra-low latency, high data capacity, and strict reliability requirements where faults or performance issues in the networks can cause service failure. Therefore, collection of real-time performance data and/or performance measurements that can be used by analytic applications (e.g., network optimization, self-organizing networks (SON)s, etc.) to detect the potential issues in advance, and take appropriate actions to prevent or mitigate the issues. Also, the performance data can be able to be consumed by multiple analytic applications with specific purposes. The 5G services (e.g., eMBB, URLLC, mIoT, or other like services) can have requirements for end-to-end (e2e) performance of the 5G networks. Therefore, e2e performance measurements have a need to be defined for 5G networks, especially in alignment with one or more of the third generation partnership project (3GPP) technical standards (TS), such as 3GPP TS 32.404: "Performance Management (PM); Performance measurements-Definitions and template," v. 16.0.0, 2020-07-15; 3GPP TS 23.501: "System Architecture for the 5G System," v. 17.2.0, 2021-06-24; 3GPP TS 23.502: "Procedures for the 5G System," v. 17.2.1, 2020-09-29; and 3GPP TS 29.503: "5G System; Unified Data Management Services; Stage 3," v. 17.4.0, 2021-09-17; including any progeny, revisions or variants. Other relevant 3GPP standards include TS 23.501, TS 28.550, or TS 28.552. Embodiments are not limited in this context.

In particular, performance measurements for 5G subscriber data and parameter provisioning in a unified data management (UDM) system as well as performance measurements for 5G or 6G NFs (including 5GC or 6GC) can need to be collected according to defined use cases and requirements so that the performance of the 5G or 6G UDM and NFs (including 5GC or 6G UDM and NFs) can be monitored. Examples of a 5G UDM and NFs are shown by FIG. 1, which demonstrate examples of wireless communications system 100.

As specified in 3GPP TS 28.552, performance indicators are the performance data aggregated over a group of NFs, such as, for example, average latency along the network slice. The performance indicators can be derived from the performance measurements collected at the NFs that belong to the group. The aggregation method is identified in the performance indicator definition.

Performance indicators at the network slice subnet level can be derived from the performance measurements collected at the NFs that belong to the network slice subnets or to the constituent network slice subnets. The performance indicators at the network slice subnet level can be made available via the corresponding performance management service for network slice subnet.

The performance indicators at the network slice level, can be derived from the network slice subnet level performance indicators collected at the constituent network slice subnets and/or NFs. The network slice level performance indicators can be made available via the corresponding performance management service for network slice.

When providing a communication service to a tenant, the performance indicators can be derived from corresponding performance indicators related to network slice, network slice subnet and NFs and they can be made available via the corresponding performance management service, consumed by a tenant. Tenant(s) may be associated with a Single Network Slice Selection Assistance Information (S-NSSAI) or sNSSAIList in which case, the performance indicators are split into sub-counters per S-NSSAI for individual tenant.

In some embodiments, subscription data is managed in a UDM system, and provided to other consumer NFs, such as Access and Mobility Function (AMF), a Session Management Function (SMF), a short message service function (SMSF), a User Plane Function (UPF), a Policy Control Function (PCF), a Network Exposure Function (NEF), a Network Function Repository Function (NRF), a 5G Direct Discovery Name Management Function (DDNMF), a Service Communication Proxy (SCP), or other 5GC NFs in a 5GS or 5GC to provide network services to the users. The subscriber data management in a UDM system allows some consumer NFs to get the subscriber data, and some consumer NFs to subscribe to the notifications of the updates of the subscriber data. Therefore, it is important to monitor the performance of the subscriber data management.

A UDM system allows provisioning by a consumer NF, such as a network exposure function (NEF), of information which can be used for user equipment (UE) in 5GS, such as expected UE behavior (regarding UE movement or communication characteristics) and service specific parameters, or the 5G Virtual Network (VN) group information to 5G network functions. The third generation partnership project (3GPP) provides examples in 3GPP TS 23.501 titled "System Architecture for the 5G System," v. 17.2.0, 2021-06-24.

However, failed parameter provisioning could potentially impact the UE behavior or service fulfillment. Therefore, there is a need to monitor the performance of parameter provisioning. Embodiments of the present disclosure address these and other issues.

Similarly, performance measurements can be collected according to defined use cases and requirements so that the performance of 5G or 6G deploying edge networks (including 5GC or 6G NFs) can be monitored as well.

Some embodiments of the present disclosure are directed to generating measurements related to performance measurements for subscriber data and parameter provisioning in unified data managed (UDM). Other embodiments of the present disclosure are directed to generating measurements related to perform measurements for data volume performance measurements for network functions supporting edge computing. The measurements related to subscriber data management and parameter provisioning, and edge networking and parameter provisioning, are data reflecting the performance of the 5GS, and generation of such data by embodiments of the present disclosure helps improve the functionality of wireless networks. A service producer collects the raw performance measurements from NFs, and then generates the performance measurements for NFs for its consumers. In some embodiments, the NF is or includes a UDM or an edge network NF, and the service producer may be implemented within the NF or in a separate management system.

FIG. 1 illustrates an example of a wireless communication wireless communications system 100. For purposes of convenience and without limitation, the example wireless communications system 100 is described in the context of the long-term evolution (LTE) and fifth generation (5G) new radio (NR) (5G NR) cellular networks communication standards as defined by one or more 3GPP technical specifications (TSs) and/or technical reports (TRs). However, other types of wireless standards are possible.

The wireless communications system 100 includes UE 102*a* and UE 102*b* (collectively referred to as the "UEs 102"). In this example, the UEs 102 are illustrated as smartphones (e.g., handheld touchscreen mobile computing devices connectable to one or more cellular networks). In other examples, any of the UEs 102 can include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some implementations, any of the UEs 102 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which can include uniquely identifiable embedded computing devices (within the Internet infrastructure), with short-lived connections. The IoT UEs may execute background applications (e.g., keep-alive messages or status updates) to facilitate the connections of the IoT network.

The UEs 102 are configured to connect (e.g., communicatively couple) with a radio access network (RAN) 112. In some implementations, the RAN 112 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 112 that operates in a 5G NR wireless communications system 100, and the term "E-UTRAN" may refer to a RAN 112 that operates in an LTE or 4G wireless communications system 100.

To connect to the RAN 112, the UEs 102 utilize connections (or channels) 118 and 120, respectively, each of which can include a physical communications interface or layer, as described below. In this example, the connections 118 and 120 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols.

The UE 102*b* is shown to be configured to access an access point (AP) 104 (also referred to as "WLAN node 104," "WLAN 104," "WLAN Termination 104," "WT 104" or the like) using a connection 122. The connection 122 can include a local wireless connection, such as a connection consistent with any IEEE 1402.11 protocol, in which the AP 104 would include a wireless fidelity (Wi-Fi) router. In this example, the AP 104 is shown to be connected to the Internet without connecting to the core network of the wireless system, as described in further detail below.

The RAN 112 can include one or more nodes such as RAN nodes 106*a* and 106*b* (collectively referred to as "RAN nodes 106" or "RAN node 106") that enable the connections 118 and 120. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 106 that operates in an 5G NR wireless communications system 100 (for example, a gNB), and the term "E-UTRAN node" may refer to a RAN node 106 that operates in an LTE or 4G wireless communications system 100 (e.g., an eNB). In some implementations, the RAN nodes 106 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some implementations, some or all of the RAN nodes 106 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 106; a medium access control (MAC)/physical layer (PHY) split in which RRC, PDCP, MAC, and radio link control (RLC) layers are operated by the CRAN/vBBUP and the PHY layer is operated by individual RAN nodes 106; or a "lower PHY" split in which RRC, PDCP, RLC, and MAC layers and upper portions of the PHY layer are operated by the CRAN/vBBUP and lower portions of the PHY layer are operated by individual RAN nodes 106. This virtualized framework allows the freed-up processor cores of the RAN nodes 106 to perform, for example, other virtualized applications. In some implementations, an individual RAN node 106 may represent individual gNB distributed units (DUs) that are connected to a gNB central unit (CU) using individual F1 interfaces (not shown in FIG. 1). In some implementations, the gNB-DUs can include one or more remote radio heads or RFEMs, and the gNB-CU may be operated by a server that is located in the RAN 112 (not shown) or by a server pool in a similar manner as the CRAN/vBBUP. Additionally or alternatively, one or more of the RAN nodes 106 may be next generation eNBs (ng-eNBs), including RAN nodes that provide E-UTRA user plane and control plane protocol terminations toward the UEs 102, and are connected to a 5G core network (e.g., core network 114) using a next generation interface.

In vehicle-to-everything (V2X) scenarios, one or more of the RAN nodes 106 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some implementations, an RSU is a computing device coupled with radio frequency circuitry located on a roadside that provides connectivity support to passing vehicle UEs 102 (vUEs 102). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and can include a network interface controller to provide a wired connection (e.g., Ethernet) to a traffic signal controller or a backhaul network, or both.

Any of the RAN nodes 106 can terminate the air interface protocol and can be the first point of contact for the UEs 102. In some implementations, any of the RAN nodes 106 can fulfill various logical functions for the RAN 112 including, but not limited to, radio network controller (RNC) functions such as radio bearer management, uplink and downlink dynamic radio resource management and data packet scheduling, and mobility management.

In some implementations, the UEs 102 can be configured to communicate using orthogonal frequency division multiplexing (OFDM) communication signals with each other or with any of the RAN nodes 106 over a multicarrier communication channel in accordance with various communication techniques, such as, but not limited to, OFDMA communication techniques (e.g., for downlink communications) or SC-FDMA communication techniques (e.g., for uplink communications), although the scope of the techniques described here not limited in this respect. The OFDM signals can comprise a plurality of orthogonal subcarriers.

The RAN nodes 106 can transmit to the UEs 102 over various channels. Various examples of downlink communication channels include Physical Broadcast Channel (PBCH), Physical Downlink Control Channel (PDCCH), and Physical Downlink Shared Channel (PDSCH). Other types of downlink channels are possible. The UEs 102 can transmit to the RAN nodes 106 over various channels. Various examples of uplink communication channels include Physical Uplink Shared Channel (PUSCH), Physical Uplink Control Channel (PUCCH), and Physical Random Access Channel (PRACH). Other types of uplink channels are possible.

In some implementations, a downlink resource grid can be used for downlink transmissions from any of the RAN nodes 106 to the UEs 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements;

in the frequency domain, this may represent the smallest quantity of resources that currently can be allocated. There are several different physical downlink channels that are conveyed using such resource blocks.

The PDSCH carries user data and higher-layer signaling to the UEs 102. The PDCCH carries information about the transport format and resource allocations related to the PDSCH channel, among other things. It may also inform the UEs 102 about the transport format, resource allocation, and hybrid automatic repeat request (HARQ) information related to the uplink shared channel. Downlink scheduling (e.g., assigning control and shared channel resource blocks to the UE 102*b* within a cell) may be performed at any of the RAN nodes 106 based on channel quality information fed back from any of the UEs 102. The downlink resource assignment information may be sent on the PDCCH used for (e.g., assigned to) each of the UEs 102.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some implementations, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs.

The RAN nodes 106 are configured to communicate with one another using an interface 132. In examples, such as where the wireless communications system 100 is an LTE system (e.g., when the core network 114 is an evolved packet core (EPC) network), the interface 132 may be an X2 interface 132. The X2 interface may be defined between two or more RAN nodes 106 (e.g., two or more eNBs and the like) that connect to the EPC 114, or between two eNBs connecting to EPC 114, or both. In some implementations, the X2 interface can include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 102 from a secondary eNB for user data; information of PDCP PDUs that were not delivered to a UE 102; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

In some implementations, such as where the wireless communications system 100 is a 5G NR system (e.g., when the core network 114 is a 5G core network), the interface 132 may be an Xn interface 132. The Xn interface may be defined between two or more RAN nodes 106 (e.g., two or more gNBs and the like) that connect to the 5G core network 114, between a RAN node 106 (e.g., a gNB) connecting to the 5G core network 114 and an eNB, or between two eNBs connecting to the 5G core network 114, or combinations of them. In some implementations, the Xn interface can include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 102 in a connected mode (e.g., CM-CONNECTED) including functionality to manage the UE mobility for connected mode between one or more RAN nodes 106, among other functionality. The mobility support can include context transfer from an old (source) serving RAN node 106 to new (target) serving RAN node 106, and control of user plane tunnels between old (source) serving RAN node 106 to new (target) serving RAN node 106. A protocol stack of the Xn-U can include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack can include an application layer signaling protocol (referred to as Xn Application Protocol (Xn-AP or XnAP)) and a transport network layer (TNL) that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 112 is shown to be communicatively coupled to a core network 114 (referred to as a "CN 114"). The CN 114 includes multiple network elements and/or network functions (NFs), such as network element 108*a* and network element 108*b* (collectively referred to as the "network elements 108"), which are configured to offer various data and telecommunications services to customers/subscribers (e.g., users of UEs 102) who are connected to the CN 114 using the RAN 112. The components of the CN 114 may be implemented in one physical node or separate physical nodes and can include components to read and execute instructions from a machine-readable or computer-readable medium (e.g., a non-transitory machine-readable storage medium). In some implementations, network functions virtualization (NFV) may be used to virtualize some or all of the network node functions described here using executable instructions stored in one or more computer-readable storage mediums, as described in further detail below. A logical instantiation of the CN 114 may be referred to as a network slice, and a logical instantiation of a portion of the CN 114 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

In some implementations, the CN 114 may be a 5G core network (referred to as "5GC 114" or "5G core network 114"), and the RAN 112 may be connected with the CN 114 using a next generation interface 124. In some implementations, the next generation interface 124 may be split into two parts, a next generation user plane (NG-U) interface 114, which carries traffic data between the RAN nodes 106 and a user plane function (UPF), and the S1 control plane (NG-C) interface 126, which is a signaling interface between the RAN nodes 106 and access and mobility management functions (AMFs). Examples where the CN 114 is a 5G core network are discussed in more detail with regard to later figures.

In some implementations, the CN 114 may be an evolved packet core (EPC) (referred to as "EPC 114" or the like), and the RAN 112 may be connected with the CN 114 using an S1 interface 124. In some implementations, the S1 interface 124 may be split into two parts, an S1 user plane (S1-U) interface 128, which carries traffic data between the RAN nodes 106 and the serving gateway (S-GW), and the S1-MME interface 126, which is a signaling interface between the RAN nodes 106 and mobility management entities (MMEs).

The CN 114 may include MME, SGW, SGSN, HSS, PGW, PCRF, and/or other NFs coupled with one another over various interfaces (or "reference points") (not shown). The CN 114 may be a 5GC including an AUSF, AMF, SMF, UPF, NSSF, NEF, NRF, PCF, UDM, AF, and/or other NFs coupled with one another over various service-based interfaces and/or reference points. The 5GC may enable edge computing by selecting operator/3rd party services to be geographically close to a point that the UE 102 is attached to the network. This may reduce latency and load on the network. In edge computing implementations, the 5GC may select a UPF close to the UE 102 and execute traffic steering from the UPF to a data network (DN) 134 via an N6 interface. This may be based on the UE subscription data, UE location, and information provided by the AF, which allows the AF to influence UPF (re)selection and traffic routing.

The DN 134 may represent various network operator services, Internet access, or third party services that may be provided by one or more servers including, for example, the application server 110. The application server 110 may be an element offering applications that use IP bearer resources with the core network (e.g., UMTS packet services (PS) domain, LTE PS data services, among others). The application server 110 can also be configured to support one or more communication services (e.g., VOIP sessions, PTT sessions, group communication sessions, social networking services, among others) for the UEs 102 using the CN 114. The application server 110 can use an IP communications interface 130 to communicate with one or more network elements 108*a*.

The DN 134 may be an operator external public, a private PDN, or an intra-operator packet data network, for example, for provision of IMS services. In this embodiment, the application server 110 can be coupled to an IMS via an S-CSCF or the I-CSCF. In some implementations, the DN 134 may represent one or more local area DNs (LADNs), which are DNs (or DN names (DNNs)) that is/are accessible by a UE 102 in one or more specific areas. Outside of these specific areas, the UE 102 is not able to access the LADN/DN.

Additionally or alternatively, the DN 134 may be an Edge DN 134, which is a (local) Data Network that supports the architecture for enabling edge applications. In these embodiments, the application server 110 may represent the physical hardware systems/devices providing app server functionality and/or the application software resident in the cloud or at an edge compute node that performs server function(s). In some embodiments, the application server 110 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 112. For example, the edge compute nodes can provide a connection between the RAN 112 and UPF in the 5GC. The edge compute nodes can use one or more NFV instances instantiated on virtualization infrastructure within the edge compute nodes to process wireless connections to and from the RAN 112 and a UPF.

Figure 2A:
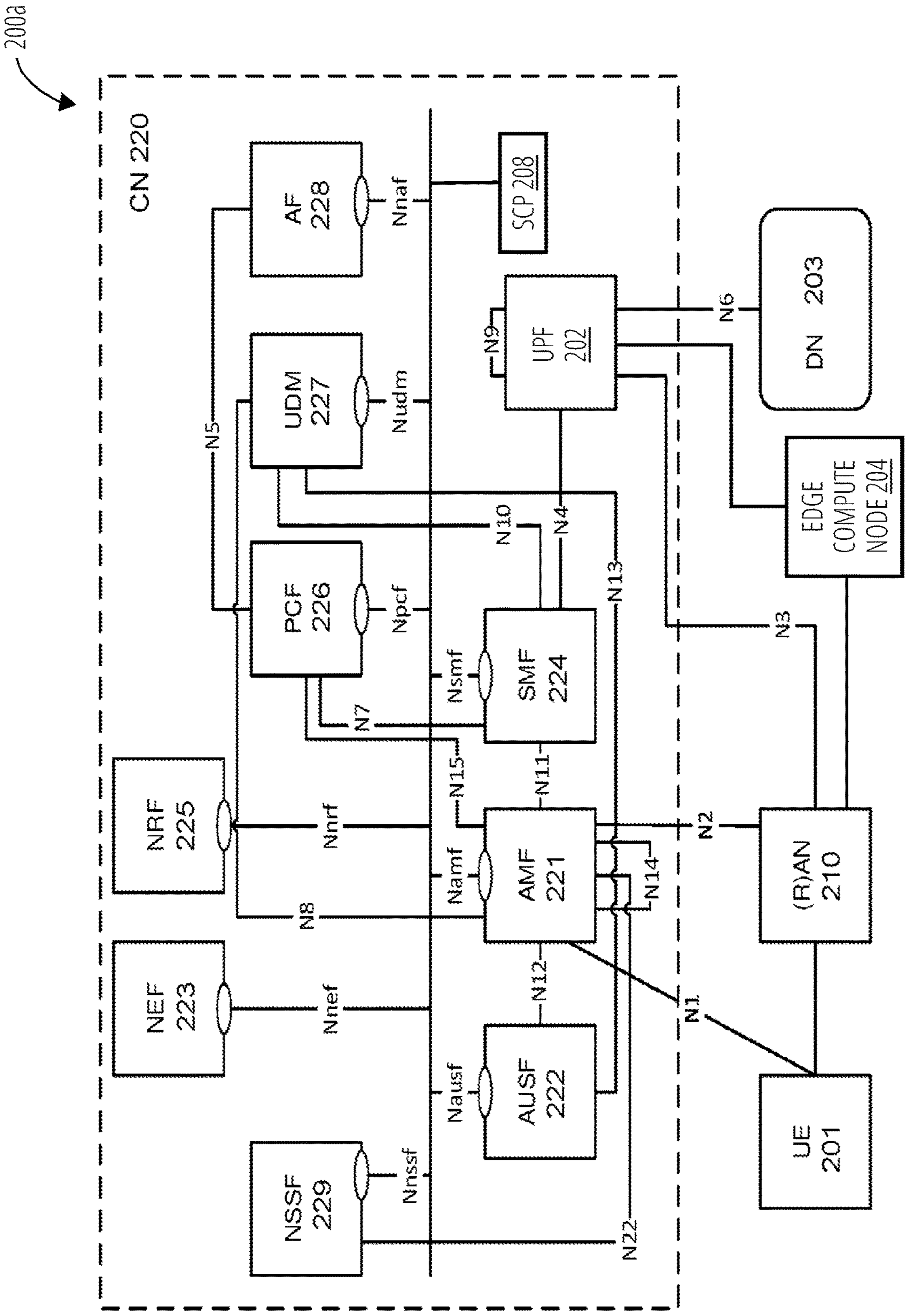
FIG. 2A is another block diagram illustrating another example of network function components (NFs) and interfaces that can be employed in accordance with various aspects described herein.
Figure 2B:
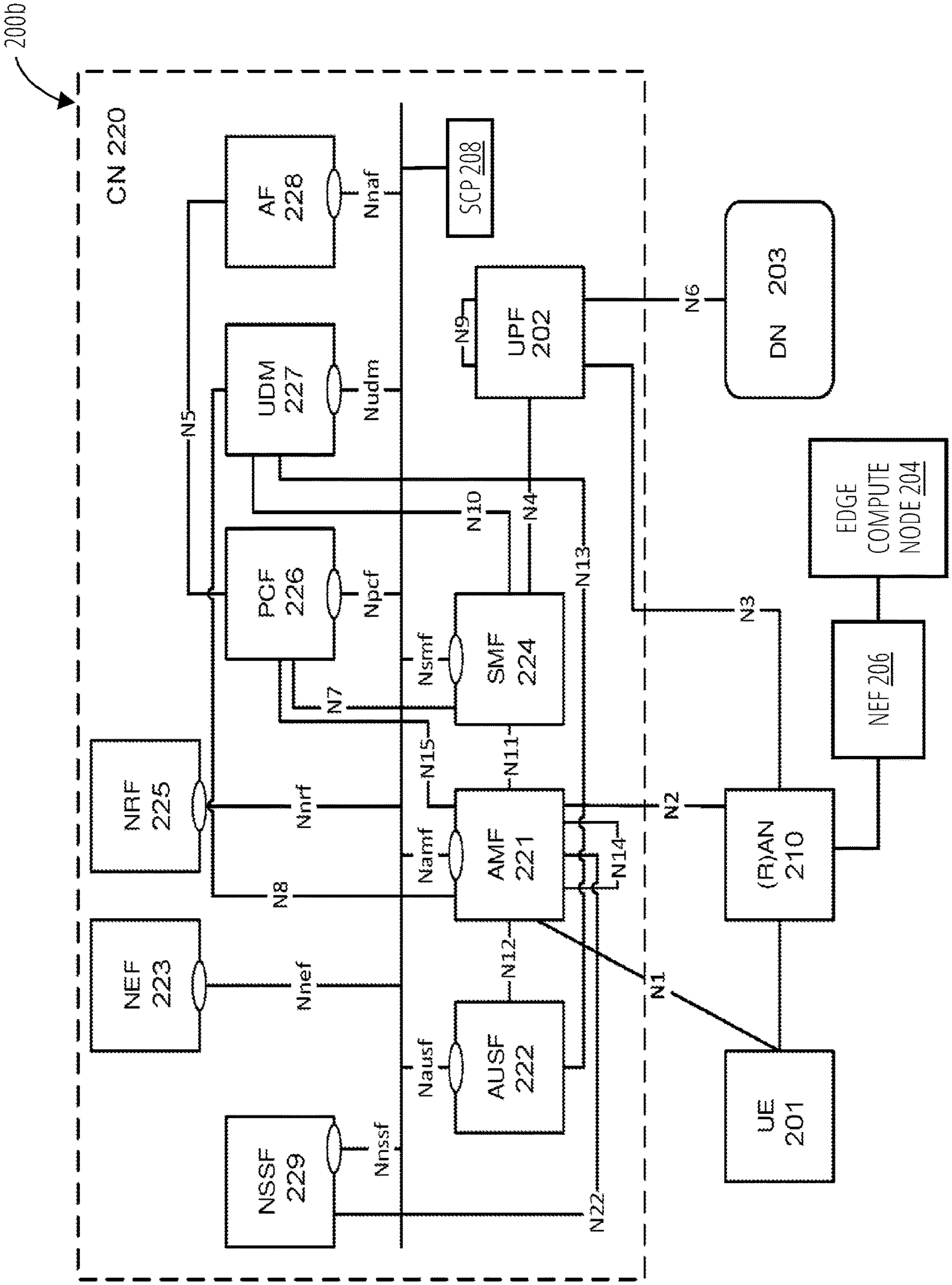
FIG. 2B illustrates an aspect of the subject matter in accordance with one embodiment.

FIG. 2A and FIG. 2B illustrate a network architectures 200*a* and a network architecture 200*b*, respectively. FIGS. 2A, 2B illustrate block diagrams of NF components (NFs) and interfaces in connection with embodiments/aspects described herein. In the 5G network architecture of FIGS. 2A, 2B, a next generation (NG) radio access network (RAN) (NG-RAN) comprises a functional split feature that splits a gNodeB (gNB) (also referred to as an "NG RAN," "NG RAN node," or the like) into a gNB-Centralized Unit (CU) (gNB-CU) that implements the upper layer of gNB function and gNB-Distributed Unit (DU) (gNB-DU) that implements the lower layer gNB function. The 5G core NFs and gNB-CU can be implemented as Virtualized Network Functions (VNFs), and the gNB-CU and/or gNB-DU can be implemented as Physical Network Function(s) (PNF(s). An Operator can create a virtualized 5G networks by using the European Telecommunications Standards Institute (ETSI) network functions virtualization (NFV) lifecycle management function to instantiate a Network Service (NS) in the cloud that includes various VNFs (e.g., 5G core NFs, gNB-CU), PNFs (e.g. gNB-DU), and VNF Forwarding Graph(s) (VNFFG(s)).

FIG. 2A illustrates an architecture of a network architecture 200*a* including a second CN 220 in accordance with various embodiments. The network architecture 200*a* is similar to the wireless communication system 100, and may illustrate equipment, devices and network elements similar to those described with reference to the wireless communication system 100. As depicted in FIG. 2A, the network architecture 200*a* includes a user equipment (UE) 201, a radio access network (R)AN 210 or access node (AN); and a data network (DN) 203, which can all be the same or similar to similarly named elements as discussed herein. The DN 203 is the same or similar to the DN 134, and it can implement, for example, operator services, Internet access or 3rd party services, as discussed further below. The CN 220 may be implemented as a 5GC 220, and it can include an Authentication Server Function (AUSF) 222; an AMF 221; a SMF 224; a NEF 223; a PCF 226; a NRF 225; a Unified Data Management (UDM) 227; an application function (AF) 228; a SCP 208; a user plane function (UPF) 202; and a NSSF 229, each with respective components for processing corresponding 5GC network functions (NFs).

The UPF 202 can act as an anchor point for intra-RAT and inter-RAT mobility, an external protocol data unit (PDU) session point of interconnect to DN 203, and a branching point to support multi-homed PDU session. The UPF 202 can also perform packet routing and forwarding, perform packet inspection, enforce the user plane part of policy rules, lawfully intercept packets (UP collection), perform traffic usage reporting, perform QoS handling for a user plane (e.g., packet filtering, gating, uplink (UL)/downlink (DL) rate enforcement), perform Uplink Traffic verification (e.g., Service Data Flow (SDF) to Quality of Service (QOS) flow mapping), transport level packet marking in the uplink and downlink, and perform downlink packet buffering and downlink data notification triggering. UPF 202 can include an uplink classifier to support routing traffic flows to a data network. The DN 203 can represent various network operator services, Internet access, or third party services. DN 203 can include, or be similar to, application server XQ30 discussed previously. The UPF 202 can interact with the SMF 224 via an N4 reference point between the SMF 224 and the UPF 202.

The AUSF 222 can store data for authentication of UE 201 and handle authentication-related functionality. The AUSF 222 can facilitate a common authentication framework for various access types. The AUSF 222 can communicate with the AMF 221 via an N12 reference point between the AMF 221 and the AUSF 222; and can communicate with the UDM 227 via an N13 reference point between the UDM 227 and the AUSF 222. Additionally, the AUSF 222 can exhibit an Nausf service-based interface.

The AMF 221 can be responsible for registration management (e.g., for registering UE 201, etc.), connection management, reachability management, mobility management, and lawful interception of AMF-related events, and access authentication and authorization. The AMF 221 can be a termination point for an N11 reference point between the AMF 221 and the SMF 224. The AMF 221 can provide transport for SM messages between the UE 201 and the SMF 224, and act as a transparent proxy for routing SM messages. AMF 221 can also provide transport for SMS messages between UE 201 and a Short Message Service (SMS) function (SMSF) (not shown by FIG. 2A). AMF 221 can act as Security Anchor Function (SEAF), which can include interaction with the AUSF 222 and the UE 201, receipt of an intermediate key that was established as a result of the UE 201 authentication process. Where Universal Subscriber Identity Module (USIM) based authentication is used, the AMF 221 can retrieve the security material from the AUSF 222. AMF 221 can also include a Security Context Management (SCM) function, which receives a key from the SEAF that it uses to derive access-network specific keys. Furthermore, AMF 221 can be a termination point of a RAN CP interface or RAN connection point interface, which can include or be an N2 reference point between the (R)AN 210 and the AMF 221; and the AMF 221 can be a termination point of Non Access Stratum (NAS) layer (N1) signalling, and perform NAS ciphering and integrity protection.

AMF 221 can also support NAS signalling with a UE 201 over an N3 Interworking Function (IWF) interface. The N3 IWF can be used to provide access to untrusted entities. N3IWF can be a termination point for the N2 interface between the (R)AN 210 and the AMF 221 for the control plane, and can be a termination point for the N3 reference point between the (R)AN 210 and the UPF 202 for the user plane. As such, the AMF 221 can handle N2 signalling from the SMF 224 and the AMF 221 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signalling between the UE 201 and AMF 221 via an N1 reference point between the UE 201 and the AMF 221, and relay uplink and downlink user-plane packets between the UE 201 and UPF 202. The N3IWF also provides mechanisms for IPsec tunnel establishment with the UE 201. The AMF 221 can exhibit an Namf service-based interface, and can be a termination point for an N14 reference point between two AMFs 221 and an N17 reference point between the AMF 221 and a 5G-Equipment Identity Register (EIR) (not shown by FIG. 2A).

The UE 201 can need to register with the AMF 221 in order to receive network services. Registration Management (RM) is used to register or deregister the UE 201 with the network (e.g., AMF 221), and establish a UE context in the network (e.g., AMF 221). The UE 201 can operate in an RM-REGISTERED state or an RM-DEREGISTERED state. In the RM-DEREGISTERED state, the UE 201 is not registered with the network, and the UE context in AMF 221 holds no valid location or routing information for the UE 201 so the UE 201 is not reachable by the AMF 221. In the RM-REGISTERED state, the UE 201 is registered with the network, and the UE context in AMF 221 can hold a valid location or routing information for the UE 201 so the UE 201 is reachable by the AMF 221. In the RM-REGISTERED state, the UE 201 can perform mobility Registration Update procedures, perform periodic Registration Update procedures triggered by expiration of the periodic update timer (e.g., to notify the network that the UE 201 is still active), and perform a Registration Update procedure to update UE capability information or to re-negotiate protocol parameters with the network, among others.

The AMF 221 can store one or more RM contexts for the UE 201, where each RM context is associated with a specific access to the network. The RM context can be a data structure, database object, etc. that indicates or stores, inter alia, a registration state per access type and the periodic update timer. The AMF 221 can also store a 5GC MM context that can be the same or similar to the (E)MM context discussed previously. In various embodiments, the AMF 221 can store a CE mode B Restriction parameter of the UE 201 in an associated MM context or RM context. The AMF 221 can also derive the value, when needed, from the UE's usage setting parameter already stored in the UE context (and/or MM/RM context).

Connection Management (CM) can be used to establish and release a signaling connection between the UE 201 and the AMF 221 over the N1 interface. The signaling connection is used to enable NAS signaling exchange between the UE 201 and the CN 220, and comprises both the signaling connection between the UE and the Access Network (AN) (e.g., Radio Resource Control (RRC) connection or UE-N3IWF connection for non-3GPP access) and the N2 connection for the UE 201 between the AN (e.g., RAN 210) and the AMF 221. The UE 201 can operate in one of two CM states, CM-IDLE mode or CM-CONNECTED mode. When the UE 201 is operating in the CM-IDLE state/mode, the UE 201 can have no NAS signaling connection established with the AMF 221 over the N1 interface, and there can be (R)AN 210 signaling connection (e.g., N2 and/or N3 connections) for the UE 201. When the UE 201 is operating in the CM-CONNECTED state/mode, the UE 201 can have an established NAS signaling connection with the AMF 221 over the N1 interface, and there can be a (R)AN 210 signaling connection (e.g., N2 and/or N3 connections) for the UE 201. Establishment of an N2 connection between the (R)AN 210 and the AMF 221 can cause the UE 201 to transition from CM-IDLE mode to CM-CONNECTED mode, and the UE 201 can transition from the CM-CONNECTED mode to the CM-IDLE mode when N2 signaling between the (R)AN 210 and the AMF 221 is released.

The SMF 224 can be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM can refer to management of a PDU session, and a PDU session or "session" can refer to a PDU connectivity service that provides or enables the exchange of PDUs between a UE 201 and a data network (DN) 203 identified by a Data Network Name (DNN). PDU sessions can be established upon UE 201 request, modified upon UE 201 and 5GC 220 request, and released upon UE 201 and 5GC 220 request using NAS SM signaling exchanged over the N1 reference point between the UE 201 and the SMF 224. Upon request from an application server, the 5GC 220 can trigger a specific application in the UE 201. In response to receipt of the trigger message, the UE 201 can pass the trigger message (or relevant parts/information of the trigger message) to one or more identified applications in the UE 201. The identified application(s) in the UE 201 can establish a PDU session to a specific DNN. The SMF 224 can check whether the UE 201 requests are compliant with user subscription information associated with the UE 201. In this regard, the SMF 224 can retrieve and/or request to receive update notifications on SMF 224 level subscription data from the UDM 227.

The SMF 224 can include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N16 reference point between two SMFs 224 can be included in the network architecture 200*a*, which can be between another SMF 224 in a visited network and the SMF 224 in the home network in roaming scenarios. Additionally, the SMF 224 can exhibit the Nsmf service-based interface.

The NEF 223 can provide means for securely exposing the services and capabilities provided by 3GPP network functions for third party, internal exposure/re-exposure, Application Functions (e.g., AF 228), edge computing or fog computing systems, etc. In such embodiments, the NEF 223 can authenticate, authorize, and/or throttle the AFs. NEF 223 can also translate information exchanged with the AF 228 and information exchanged with internal network functions. For example, the NEF 223 can translate between an AF-Service-Identifier and an internal 5GC information. NEF 223 can also receive information from other network functions (NFs) based on exposed capabilities of other network functions. This information can be stored at the NEF 223 as structured data, or at a data storage NF using standardized interfaces. The stored information can then be re-exposed by the NEF 223 to other NFs and AFs, and/or used for other purposes such as analytics. Additionally, the NEF 223 can exhibit an Nnef service-based interface.

The NRF 225 can support service discovery functions, receive NF discovery requests from NF instances, and provide the information of the discovered NF instances to the NF instances. NRF 225 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 225 can exhibit the Nnrf service-based interface.

The PCF 226 can provide policy rules to control plane function(s) to enforce them, and can also support unified policy framework to govern network behavior. The PCF 226 can also implement a front end (FE) to access subscription information relevant for policy decisions in a Uniform Data Repository (UDR) or user datagram protocol of the UDM 227. The PCF 226 can communicate with the AMF 221 via an N15 reference point between the PCF 226 and the AMF 221, which can include a PCF 226 in a visited network and the AMF 221 in case of roaming scenarios. The PCF 226 can communicate with the application function AF 228 via an N5 reference point between the PCF 226 and the AF 228; and with the SMF 224 via an N7 reference point between the PCF 226 and the SMF 224. The network architecture 200*a* and/or CN 220 can also include an N24 reference point between the PCF 226 (in the home network) and a PCF 226 in a visited network. Additionally, the PCF 226 can exhibit an Npcf service-based interface.

The UDM 227 can handle subscription-related information to support the network entities' handling of communication sessions, and can store subscription data of UE 201. For example, subscription data can be communicated between the UDM 227 and the AMF 221 via an N8 reference point between the UDM 227 and the AMF. The UDM 227 can include two parts, an application FE and a Uniform Data Repository (UDR) (the FE and UDR are not shown by FIG. 2A). The UDR can store subscription data and policy data for the UDM 227 and the PCF 226, and/or structured data for exposure and application data (including PFDs for application detection, application request information for multiple UEs 201) for the NEF 223. The Nudr service-based interface can be exhibited by the UDR 221 to allow the UDM 227, PCF 226, and NEF 223 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different front ends can serve the same user in different transactions. The UDM-FE accesses subscription information stored in the UDR and performs authentication credential processing, user identification handling, access authorization, registration/mobility management, and subscription management. The UDR can interact with the SMF 224 via an N10 reference point between the UDM 227 and the SMF 224. UDM 227 can also support SMS management, wherein an SMS-FE implements the similar application logic as discussed previously. Additionally, the UDM 227 can exhibit the Nudm service-based interface.

The AF 228 can provide application influence on traffic routing, provide access to the NCE, and interact with the policy framework for policy control. The NCE can be a mechanism that allows the 5GC 220 and AF 228 to provide information to each other via NEF 223, which can be used for edge computing implementations. In such implementations, the network operator and third party services can be hosted close to the UE 201 access point of attachment to achieve an efficient service delivery through the reduced end-to-end latency and load on the transport network. For edge computing implementations, the 5GC can select a UPF 202 close to the UE 201 and execute traffic steering from the UPF 202 to DN 203 via the N6 interface. This can be based on the UE subscription data, UE location, and information provided by the AF 228. In this way, the AF 228 can influence UPF (re)selection and traffic routing. Based on operator deployment, when AF 228 is considered to be a trusted entity, the network operator can permit AF 228 to interact directly with relevant NFs. Additionally, the AF 228 can exhibit an Naf service-based interface.

The NSSF 229 can select a set of network slice instances serving the UE 201. The NSSF 229 can also determine allowed NSSAI and the mapping to the subscribed single Network Slice Selection Assistance Information (S-NSSAIs), if needed. The NSSF 229 can also determine the AMF set to be used to serve the UE 201, or a list of candidate AMF(s) 221 based on a suitable configuration and possibly by querying the NRF 225. The selection of a set of network slice instances for the UE 201 can be triggered by the AMF 221 with which the UE 201 is registered by interacting with the NSSF 229, which can lead to a change of AMF 221. The NSSF 229 can interact with the AMF 221 via an N22 reference point between AMF 221 and NSSF 229; and can communicate with another NSSF 229 in a visited network via an N31 reference point (not shown by FIG. 2A). Additionally, the NSSF 229 can exhibit an Nnssf service-based interface.

The CN 220 can include an SMSF, which can be responsible for SMS subscription checking and verification, and relaying SM messages to/from the UE 201 to/from other entities, such as an SMS-GMSC/IWMSC/SMS-router. The SMS can also interact with AMF 221 and UDM 227 for a notification procedure that the UE 201 is available for SMS transfer (e.g., set a UE not reachable flag, and notifying UDM 227 when UE 201 is available for SMS).

The CN 220 can also include other elements that are not shown by FIG. 2A, such as a Data Storage system/architecture, a 5G-EIR, a SEPP, and the like. The Data Storage system can include a SDSF, an UDSF, and/or the like. Any NF can store and retrieve unstructured data into/from the UDSF (e.g., UE contexts), via N18 reference point between any NF and the UDSF (not shown by FIG. 2A). Individual NFs can share a UDSF for storing their respective unstructured data or individual NFs can each have their own UDSF located at or near the individual NFs. Additionally, the UDSF can exhibit an Nudsf service-based interface (not shown by FIG. 2A). The 5G-EIR can be an NF that checks the status of PEI for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 2A for clarity. In one example, the CN 220 can include an Nx interface, which is an inter-CN interface between the Mobility Management Entity (MME) and the AMF 221 in order to enable interworking between CN 220 and other CN. Other example interfaces/reference points can include an N5g-Equipment Identity Register (EIR) service-based interface exhibited by a 5G-EIR, an N27 reference point between the Network Repository Function (NRF) in the visited network and the NRF in the home network; and an N31 reference point between the NSSF in the visited network and the NSSF in the home network. Further, any of the above functions, entities, etc. can include or be comprised by a component as referred to herein.

The SCP 208 (or individual instances of the SCP 208) supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPS1 (see e.g., 3GPP TS 23.501 section 6.3). Load balancing, monitoring, overload control functionality provided by the SCP may be implementation specific. The SCP 208 may be deployed in a distributed manner. More than one SCP 208 can be present in the communication path between various NF Services. The SCP 208, although not an NF instance, can also be deployed distributed, redundant, and scalable.

The DN 203 may represent various network operator services, Internet access, or third party services that may be provided by one or more servers including, for example, application server 110. In some implementations, the DN 203 may be, or include, one or more edge compute nodes 204. Additionally or alternatively, the DN 203 may be an Edge DN 203, which is a (local) Data Network that supports the architecture for enabling edge applications. In these embodiments, the application server 110 may represent the physical hardware systems/devices providing app server functionality and/or the application software resident in the cloud or at an edge compute node 204 that performs server function(s). In some embodiments, the application server 110 provides an edge hosting environment that provides support required for Edge Application Server's execution.

In some embodiments, the 5GS can use one or more edge compute nodes 204 to provide an interface and offload processing of wireless communication traffic. In these embodiments, the edge compute nodes 204 may be included in, or co-located with one or more RANs 210 (e.g., similar to RAN 112). For example, the edge compute nodes 204 can provide a connection between the RAN 210 and the UPF 202 in the 5GC 220. The edge compute nodes 204 can use one or more NFV instances instantiated on virtualization infrastructure within the edge compute nodes 204 to process wireless connections to and from the RAN 210 and UPF 202.

In embodiments, the edge compute node 204 may include or be part of an edge system (or edge network). The edge compute node 204 may also be referred to as "edge hosts 204" or "edge servers 204." The edge system includes a collection of edge compute nodes 204 and edge management systems (not shown) necessary to run edge computing applications within an operator network or a subset of an operator network. The edge compute nodes 204 are physical computer systems that may include an edge platform and/or virtualization infrastructure, and provide compute, storage, and network resources to edge computing applications. Each of the edge compute nodes 204 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 201. The VI of the edge compute nodes 204 provide virtualized environments and virtualized resources for the edge hosts, and the edge computing applications may run as VMs and/or application containers on top of the VI. Various edge computing/networking technologies in various combinations and layouts of devices located at the edge of a network may be used. Examples of such edge computing/networking technologies that may implement the embodiments herein include ETSI MEC; CDNs Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used to practice the embodiments herein.

FIG. 2B illustrates an architecture of a network architecture 200*b* including a second CN 220 in accordance with various embodiments. The network architecture 200*b* is similar to the wireless communication system 100, and may illustrate equipment, devices and network elements similar to those described with reference to the wireless communication system 100. For example, FIG. 2A illustrates the edge compute nodes 204 can provide a connection between the RAN 210 and the UPF 202 in the 5GC 220. FIG. 2B provides an alternate arrangement for the edge compute nodes 204. As depicted in FIG. 2B, an edge compute node 204 is communicatively coupled to the RAN 210 via a NEF 206, which is similar to the NEF 223.

As previously discussed, modern 5G and 6G networks and network slicing are designed to support various types of network services, such as eMBB, URLLC, mIoT, and other network services. Some services have ultra-low latency, high data capacity, and strict reliability requirements where faults or performance issues in the networks can cause service failure. Therefore, collection of real-time performance data and/or performance measurements that can be used by analytic applications (e.g., network optimization, SONs, etc.) to detect the potential issues in advance, and take appropriate actions to prevent or mitigate the issues. Also, the performance data can be able to be consumed by multiple analytic applications with specific purposes. The 5G services (e.g., eMBB, URLLC, mIoT, or other like services) can have requirements for e2e performance of the 5G networks. Therefore, e2e performance measurements have a need to be defined for 5G networks, especially in alignment with one or more of the third generation partnership project (3GPP) technical standards (TS), such as 3GPP TS 32.404: "Performance Management (PM); Performance measurements-Definitions and template," v. 16.0.0, 2020-07-15; 3GPP TS 23.501: "System Architecture for the 5G System," v. 17.2.0, 2021-06-24; 3GPP TS 23.502: "Procedures for the 5G System," v. 17.2.1, 2020-09-29; and 3GPP TS 29.503: "5G System; Unified Data Management Services; Stage 3," v. 17.4.0, 2021-09-17; including any progeny, revisions or variants. Other relevant 3GPP standards include TS 23.501, TS 28.550, or TS 28.552.

However, the performance measurements for 5GC NFs defined in the current specifications can be limited and not entirely sufficient for network monitoring (e.g., the performance of the 5G core network (5GC)), authentication of UEs with gNBs, or to enable registration of a UE with the 5G system (5GS). Embodiments herein provide mechanisms to generate the performance measurements for 5GC NFs (including, e.g., AMF, a SMF, a UPF, a PCF, a NEF, a NRF, or other 5GC NFs), which can each have associated components including one or more processors/processing devices for performing operations of the associated function. The performance measurements for 5GC NFs are the fundamental data for monitoring the performance of 5GC, and can include network parameters or data associated with particular operations, including, but not limited to: Initial Registration to the 5GS; Mobility Registration Update (upon changing to a new Tracking Area (TA) outside the UE's Registration Area in both connection management (CM)-CONNECTED and CM-IDLE state, or when the UE needs to update its capabilities or protocol parameters that are negotiated in Registration procedure with or without changing to a new TA); Periodic Registration Update (due to a predefined time period of inactivity); Emergency Registration (i.e. the UE is in limited service state); performance measurements for subscriber data and parameter provisioning in unified data managed (UDM); data volume performance measurements for network functions supporting edge computing; and other 5GS and 5GC network operations.

Figure 3:
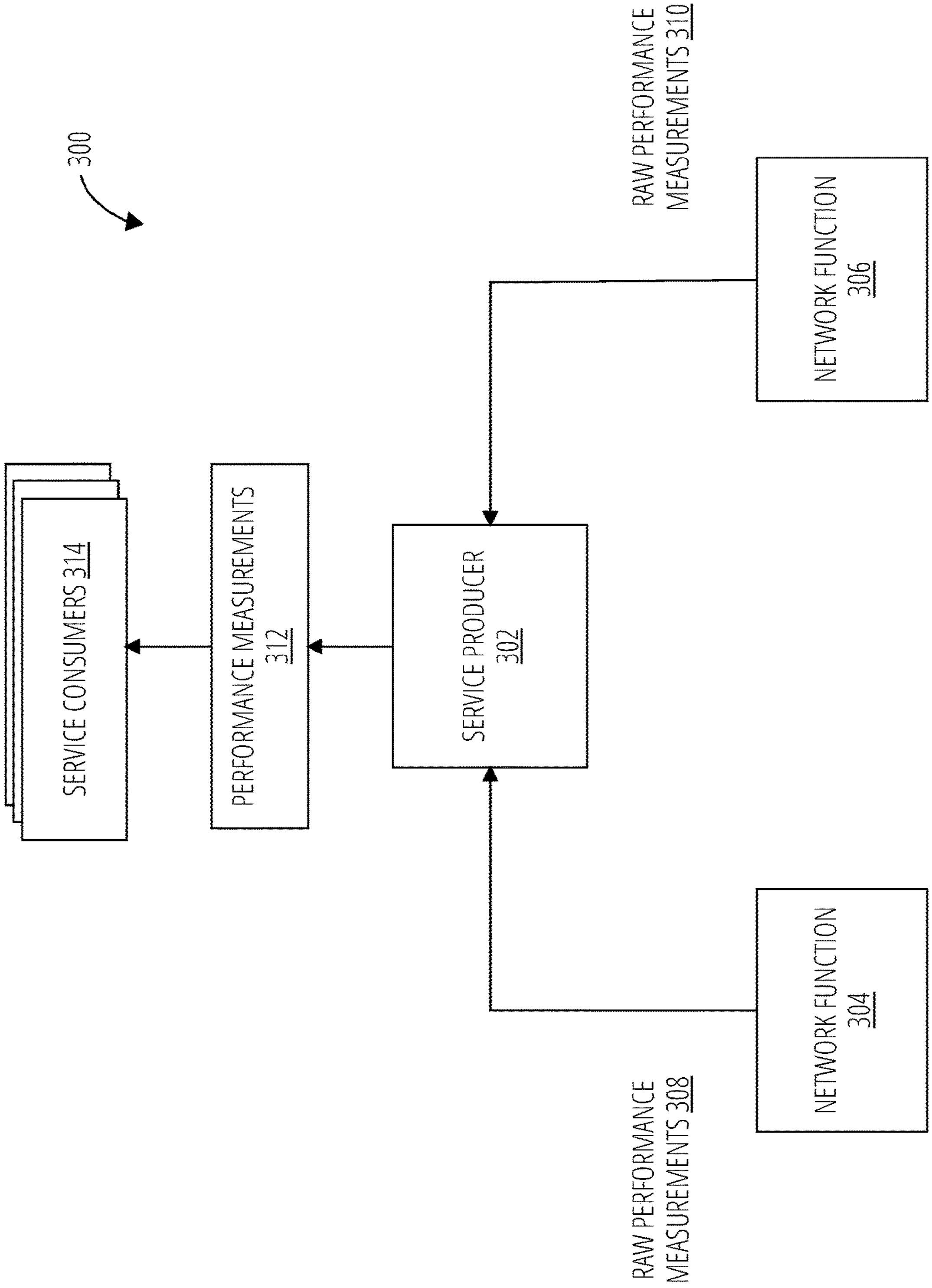
FIG. 3 is a diagram illustrating example interfaces of circuitry or service provider/producer components that can be employed in accordance with various aspects/embodiments described herein.

FIG. 3 illustrates a system 300. The system 300 provides an example performance measurement service producer/provider in accordance with various details, embodiments or aspects described herein. The service producer 302 collects raw performance measurements 308 and raw performance measurements 310 from a network function 304 and a network function 306, respectively, as described herein and then generates performance measurements 312 for the corresponding network functions 304, 306 for one or more service consumers 314 (e.g., a UE, gNB, or other network device/component).

Each network function 304, 306 is configured to determine, monitor, processor, transmit or perform raw measurements. Raw measurements are different from performance measurement in that they are different in a format, information, data, or otherwise than the performance measurement. A raw measurement can be a sensed or collected data, where a performance measurement is processed and provided in a set of information with meaning to a receiver. For example, a counter such as a cumulative counter can ascertain raw measurements of increments such as in integers or other value, and the performance data can provide this data meaning as a category, file or different format to a device for further processing or monitoring based thereon. Performance measurements can coincide or be referred to according to 3GPP standard performance measurements such as in 3GPP TS 23.501, TS 28.550, or TS 28.552 in Release 16 or beyond. The network functions 304, 306 thus can provide measurements in a non-standardized manner or form so the service producer 302 as an associated component can provide a standard measure or standard performance measure.

Although illustrated as one or more network functions 304, 306 communicatively coupled to or connected to the service producer 302, each can be comprised by the other and vice versa in location as corresponding components, and each network function can include one or more functions as provided here, such as by NFs for 5GC or 6GC.

Figure 4:
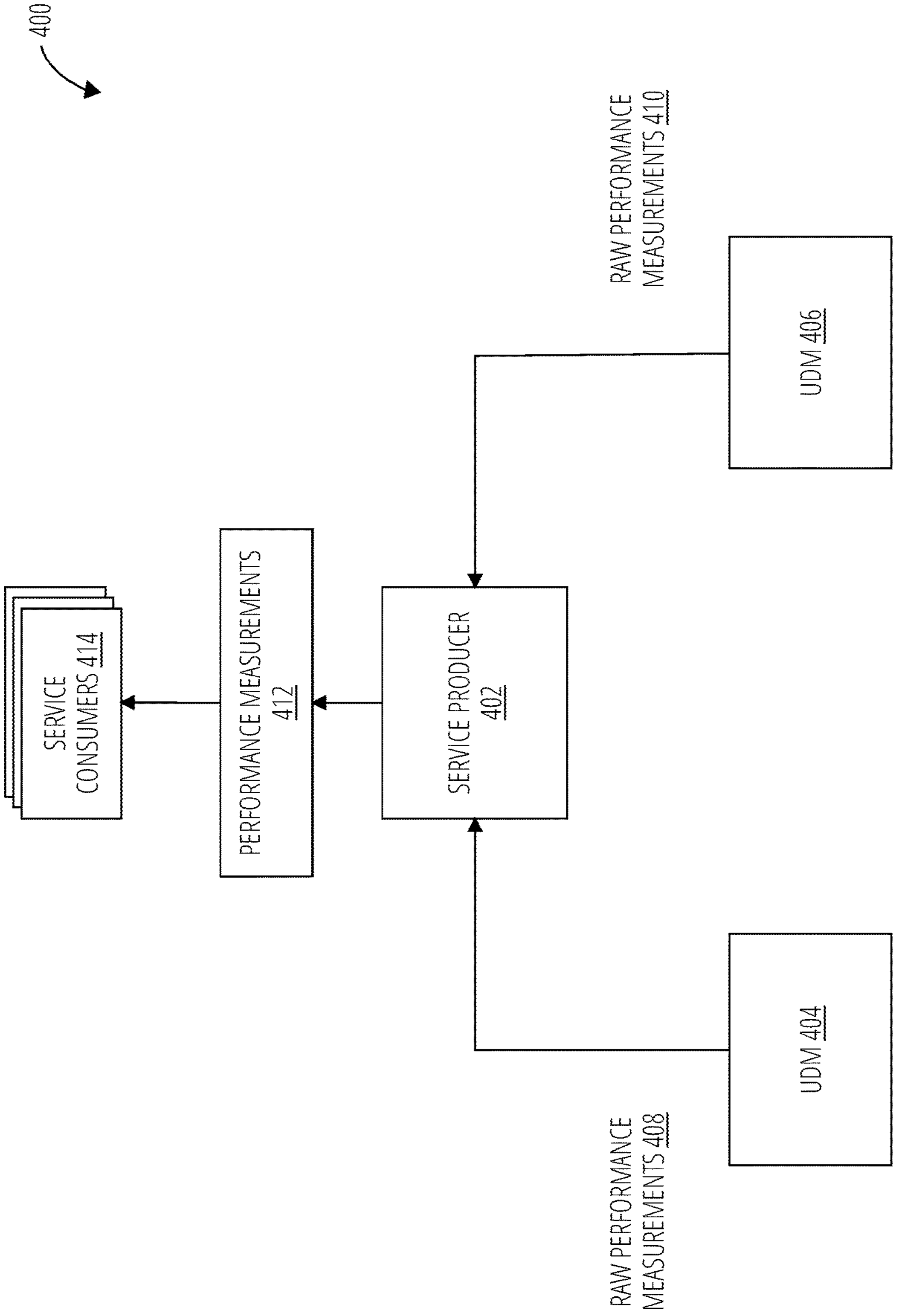
FIG. 4 is a diagram illustrating second example interfaces of circuitry or service provider/producer components that can be employed in accordance with various aspects/embodiments described herein.

FIG. 4 illustrates a system 400. The system 400 is similar to the system 300. Similar to the system 300, the system 400 includes a service producer 402 that collects raw performance measurements 408 and raw performance measurements 410 from one or more network functions. In some embodiments, the network functions are or includes a UDM, such as a UDM 404 and a UDM 406. The service producer 402 collects raw performance measurements 408 and raw performance measurements 410 from the UDM 404 and the UDM 406, respectively, and it then generates performance measurements 412 for network functions for one or more service consumers 414.

Although illustrated as one or more UDM 404, 406 communicatively coupled to or connected to the service producer 402, each can be comprised by the other and vice versa in location as corresponding components, and each UDM can include one or more functions as provided here, such as by NFs for 5GC or 6GC.

Figure 5:
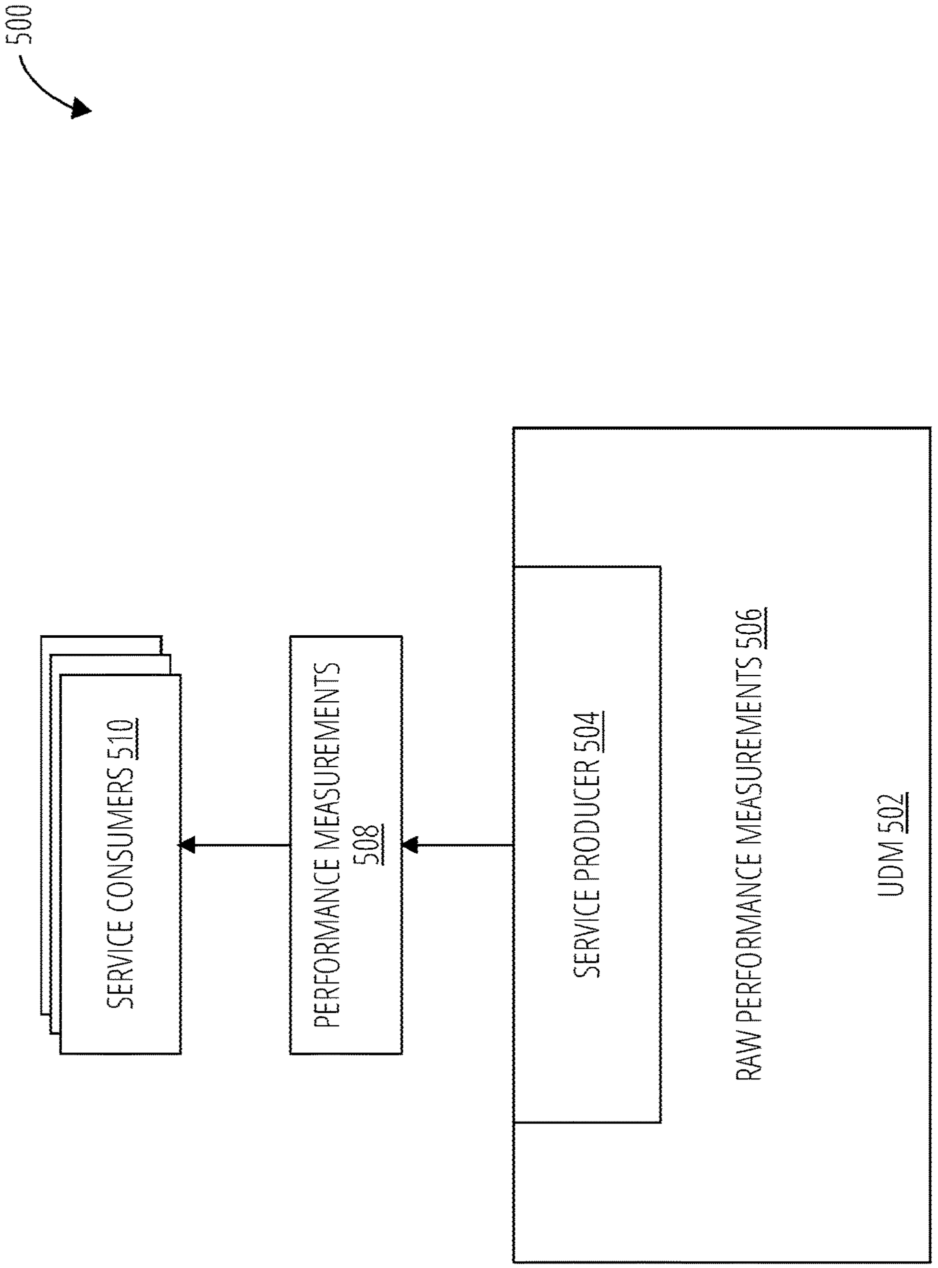
FIG. 5 is a diagram illustrating third example interfaces of circuitry or service provider/producer components that can be employed in accordance with various aspects/embodiments described herein.

FIG. 5 illustrates a system 500. The system 500 is similar to the system 400. In some embodiments, a network function is or includes a UDM, and a service producer may be implemented within the NF or in a separate management system. The system 500 provides an example of a service producer 504 implemented within a UDM 502. The UDM 502 takes raw performance measurements 506, and the service producer 504 generates performance measurements 508 for network functions for its consumers, such as one or more service consumers 510. While the system 500 illustrates the service producer 504 implemented within the UDM 502, the service producer 504 may also be implemented in a separate management system.

Various aspects or embodiments also include 5GC or 6GC performance measurements defining, indicating or setting particular performance measurements, such as performance measurements 312, 412 and/or 508, for communication between a UE and gNB with a 5GC or 6GC. In one embodiment, the performance measurements 508 can be related to performance measurements for a UDM system, such as subscriber data management related measurements. Embodiments are not limited in this context.

Figure 6:
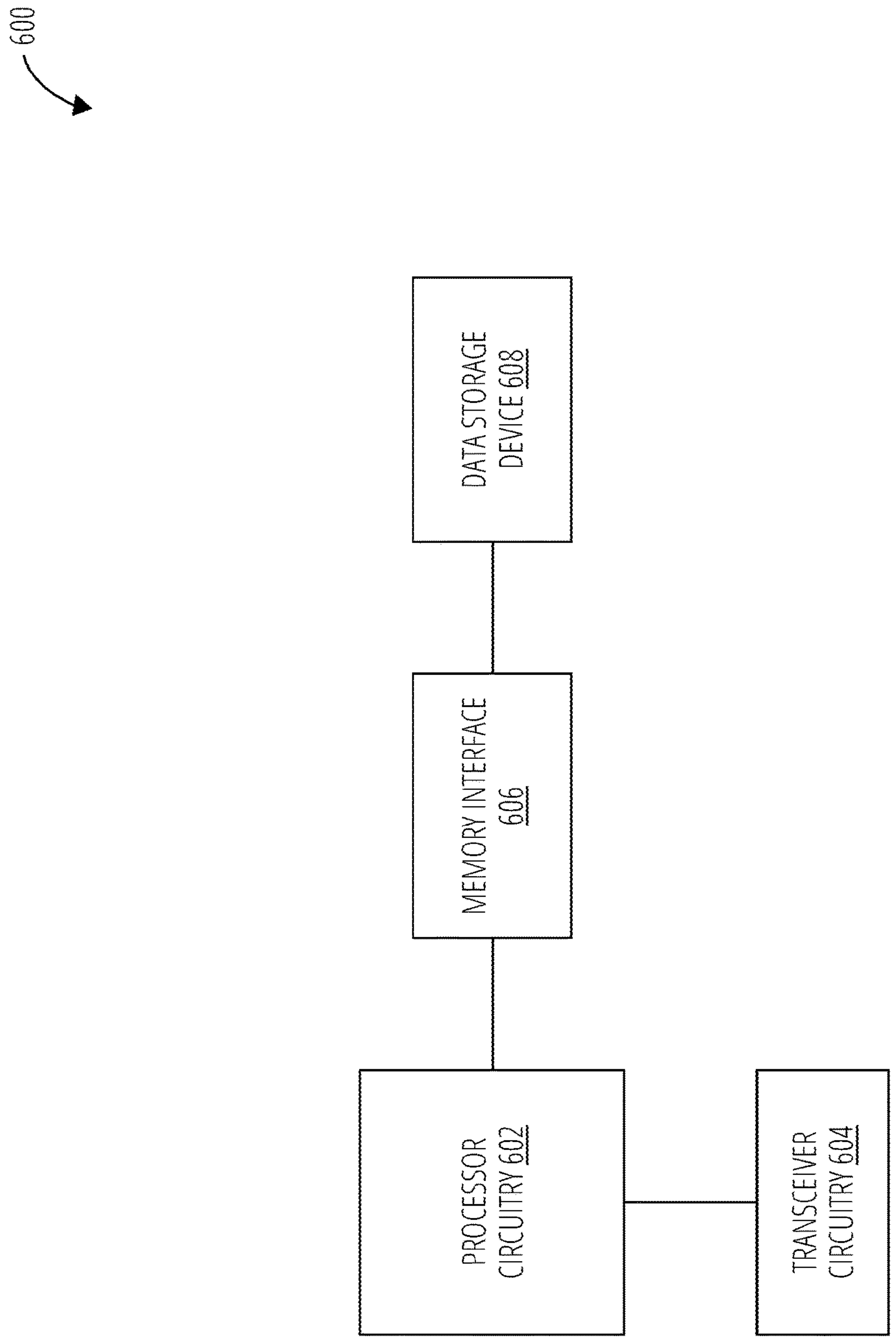
FIG. 6 illustrates an apparatus in accordance with one embodiment.

Referring to FIG. 6, illustrated is a block diagram of an apparatus 600 employable at a UE (e.g., URLLC UEs, or non-URLLC UEs) or other network device (e.g., gNB/eNB) that facilitates one or more aspects/embodiments herein. Apparatus 600 can include one or more processor circuitry 602 (e.g., one or more baseband processors such as one or more of the baseband processors discussed in connection with the other Figures) with associated interface(s), transceiver circuitry 604 (e.g., comprising part or all of radio frequency (RF) circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory interface 606 to communicatively coupled with a data storage device 608. The data storage device 608 can comprise any of a variety of storage mediums and can store instructions and/or data associated with one or more of processor circuitry 602 or transceiver circuitry 604.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 7 illustrates an embodiment of a logic flow 700. The logic flow 700 may be representative of some or all of the operations executed by one or more embodiments described herein. For example, the logic flow 700 may include some or all of the operations performed by devices or entities within the wireless communications system 100, or the network architectures 200*a*, 200*b* such as the CN 220, as well as the system 300, the system 400, the system 500 or the apparatus 600. More particularly, the logic flow 700 illustrates a use case where the UDM 227 of the CN 220 generates performance measurements 508 for subscriber data management related measurements. Embodiments are not limited in this context.

In block 702, logic flow 700 obtains raw measurements of network functions communicatively coupled to one another via service based management interfaces of the 5GS, wherein one of the network functions is a unified data management (UDM). In block 704, logic flow 700 generates performance measurements corresponding to one or more network functions based on the raw measurements, wherein the performance measurements are subscriber data management related measurements. In block 706, logic flow 700 reports the subscriber data management related measurements to a service consumer.

The performance measurements 508 implemented as subscriber data management related measurements may be defined in accordance with one or more 3GPP standards. Some embodiments comprise performance measurements 508 as defined in accordance with the 3GPP TS 28.552 titled "Technical Specification Group Services and System Aspects; Management and orchestration; 5G performance measurements," version 17.7.1 (2022-06), including any progeny, revisions and variants, among other 3GPP and non-3GPP wireless standards. The performance measurements 508 may be defined in clause 5.6 titled "Performance measurements for UDM" to 5.6.9.4.3 titled "Number of failed parameter gettings" of the 3GPP TS 28.552. Related KPIs are defined to the performance measurements 508 are defined in 3GPP TS 28.554. The performance measurements 508 may be defined, for example, based on the measurement template as described in 3GPP TS 32.404.

The performance measurements may be defined in clause 5.6 titled "Performance measurements for UDM" to 5.6.9.4.3 titled "Number of failed parameter gettings" of the 3GPP TS 28.552. Each clause (or section) is reproduced in the following paragraphs.

5.6 Performance measurements for UDM 5.6.1 Mean number of registered subscribers through UDM a) This measurement provides the mean number of registered subscribers to UDM b) SI c) This measurement is obtained by sampling at a unified interval the number of registered subscribers in a UDM and then taking the arithmetic mean.

d) A single integer value e) RM.RegisteredSubUDMNbrMean f) UDMFunction g) Valid for packet switching h) 5GS 5.6.2 Maximum number of registered subscribers through UDM a) This measurement provides the maximum number of registered subscribers to UDM.

b) SI c) This measurement is obtained by sampling at a unified interval the number of registered subscribers in the UDM and then taking the maximum.

d) A single integer value e) RM.RegisteredSubUDMNbrMax f) UDMFunction g) Valid for packet switching h) 5GS 5.6.3 Mean number of unregistered subscribers through UDM a) This measurement provides the mean number of unregistered subscribers to UDM.

b) SI c) This measurement is obtained by sampling at a unified interval the number of unregistered subscribers in the UDM and then taking the arithmetic mean.

d) A single integer value e) RM. UnregisteredSubUDMNbrMean f) UDMFunction g) Valid for packet switching h) 5GS 5.6.4 Maximum number of unregistered subscribers through UDM a) This measurement provides the maximum number of unregistered subscribers to UDM.

b) SI c) This measurement is obtained by sampling at a unified interval the number of unregistered subscribers in the UDM and then taking the maximum.

d) A single integer value e) RM. UnregisteredSubUDMNbrMax f) UDMFunction g) Valid for packet switching h) 5GS 5.6.5 Distribution of subscriber profile sizes in UDM a) This measurement provides the distribution of subscriber profile sizes in UDM.

b) CC c) This measurement is obtained by the following method:
for each observed subscriber profile its size is determined;
the bin with the range corresponding to the observed service profile size is selected;
the value of the counter for the selected bin is incremented by 1

E.g. for observed subscriber profile size of 3300 bytes, the counter corresponding to the bin "0-5000" is incremented by one.

d) Each measurement is an integer representing the count of service profiles with size within the range of the bin.

e) RM.SubscriberProfileSizesCount.Bin where Bin indicates the size range which is vendor specific.

f) UDMFunction g) Valid for packet switching h) 5GS 5.6.6 Mean size of subscriber profiles in UDM a) This measurement provides the mean size of subscriber profiles in UDM.

b) SI c) This measurement is obtained by inspecting the sizes ot subscriber profiles in UDM and then takin their arithmetic mean.

d) A single integer value.

e) RM.SubscriberProfileSizesMean.

f) UDMFunction g) Valid for packet switching h) 5GS 5.6.7 Distribution of UDM SubscriberDataManagement message sizes a) This measurement provides the distribution of message sizes in UDM SubscriberDataManagement.

b) DER (n=1)

c) This measurement is obtained by the following method:
for each observed UDM_SubscriberDataManagement response or notification message ("SDM Get Response", "SDM Notification Notify", "SDM Info Response") its size is determined;
the bin with the range corresponding to the observed message size is selected under sub-counter corresponding to the message type;
the value of the counter for the selected bin is incremented by 1

E.g. for an observed "SDM Get Response" message with size of 4500 bytes, the counter corresponding to the bin "0-5000" is incremented by one.

d) Each measurement is an integer representing the count of service profiles with size within the range of the bin.

e) RM.UdmSdm.GetResponseSize.Bin where Bin indicates the size range which is
vendor specific.
RM.UdmSdm.NotificationSize.Bin where Bin indicates the size range which is vendor specific.
RM.UdmSdm. InfoResponseSize.Bin where Bin indicates the size range which is vendor specific.

f) UDMFunction g) Valid for packet switching h) 5GS 5.6.8 Subscriber data management related measurements 5.6.8.1 Subscription data getting 5.6.8.1.1 Number of subscription data getting requests a) This measurement provides the number of subscription data getting requests received by the UDM.

b) CC c) Receipt of an Nudm_SDM_Get request by the UDM from a consumer NF (e.g., AMF), each message increments the relevant subcounter per subscriber data type by 1 (see 3GPP TS 23.502 [7]).

d) An integer value e) SDM.GetReq.Type, Where Type indicates the subscription data type.

f) UDMFunction g) Valid for packet switched traffic h) 5GS 5.6.8.1.2 Number of successful subscription data gettings a) This measurement provides the number of successful subscription data gettings at UDM.

b) CC c) Transmission of an Nudm_SDM_Getresponse by the UDM to a consumer NF
(e.g., AMF) indicating a successful subscription data getting, each message increments the relevant subcounter per subscriber data type by 1 (see 3GPP TS 29.503 [51]).

d) An integer value e) SDM.GetSucc.Type, Where Type indicates the subscription data type.

f) UDMFunction g) Valid for packet switched traffic h) 5GS 5.6.8.1.3 Number of failed subscription data gettings a) This measurement provides the number of failed subscription data gettings at UDM.

b) CC c) Transmission of an Nudm_SDM_Getresponse by the UDM to a consumer NF (e.g., AMF) indicating a failed subscription data getting, each message increments the relevant subcounter per failure case by 1 (see TS 29.503 [51]).

d) An integer value e) SDM.GetFail.Cause, Where Cause indicates the failure cause of the subscription data getting.

f) UDMFunction g) Valid for packet switched traffic h) 5GS 5.6.8.2 SDM subscription 5.6.8.2.1 Number of SDM subscribing requests a) This measurement provides the number of SDM subscribing requests received by the UDM.

b) CC c) Receipt of an Nudm_SDM_Subscribe request by the UDM from a consumer NF (e.g., AMF), each message increments the relevant subcounter per subscriber data type by 1 (see 3GPP TS 23.502 [7]).

d) An integer value e) SDM.SubscribeReq.Type, Where Type indicates the subscription data type.

f) UDMFunction g) Valid for packet switched traffic h) 5GS 5.6.8.2.2 Number of successful SDM subscribings a) This measurement provides the number of successful SDM subscribings at UDM.

b) CC c) Transmission of an Nudm_SDM_Subscribe by the UDM to a consumer NF (e.g., AMF) indicating a successful SDM subscribings, each message increments the relevant subcounter per subscriber data type by 1 (see 3GPP TS 29.503 [51[x]]).

d) An integer value e) SDM.SubscribeSucc.Type, Where Type indicates the subscription data type.

f) UDMFunction g) Valid for packet switched traffic h) 5GS 5.6.8.2.3 Number of failed SDM subscribings a) This measurement provides the number of failed SDM subscribings at UDM.

b) CC c) Transmission of an Nudm_SDM_Subscribe response by the UDM to a consumer NF (e.g., AMF) indicating a failed SDM subscribings, each message increments the relevant subcounter per failure case by 1 (see TS 29.503 [51]).

d) An integer value e) SDM.SubscribeFail.Cause, Where Cause indicates the failure cause of the SDM subscribing.

f) UDMFunction g) Valid for packet switched traffic h) 5GS 5.6.8.3 Subscription data notification 5.6.8.3.1 Number of subscription data notifications a) This measurement provides the number of subscription data notifications sent by the UDM.

b) CC c) Transmission of an Nudm_SDM_Notification by the UDM from a consumer NF (e.g., AMF), each message increments the relevant subcounter per subscriber data type by 1 (see TS 23.502 [7]).

d) An integer value e) SDM.SubDataNotif.Type, Where Type indicates the subscription data type.

f) UDMFunction g) Valid for packet switched traffic h) 5GS 5.6.9 Parameter provisioning related measurements 5.6.9.1 Parameter creations 5.6.9.1.1 Number of parameter creation requests a) This measurement provides the number of parameter creation requests received by the UDM.

b) CC c) Receipt of an Nnef_ParameterProvision_Create request by the UDM from a consumer NF (e.g., NEF) (see TS 23.502 [7]).

d) An integer value e) PPV.CreateReq.

f) UDMFunction g) Valid for packet switched traffic h) 5GS 5.6.9.1.2 Number of successful parameter creations a) This measurement provides the number of successful parameter creations at UDM.

b) CC c) Transmission of an Nnef_ParameterProvision_Create response by the UDM to a consumer NF (e.g., AMF) indicating a successful parameter creation (see TS 29.503 [51]).

d) An integer value e) PPV.CreateSucc.

f) UDMFunction g) Valid for packet switched traffic h) 5GS 5.6.9.1.3 Number of failed parameter creations a) This measurement provides the number of failed parameter creations at UDM.

b) CC c) Transmission of an Nnef_ParameterProvision_Create response by the UDM to a consumer NF (e.g., AMF) indicating a failed parameter creation, each message increments the relevant subcounter per failure case by 1 (see TS 29.503 [51]).

d) An integer value e) PPV.CreateFail.Cause, Where Cause indicates the failure cause of the parameter creation.

f) UDMFunction g) Valid for packet switched traffic h) 5GS 5.6.9.2 Parameter update 5.6.9.2.1 Number of parameter update requests a) This measurement provides the number of parameter update requests received by the UDM.

b) CC c) Receipt of an Nudm_ParameterProvision_Update request by the UDM from a consumer NF (e.g., NEF) (see TS 23.502 [7]).

d) An integer value e) PPV.UpdateReq.

f) UDMFunction g) Valid for packet switched traffic h) 5GS 5.6.9.2.2 Number of successful parameter updates a) This measurement provides the number of successful parameter updates at UDM.

b) CC c) Transmission of an Nudm_ParameterProvision_Update response by the UDM to a consumer NF (e.g., AMF) indicating a successful parameter update (see TS 29.503 [51]).

d) An integer value e) PPV.UpdateSucc.

f) UDMFunction g) Valid for packet switched traffic h) 5GS 5.6.9.2.3 Number of failed parameter updates a) This measurement provides the number of failed parameter updates at UDM.

b) CC c) Transmission of an Nudm_ParameterProvision_Update response by the UDM to a consumer NF (e.g., AMF) indicating a failed parameter update, each message increments the relevant subcounter per failure case by 1 (see TS 29.503 [51]).

d) An integer value e) PPV.UpdateFail.Cause, Where Cause indicates the failure cause of the parameter update.

f) UDMFunction g) Valid for packet switched traffic h) 5GS 5.6.9.3 Parameter deletion 5.6.9.3.1 Number of parameter deletion requests a) This measurement provides the number of parameter deletion requests received by the UDM.

b) CC c) Receipt of an Nudm_ParameterProvision_Delete request by the UDM from a consumer NF (e.g., NEF) (see TS 23.502 [7]).

d) An integer value e) PPV.DeleteReq.

f) UDMFunction g) Valid for packet switched traffic h) 5GS 5.6.9.3.2 Number of successful parameter deletions a) This measurement provides the number of successful parameter deletions at UDM.

b) CC c) Transmission of an Nudm_ParameterProvision_Delete response by the UDM to a consumer NF (e.g., AMF) indicating a successful parameter deletion (see TS 29.503 [51]).

d) An integer value e) PPV.DeleteSucc.

f) UDMFunction g) Valid for packet switched traffic h) 5GS 5.6.9.3.3 Number of failed parameter deletions a) This measurement provides the number of failed parameter deletions at UDM.

b) CC c) Transmission of an Nudm_ParameterProvision_Delete response by the UDM to a consumer NF (e.g., AMF) indicating a failed parameter deletion, each message increments the relevant subcounter per failure case by 1 (see TS 29.503 [51]).

d) An integer value e) PPV.DeleteFail.Cause, Where Cause indicates the failure cause of the parameter deletion.

f) UDMFunction g) Valid for packet switched traffic h) 5GS 5.6.9.4 Parameter getting 5.6.9.4.1 Number of parameter getting requests a) This measurement provides the number of parameter getting requests received by the UDM.

b) CC c) Receipt of an Nudm_ParameterProvision_Get request by the UDM from a consumer NF (e.g., NEF) (see TS 23.502 [7]).

d) An integer value e) PPV.GetReq.

f) UDMFunction g) Valid for packet switched traffic h) 5GS 5.6.9.4.2 Number of successful parameter gettings a) This measurement provides the number of successful parameter gettings at UDM.

b) CC c) Transmission of an Nudm_ParameterProvision_Get response by the UDM to a consumer NF (e.g., AMF) indicating a successful parameter getting (see TS 29.503 [51]).

d) An integer value e) PPV.GetSucc.

f) UDMFunction g) Valid for packet switched traffic h) 5GS 5.6.9.4.3 Number of failed parameter gettings a) This measurement provides the number of failed parameter gettings at UDM.

b) CC c) Transmission of an Nudm_ParameterProvision_Get response by the UDM to a consumer NF (e.g., AMF) indicating a failed parameter getting, each message increments the relevant subcounter per failure case by 1 (see TS 29.503 [51]).

d) An integer value e) PPV.GetFail.Cause, Where Cause indicates the failure cause of the parameter getting.

f) UDMFunction g) Valid for packet switched traffic h) 5GS

Referring again to FIG. 6, the apparatus 600 may implement the logic flow 700 for a network device (e.g., a UE, a gNB, a CN 220, a UDM 227, a UDM 502, a 5GC component or the like) can process, generate, or monitor performance parameters for a communication via a 5G network core (5GC) of a 5G network system (5GS).

In one embodiment, an apparatus 600 for a network management component of a fifth generation (5G) system (5GS), includes a memory interface 606 to send or receive, to or from a data storage device 608, performance measurements 508 related to subscriber data management and parameter provisioning for a unified data management (UDM) system, such as the system 500. The apparatus 600 also includes processor circuitry 602 communicatively coupled to the memory interface 606, the processor circuitry 602 to obtain raw performance measurements (e.g., such as raw performance measurements 308, raw performance measurements 310, raw performance measurements 408, raw performance measurements 410, raw performance measurements 506, and/or raw performance measurements 508) of network functions communicatively coupled to one another via service based management interfaces of the 5GS, where one of the network functions is a UDM 502. The processor circuitry 602 may generate one or more performance measurements (e.g., performance measurements 312, performance measurements 412, and/or performance measurements 508) corresponding to one or more network functions based on the raw performance measurements, where the performance measurements are subscriber data management related measurements, and report the subscriber data management related measurements to one or more service consumers (e.g., service consumers 314, service consumers 414 and/or service consumers 510). The apparatus 600 may also include transceiver circuitry 604 that may include RF circuitry for transmitting a communication of the report based on the performance measurements 508 to the service consumers 510 in the 5GS or 5GC.

The apparatus 600 may also include the processor circuitry 602 to generate a subscriber data management related measurement for a subscription data getting, the subscription data getting to comprise a measurement for a number of subscription data getting requests, where the measurement provides the number of subscription data getting requests received by the UDM.

The apparatus 600 may also include the processor circuitry 602 to generate a subscriber data management related measurement for a subscription data getting, the subscription data getting to comprise a measurement for a number of successful subscription data gettings, where the measurement provides the number of subscription data gettings at the UDM.

The apparatus 600 may also include the processor circuitry 602 to generate a subscriber data management related measurement for a subscription data getting, the subscription data getting to comprise a measurement for a number of failed subscription data gettings, where the measurement provides the number of failed subscription data gettings at the UDM.

The apparatus 600 may also include the processor circuitry 602 to generate a subscriber data management related measurement for a subscriber data management (SDM) subscription, the SDM subscription to comprise a measurement for a number of SDM subscribing requests, where the measurement provides the number of SDM subscribing requests received by the UDM.

The apparatus 600 may also include the processor circuitry 602 to generate a subscriber data management related measurement for a subscriber data management (SDM) subscription, the SDM subscription to comprise a measurement for a number of successful SDM subscribings, where the measurement provides the number of successful SDM subscribings at the UDM.

The apparatus 600 may also include the processor circuitry 602 to generate a subscriber data management related measurement for a subscriber data management (SDM) subscription, the SDM subscription to comprise a measurement for a number of failed SDM subscribings, where the measurement provides the number of failed SDM subscribings at the UDM.

The apparatus 600 may also include the processor circuitry 602 to generate a subscriber data management related measurement for a subscription data notification, the subscription data notification to comprise a measurement for a number of subscription data notifications, where the measurement provides the number of subscription data notifications sent by the UDM.

The apparatus 600 may also include the processor circuitry 602 to generate a subscriber data management related measurement for parameter provisioning related measurements, the parameter provisioning related measurements to comprise parameter creations, the parameter creations to comprise a measurement for a number of parameter creation requests, where the measurement provides the number of parameter creation requests received by the UDM.

The apparatus 600 may also include the processor circuitry 602 to generate a subscriber data management related measurement for parameter provisioning related measurements, the parameter provisioning related measurements to comprise parameter creations, the parameter creations to comprise a measurement for a number of successful parameter creations, where the measurement provides the number of successful parameter creations by the UDM.

The apparatus 600 may also include the processor circuitry 602 to generate a subscriber data management related measurement for parameter provisioning related measurements, the parameter provisioning related measurements to comprise parameter creations, the parameter creations to comprise a measurement for a number of failed parameter creations, where the measurement provides the number of failed parameter creations at the UDM.

The apparatus 600 may also include the processor circuitry 602 to generate a subscriber data management related measurement for parameter updates, the parameter updates to comprise a measurement for a number of parameter update requests, where the measurement provides the number of parameter update requests received by the UDM.

The apparatus 600 may also include the processor circuitry 602 to generate a subscriber data management related measurement for parameter updates, the parameter updates to comprise a measurement for a number of successful parameter updates, where the measurement provides the number of successful parameter updates at the UDM.

The apparatus 600 may also include the processor circuitry 602 to generate a subscriber data management related measurement for parameter updates, the parameter updates to comprise a measurement for a number of failed parameter updates, where the measurement provides the number of failed parameter updates at the UDM.

The apparatus 600 may also include the processor circuitry 602 to generate a subscriber data management related measurement for parameter deletion, the parameter deletion to comprise a measurement for a number of parameter deletion requests, where the measurement provides the number of parameter deletion requests received by the UDM.

The apparatus 600 may also include the processor circuitry 602 to generate a subscriber data management related measurement for parameter deletion, the parameter deletion to comprise a measurement for a number of successful parameter deletions, where the measurement provides the number of successful parameter deletions at the UDM.

The apparatus 600 may also include the processor circuitry 602 to generate a subscriber data management related measurement for parameter deletion, the parameter deletion to comprise a measurement for a number of failed parameter deletions, where the measurement provides the number of failed parameter deletions at the UDM.

The apparatus 600 may also include the processor circuitry 602 to generate a subscriber data management related measurement for parameter getting, the parameter getting to comprise a measurement for a number of parameter getting requests, where the measurement provides the number of parameter getting requests received by the UDM.

The apparatus 600 may also include the processor circuitry 602 to generate a subscriber data management related measurement for parameter getting, the parameter getting to comprise a measurement for a number of successful parameter gettings, where the measurement provides the number of successful parameter gettings at the UDM.

The apparatus 600 may also include the processor circuitry 602 to generate a subscriber data management related measurement for parameter getting, the parameter getting to comprise a measurement for a number of failed parameter gettings, where the measurement provides the number of failed parameter gettings at the UDM.

The apparatus 600 may also include where the subscriber data management related measurements are defined in accordance with the 3GPP TS 38.552, Release 17 and beyond.

As previously described with FIGS. 1-7, performance measurements for 5G subscriber data and parameter provisioning in a UDM system as well as performance measurements for 5G or 6G NFs (including 5GC or 6GC) can be collected according to defined use cases and requirements so that the performance of the 5G or 6G UDM and NFs (including 5GC or 6G UDM and NFs) can be monitored. Similarly, performance measurements can be collected according to defined use cases and requirements so that the performance of 5G or 6G deploying edge networks (including 5GC or 6G NFs) can be monitored as well.

Figure 8:
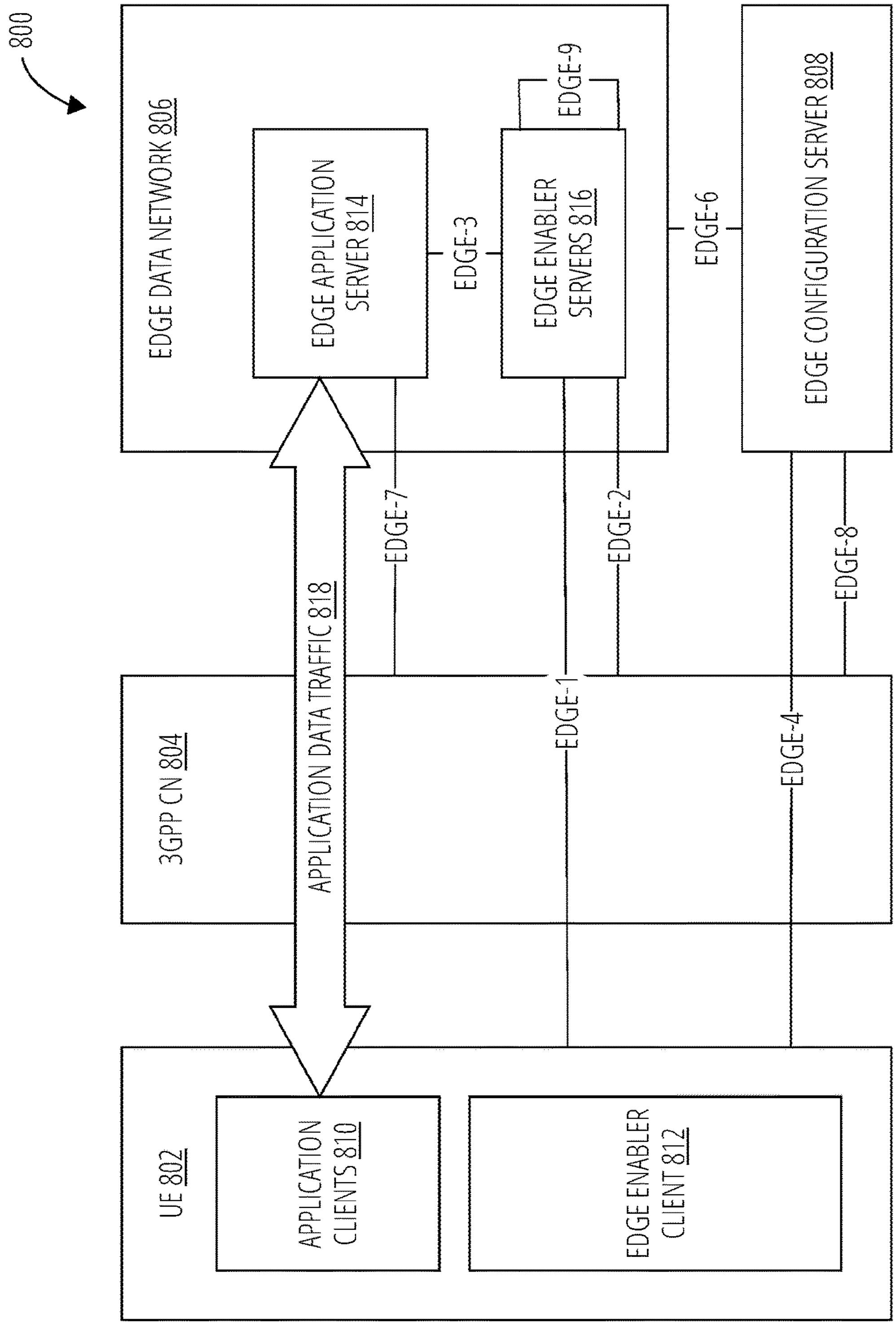
FIG. 8 illustrates an edge network architecture in accordance with one embodiment.

FIG. 8 shows an example of an architecture 800 for enabling edge applications according to various exemplary embodiments. The architecture 800 may be implemented various wireless communications systems. For example, some embodiments implement the architecture 800 in a 3GPP wireless communications system, as defined in 3GPP TS 22.558, to enable the deployment of edge applications. For instance, the architecture 800 will be described with regard to wireless communications system 100 and the network architectures 200*a*, 200*b*. However, the architecture 800 may be implemented in other wireless communications systems as well. Embodiments are not limited in this context.

The architecture 800 provides an example overview of the application layer architecture for enabling edge applications. The architecture 800 includes a UE 802, a 3GPP core network (CN) 804, an edge data network 806, and an edge configuration server 808. The UE 802 may establish a connection to the edge data network 806 via the 3GPP CN 804 and various other components (e.g., a 5G NR RAN node 106 implemented as a gNB in the RAN 112, network functions, etc.). As depicted in FIG. 8, the UE 802 may include one or more application clients (AC) 810 as applications resident in the UE 802 to perform a client function. The edge data network 806 may include one or more edge application servers (EAS) 814. The EAS 814 is an application server resident in the edge data network 806 that operates as a local data network performing the server functions.

In the architecture 800, the various components are shown as being connected via reference points labeled edge-x (e.g., edge-1, edge-2, edge-3, edge-4, edge-5, edge-6, edge-7, edge-8, edge-9, etc.). Those skilled in the art will understand that each of these reference points (e.g., connections, interfaces, etc.) are defined in the 3GPP Specifications. In this description, these reference points may be used in the manner in which they are defined in the 3GPP Specifications and may be modified in accordance with the exemplary embodiments described here. Furthermore, while these interfaces are termed reference points throughout this description, those skilled in the art will understood that these interfaces are not required to be direct wired or wireless connections, e.g., the interfaces may communicate via intervening hardware and/or software components. To provide an example, the UE 802 may exchange signals over the air with a gNB. However, in the architecture 800 the UE 802 is shown as having a direct connection to the edge configuration server 808. Those skilled in the art will understand that this connection is not a direct communication link between the UE 802 and the edge configuration server 808. Instead, this is a connection that is facilitated by intervening hardware and software components. Thus, throughout this description the terms "connection," "reference point" and "interface" may be used interchangeably to describe the interfaces between the various components in the architecture 800 and the wireless communications systems 200*a*, 200*b*.

Once connected, application data traffic 818 may flow between the application clients 810 running on the UE 802 and the edge application server 814 of the edge data network 806. The edge application server 814 may be accessed through the 3GPP CN 804 via uplink classifiers (CL) and branching points (NP) or in any other appropriate manner. Those skilled in the art will understand the variety of different types of operations and configurations relevant to an application client 810 and an edge application server 814.

The UE 802 may include an edge enabler client (EEC) 812. The EEC 812 may be configured to provide supporting functions for the AC 810. For example, the EEC 812 may perform operations related to concepts such as, but not limited to, the discovery of EASs that are available in an edge data network and the retrieval and provisioning of configuration information that may enable the exchange of the application data traffic 818 between the AC 810 and the EAS 814. To differentiate the EEC 812 from other EECs, the EEC 812 may be associated with a globally unique value/ (e.g., EEC ID) that identifies the EEC 812. Further, reference to a single AC 810 and EEC 812 is merely provided for illustrative purposes, the UE 802 may be equipped with any appropriate number of application clients and EECs.

The edge data network 806 may also include an edge enabler server (EES) 816. The EES 816 may be configured to provide supporting functions to the EAS 814 and the EEC 812 running on the UE 802. For example, the EES 814 may perform operations related to concepts such as, but not limited to, provisioning configuration to enable the exchange of the application data traffic 818 between the UE 802 and the EAS 814 and providing information related to the EAS 814 to the EEC 812 running on the UE 802. Those skilled in the art will understand the variety of different types of operations and configurations relevant to an EES. Further, reference to the edge data network 806 including a single EAS 814 and a single EES 816 is merely provided for illustrative purposes. In an actual deployment scenario, an edge data network may include any appropriate EASs and EESs interacting with any number of UEs.

The ECS 808 may be configured to provide supporting functions for the EEC 812 to connect the EES 816. For example, the ECS 808 may perform operations related to concepts such as, but not limited to, provisioning of edge configuration information to the EEC 812. The edge configuration information may include the information for the EEC 812 to connect to the EES 816 (e.g., service area information, etc.) and the information for establishing a connection with the EES 816 (e.g., uniform resource identifier (URI)). Those skilled in the art will understand the variety of different types of operations and configurations relevant to an ECS.

In the network architectures 200*a*, 200*b*, and the enabling architecture 800, the ECS 808 is shown as being outside of the edge data network 806 and the 3GPP CN 804. In addition, the EAS 814 and the EES 816 are shown as being inside of the edge data network 806. However, these examples are merely provided for illustrative purposes. The EAS 814, the EES 816 and the ECS 808 may be deployed in any appropriate virtual and/or physical location (e.g., within the mobile network operator's domain or within a third party domain) and implemented via any appropriate combination of hardware, software and/or firmware.

To improve performance for the edge network architecture 800, a management system such as the systems 300, 400 and 500 can collect performance measurements (e.g., performance measurements 312, performance measurements 412, and/or performance measurements 508) for 5G data and parameter provisioning in the edge network architecture 800 as well as performance measurements for related 5G or 6G NFs (including 5GC or 6GC) according to defined use cases and requirements to monitor performance of the 5G or 6G edge network and NFs (including 5GC or 6G edge network and NFs). In one embodiment, for example, 3GPP TS 28.538 defines requirements for consumers, such as Application Service Provider (ASP), to collect EAS measurements that are used to evaluate EAS performance, as shown in Table 1.

TABLE 1

| | |
|---|---|
| REQ-EAS-PA-FUN-1 | Performance assurance MnS producer should have a capability allowing an authorized consumer to request the collection of EAS KPIs and measurements. |
| REQ-EAS-PA-FUN-2 | Performance assurance MnS producer should have a capability to report EAS KPIs and measurements to authorized consumer(s). |

Embodiments are directed to defining connection data volume measurements for EAS 814, EES 816, and ECS 808, and methods to collect them. Embodiments of this disclosure may be related to 3GPP TS 28.552, v. 17.4.0, 2021-09-23 and beyond. Some embodiments are directed to generating performance measurements for 5GC NFs (including AMF, SMF, UPF, NRF, NEF, PCF, etc.). Among other things, embodiments help improve the functionality of the wireless communications system 100, the network architectures 200*a*, 200*b*, and the edge network architecture 800. In particular, the performance measurements for one or more 5GC NFs are data for monitoring the performance of a 5GC.

Figure 9:
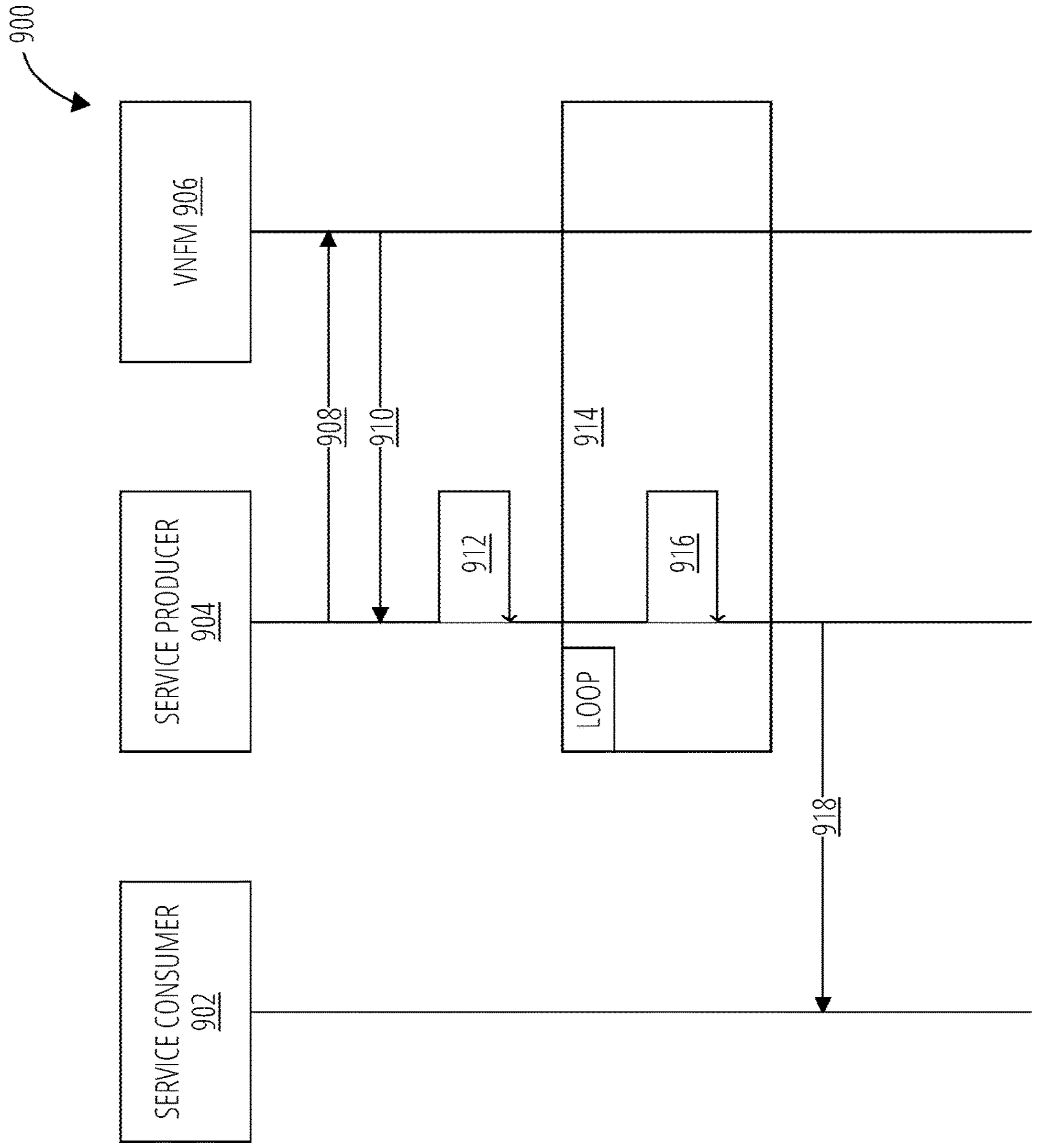
FIG. 9 illustrates a message flow in accordance with one embodiment.

FIG. 9 illustrates an example of a message flow 900 to collect connection data volume measurements for an EAS, an ECS, and/or an EES. In the message flow 900, a measurement job control service producer 904 collects raw performance measurements (e.g., such as raw performance measurements 308, raw performance measurements 310, raw performance measurements 408, raw performance measurements 410, raw performance measurements 506, and/or raw performance measurements 508) from one or more NFs, such as an European Telecommunications Standards Institute (ETSI) network functions virtualization (NFV) Management and Orchestration (MANO) Virtual Network Functions Manager (VNFM) 906, such as defined in the ETSI Group Specification (GS) NFV-MAN 001 titled Network Functions Virtualisation (NFV) Management and Orchestration, Version 1.1.1 (2014-12), including any progeny, revisions and variants, among other wireless standards. The service producer 904 then generates performance measurements (e.g., performance measurements 312, performance measurements 412 and/or performance measurements 508) for the NFs for one or more measurement job control service consumers 902. As shown in FIG. 9, the service producer 904 invokes a message 908 such as a create PmJobRequest (see, e.g., ETSI NFV-IFA-008) to the VNFM 906 in order to create a performance measurement (PM) job to collect VNFC measurements. The service producer 904 receives a message 910 such as a PerformanceInformationAvailableNotification from the VNFM 906 indicating the measurements are ready, and it fetches the measurements. The service producer 904 performs a procedure 912 to map a measured object of received measurement(s) from a VNFC instance to an EAS Function, an EES Function, and an ECS Function of Managed Object Instance (MOI). The service producer 904 and the VNFM 906 continue to generate raw measurement information in a loop of a procedure 916. The service producer 904 aggregates measurements received from the VNFC instance(s) forming a VNF to generate the measurements. The service producer 904 sends a message 918 such as a notify File Ready message to notify the service consumer 902 (e.g., the service consumer ASP) that the performance measurements are ready.

FIG. 10A illustrates an embodiment of a logic flow 1000. The logic flow 1000*a* may be representative of some or all of the operations executed by one or more embodiments described herein. For example, the logic flow 1000*a* may include some or all of the operations performed by devices or entities within the wireless communications system 100, the network architectures 200*a*, 200*b* such as the CN 220, the system 300, the system 400, the system 500, the apparatus 600, or the edge network architecture 800. More particularly, the logic flow 1000*a* illustrates a use case where the service producer 904 generates performance measurements, such as performance measurements 508, for edge network related measurements. Embodiments are not limited in this context.

In block 1002, logic flow 1000*a* obtains raw measurements of network functions communicatively coupled to one another via service based management interfaces of a 5GS, wherein one of the network functions is a virtualized network function with a virtualized resource (VR) to support edge computing. In block 1004, logic flow 1000*a* generates performance measurements corresponding to one or more network functions based on the raw measurements, wherein the performance measurements are related to VR usage related measurements for the virtualized network function. In block 1006, logic flow 1000*a* reports the VR usage related measurements to a service consumer.

The performance measurements 508 implemented as edge network related measurements may be defined in accordance with one or more 3GPP standards. Some embodiments comprise performance measurements 508 as defined in accordance with the 3GPP TS 28.552 titled "Technical Specification Group Services and System Aspects; Management and orchestration; 5G performance measurements," version 17.7.1 (2022-06), including any progeny, revisions and variants, among other 3GPP and non-3GPP wireless standards. The performance measurements 508 may be defined in clause 5.7 titled "Common performance measurements for NFs" from 5.7.1 titled "VR usage of NF" to 5.7.1.3.1 titled "Mean virtual disk usage" of the 3GPP TS 28.552. Related KPIs are defined to the performance measurements 508 are defined in 3GPP TS 28.554. The performance measurements 508 may be defined, for example, based on the measurement template as described in 3GPP TS 32.404. Each clause (or section) is reproduced in the following paragraphs.

| | |
|---|---|
| 5.7 | Common performance measurements for NFs |
| 5.7.1 | VR usage of NF |
| 5.7.1.1 | Virtual CPU usage |
| 5.7.1.1.1 | Mean virtual CPU usage |

a) This measurement provides the mean usage of the underlying virtualized CPUs for a virtualized 3GPP NF. This measurement is not applicable to the scenario that one VNFC instance supports more than 1 NFs.
b) OM.
c) The measurement job control service producer for NF(s) receives the Vcpu UsageMean Vnf.vComputeId measurement(s) (see ETSI GS IFA 027 [17]) for the VNFC instances(s) from VNFM, and maps the measured object of each received measurement from VNFC instance to the MOI(s) of NF(s). The measurement is generated by taking the weighted average of the values of the VcpuUsageMean Vnf.vComputeId measurement(s) whose measured object(s) are mapped to the MOI of the measured NF. The algorithm of the weighted average is vendor specific.
d) A single integer value (Unit: %).
e) VR. VCpuUsageMean
f) GNBCUCPFunction (for 3 split scenario) GNBCUUPFunction (for 3 split scenario) GNBCUFunction (for 2 split scenario) AMFFunction SMFFunction UPFFunction N3IWFFunction PCFFunction AUSFFunction UDMFunction UDRFunction UDSFFunction NRFFunction NSSFFunction SMSFFunction LMFFunction NWDAFFunction NGEIRFunction SEPPFunction EASFunction EESFunction ECSFunction
g) Valid for packet switched traffic.
h) 5GS.

| | |
|---|---|
| 5.7.1.2 | Virtual memory usage |
| 5.7.1.2.1 | Mean virtual memory usage |

a) This measurement provides the mean usage of the underlying virtualized memories for a virtualized 3GPP NF. This measurement is not applicable to the scenario that one VNFC instance supports more than 1 NFs.
b) OM.
c) The measurement job control service producer for NF(s) receives the Vmemory UsageMean Vnf.vComputeId measurement(s) (see ETSI GS IFA 027 [17]) for the VNFC instances(s) from VNFM, and maps the measured object of each received measurement from VNFC instance to the MOI(s) of NF(s). The measurement is generated by taking the weighted average of the values of the VmemoryUsageMeanVnf.vComputeId measurement(s) whose measured object(s) are mapped to the MOI of the measured NF. The algorithm of the weighted average is vendor specific.
d) A single integer value (Unit: %).
e) VR. VMemoryUsageMean
f) GNBCUCPFunction (for 3 split scenario) GNBCUUPFunction (for 3 split scenario) GNBCUFunction (for 2 split scenario) AMFFunction SMFFunction UPFFunction N3IWFFunction PCFFunction AUSFFunction UDMFunction UDRFunction UDSFFunction NRFFunction NSSFFunction SMSFFunction LMFFunction NWDAFFunction NGEIRFunction SEPPFunction EASFunction EESFunction ECSFunction
g) Valid for packet switched traffic.
h) 5GS.

5.7.1.3 Virtual disk usage
5.7.1.3.1 Mean virtual disk usage
a) This measurement provides the mean usage of the underlying virtualized disks for a virtualized 3GPP NF. This measurement is not applicable to the scenario that one VNFC instance supports more than 1 NFs.
b) OM.
c) The measurement job control service producer for NF(s) receives the VdiskUsageMean Vnf.vComputeId measurement(s) (see ETSI GS IFA 027 [17]) for the VNFC instances(s) from VNFM, and maps the measured object of each received measurement from VNFC instance to the MOI(s) of NF(s). The measurement is generated by taking the weighted average of the values of the VdiskUsageMean Vnf.vComputeId measurement(s) whose measured object(s) are mapped to the MOI of the measured NF. The algorithm of the weighted average is vendor specific.
d) A single integer value (Unit: %).
e) VR. VDiskUsageMean
f) GNBCUCPFunction (for 3 split scenario) GNBCUUPFunction (for 3 split scenario) GNBCUFunction (for 2 split scenario) AMFFunction SMFFunction UPFFunction N3IWFFunction PCFFunction AUSFFunction UDMFunction UDRFunction UDSFFunction NRFFunction NSSFFunction SMSFFunction LMFFunction NWDAFFunction NGEIRFunction SEPPFunction EASFunction EESFunction ECSFunction
g) Valid for packet switched traffic.
h) 5GS.

Referring again to FIG. 6, the apparatus 600 may implement the logic flow 1000*a* for a network device (e.g., a UE, a gNB, a CN 220, a UDM 227, a UDM 502, a service consumer 902, a service producer 904, a VNFM 906, a 5GC component or the like) can process, generate, or monitor performance parameters for a communication via a 5G network core (5GC) of a 5G network system (5GS).

An apparatus 600 for a network management component of a 5GC or a 5GS, may be implemented as part of a service producer 904. The apparatus 600 may comprise a memory interface 606 to send or receive, to or from a data storage device 608, one or more performance measurements 508 related to one or more network functions supporting edge computing; and processor circuitry 602 communicatively coupled to the memory interface 606, the processor circuitry 602 to obtain raw measurements (e.g., such as raw performance measurements 308, raw performance measurements 310, raw performance measurements 408, raw performance measurements 410, raw performance measurements 506, and/or raw performance measurements 508) of network functions communicatively coupled to one another via service based management interfaces of a 5GS, wherein one of the network functions is a virtualized network function with a virtualized resource (VR). The processor circuitry 602 may generate performance measurements (e.g., performance measurements 312, performance measurements 412 and/or performance measurements 508) corresponding to one or more network functions based on the raw measurements, wherein the performance measurements 508 are related to VR usage related measurements for the virtualized network function. The processor circuitry 602 may report the VR usage related measurements to a service consumer (e.g., service consumers 314, service consumers 414, service consumers 510 and/or service consumer 902).

The apparatus 600 may further comprise a RF interface configured to provide, to RF circuitry of a transceiver circuitry 604, data for transmitting a communication of the report based on the performance measurements 508.

Where the VR is a virtual central processing unit (CPU), the processor circuitry 602 may generate a VR usage related measurement for virtual CPU usage, the virtual CPU usage to comprise a measurement for a mean virtual CPU usage, wherein the measurement provides a mean usage of the virtual CPU for the virtualized network function.

Where the VR is a virtual memory, the processor circuitry 602 may generate a VR usage related measurement for virtual memory usage, the virtual memory usage to comprise a measurement for a mean virtual memory usage, wherein the measurement provides a mean usage of the virtual memory for the virtualized network function.

Where the VR is a virtual disk, the processor circuitry 602 may generate a VR usage related measurement for virtual disk usage, the virtual disk usage to comprise a measurement for a mean virtual disk usage, wherein the measurement provides a mean usage of the virtual disk for the virtualized network function.

Where the VR is a virtual disk, the processor circuitry 602 may generate a VR usage related measurement for virtual disk usage, the virtual disk usage to comprise a measurement for a mean virtual disk usage, wherein the measurement provides a mean usage of the virtual disk for the virtualized network function.

FIG. 10B illustrates an embodiment of a logic flow 1000*b*. The logic flow 1000*b* may be representative of some or all of the operations executed by one or more embodiments described herein. For example, the logic flow 1000*b* my include some or all of the operations performed by devices or entities within the wireless communications system 100, the network architectures 200*a*, 200*b* such as the CN 220, the system 300, the system 400, the system 500, the apparatus 600, or the edge network architecture 800. More particularly, the logic flow 1000*b* illustrates a use case where the service producer 904 generates performance measurements, such as performance measurements 508, for edge network related measurements. Embodiments are not limited in this context.

In block 1008, logic flow 1000*b* obtains raw measurements of network functions communicatively coupled to one another via service based management interfaces of a 5GS, wherein one of the network functions is performed by an EAS in an edge data network. In block 1010, logic flow 1000*b* generates performance measurements corresponding to one or more network functions based on the raw measurements, wherein the performance measurements are related to connection data volume related measurements for the network function performed by the EAS. In block 1012, logic flow 1000*b* reports the connection data volume related measurements to a service consumer.

The performance measurements 508 implemented as edge network related measurements may be defined in accordance with one or more 3GPP standards. Some embodiments comprise performance measurements 508 as defined in accordance with the 3GPP TS 28.552 titled "Technical Specification Group Services and System Aspects; Management and orchestration; 5G performance measurements," version 17.7.1 (2022-06), including any progeny, revisions and variants, among other 3GPP and non-3GPP wireless standards. The performance measurements 508 may be defined in clause 5.7 titled "Common performance measurements for NFs" from 5.7.2 titled "Connection data volumes of NF" to 5.7.2.3 titled "Data volume of Outgoing packets to EAS" of the 3GPP TS 28.552. Related KPIs are defined to the performance measurements 508 are defined in 3GPP TS 28.554. The performance measurements 508 may be defined, for example, based on the measurement template as described in 3GPP TS 32.404. Each clause (or section) is reproduced in the following paragraphs.

5.7.2 Connection data volumes of NF 5.7.2.1 Data volume of incoming bytes to EAS a) This measurement provides the number of incoming bytes received by the EAS (Edge Application Server) in edge data networks.
b) OM.
c) The measurement job control service producer for NF(s) receives the ByteIncoming VnfExtCp measurement(s) (see ETSI GS IFA 027 [17]) for the VNFC instances(s) supporting the EAS VNF from VNFM, and maps the measured object of received measurement(s) from VNFC instance to the EASFunction MOI [50]. The measurement is generated by aggregating the values of the ByteIncoming VnfExtCp measurement(s).

d) A single integer value.
e) DataVolum.InBytesEAS
f) EASFunction
g) Valid for packet switched traffic.
h) 5GS.

5.7.2.2 Data volume of outgoing bytes from EAS a) This measurement provides the number of outgoing bytes transmitted from the EAS in edge data networks.
b) OM.
c) The measurement job control service producer for NF(s) receives the Byte Outgoing VnfExtCp measurement(s) (see ETSI GS IFA 027 [17]) for the VNFC instances(s) supporting the EAS VNF from VNFM, and maps the measured object of received measurement(s) from VNFC instance to the EASFunction MOI. The measurement is generated by aggregating the values of the ByteOutgoing VnfExtCp measurement(s).
d) A single integer value.
e) DataVolum.OutBytesEAS
f) EASFunction
g) Valid for packet switched traffic.
h) 5GS.

5.7.2.3 Data volume of incoming packets to EAS a) This measurement provides the number of incoming packets received by the EAS in edge data networks.
b) OM.
c) The measurement job control service producer for NF(s) receives the PacketIncoming VnfExtCp measurement(s) (see ETSI GS IFA 027 [17]) for the VNFC instances(s) supporting the EAS VNF from VNFM, and maps the measured object of received measurement(s) from VNFC instance to the EASFunction MOI. The measurement is generated by aggregating the values of the PacketIncomingVnfExtCp measurement(s).

d) A single integer value.
e) DataVolum. InPacketsEAS
f) EASFunction
g) Valid for packet switched traffic.
h) 5GS.

5.7.2.4 Data volume of Outgoing packets to EAS a) This measurement provides the number of outgoing packets received by the EAS in edge data networks.
b) OM.
c) The measurement job control service producer for NF(s) receives the PacketOutgoingVnfExtCp measurement(s) (see ETSI GS IFA 027 [17]) for the VNFC instances(s) supporting the EAS VNF from VNFM, and maps the measured object of received measurement(s) from VNFC instance to the EASFunction MOI. The measurement is generated by aggregating the values of the PacketOutgoingVnfExtCp measurement(s).

d) A single integer value.

e) DataVolum. OutPacketsEAS f) EASFunction g) Valid for packet switched traffic.

h) 5GS.

Referring again to FIG. 6, the apparatus 600 may implement the logic flow 1000*b* for a network device (e.g., a UE, a gNB, a CN 220, a UDM 227, a UDM 502, a service consumer 902, a service producer 904, a VNFM 906, a 5GC component or the like) can process, generate, or monitor performance parameters for a communication via a 5G network core (5GC) of a 5G network system (5GS).

An apparatus 600 for a network management component of a 5GC or a 5GS, such as a service producer 904, the apparatus 600 to include a memory interface 606 to send or receive, to or from a data storage device 608, one or more performance measurements 508 related to one or more network functions supporting edge computing, and processor circuitry 602 communicatively coupled to the memory interface 606, the processor circuitry 602 to obtain raw measurements (e.g., such as raw performance measurements 308, raw performance measurements 310, raw performance measurements 408, raw performance measurements 410, raw performance measurements 506, and/or raw performance measurements 508) of network functions communicatively coupled to one another via service based management interfaces of a 5GS, wherein one of the network functions is performed an EAS 814 in an edge data network 806. The processor circuitry 602 may generate performance measurements (e.g., performance measurements 312, performance measurements 412 and/or performance measurements 508) corresponding to one or more network functions based on the raw measurements, wherein the performance measurements are related to connection data volume related measurements for the network function performed by an EAS, such as the EAS 814, for example. The processor circuitry 602 may report the connection data volume related measurements to a service consumer (e.g., service consumers 314, service consumers 414, service consumers 510, and/or service consumer 902).

The apparatus 600 may further comprise a RF interface configured to provide, to RF circuitry of a transceiver circuitry 604, data for transmitting a communication of the report based on the performance measurements 508.

In the apparatus 600, the processor circuitry may generate a connection data volume related measurement for connection data volumes of a network function, the connection data volumes of a network function to comprise a measurement for a data volume of incoming bytes to the EAS, wherein the measurement provides a number of incoming bytes received by the EAS in the edge data network.

In the apparatus 600, the processor circuitry 602 may generate a connection data volume related measurement for connection data volumes of a network function, the connection data volumes of a network function to comprise a measurement for a data volume of outgoing bytes to the EAS, wherein the measurement provides a number of outgoing bytes transmitted from the EAS in the edge data network.

In the apparatus 600, the processor circuitry 602 may generate a connection data volume related measurement for connection data volumes of a network function, the connection data volumes of a network function to comprise a measurement for a data volume of incoming packets to the EAS, wherein the measurement provides a number of incoming packets received by the EAS in the edge data network.

In the apparatus 600, the processor circuitry 602 may generate a connection data volume related measurement for connection data volumes of a network function, the connection data volumes of a network function to comprise a measurement for a data volume of outgoing packets to the EAS, wherein the measurement provides a number of outgoing packets received by the EAS in the edge data network.

In the apparatus 600, the processor circuitry 602 may generate a connection data volume related measurement for connection data volumes of a network function, the connection data volumes of a network function to comprise a measurement for a data volume of outgoing packets to the EAS, wherein the measurement provides a number of outgoing packets transmitted from the EAS in the edge data network.

In the apparatus 600, the connection data volume related measurements for the network function performed by the EAS are applicable to an edge enabler server (EES) or an edge configuration server (ECS), the processor circuitry to map a measured object of a virtual network function (VNF) component (VNFC) measurement to an EES function or an ECS function 3GPP managed object instance (MOI) and/or an Managed Object Instance (MOI), respectively.

FIGS. 11-14 illustrate various systems, devices and components that may implement aspects of disclosed embodiments. The systems, devices, and components may be the same, or similar to, the systems, device and components described with reference to FIGS. 1-10.

Figure 11:
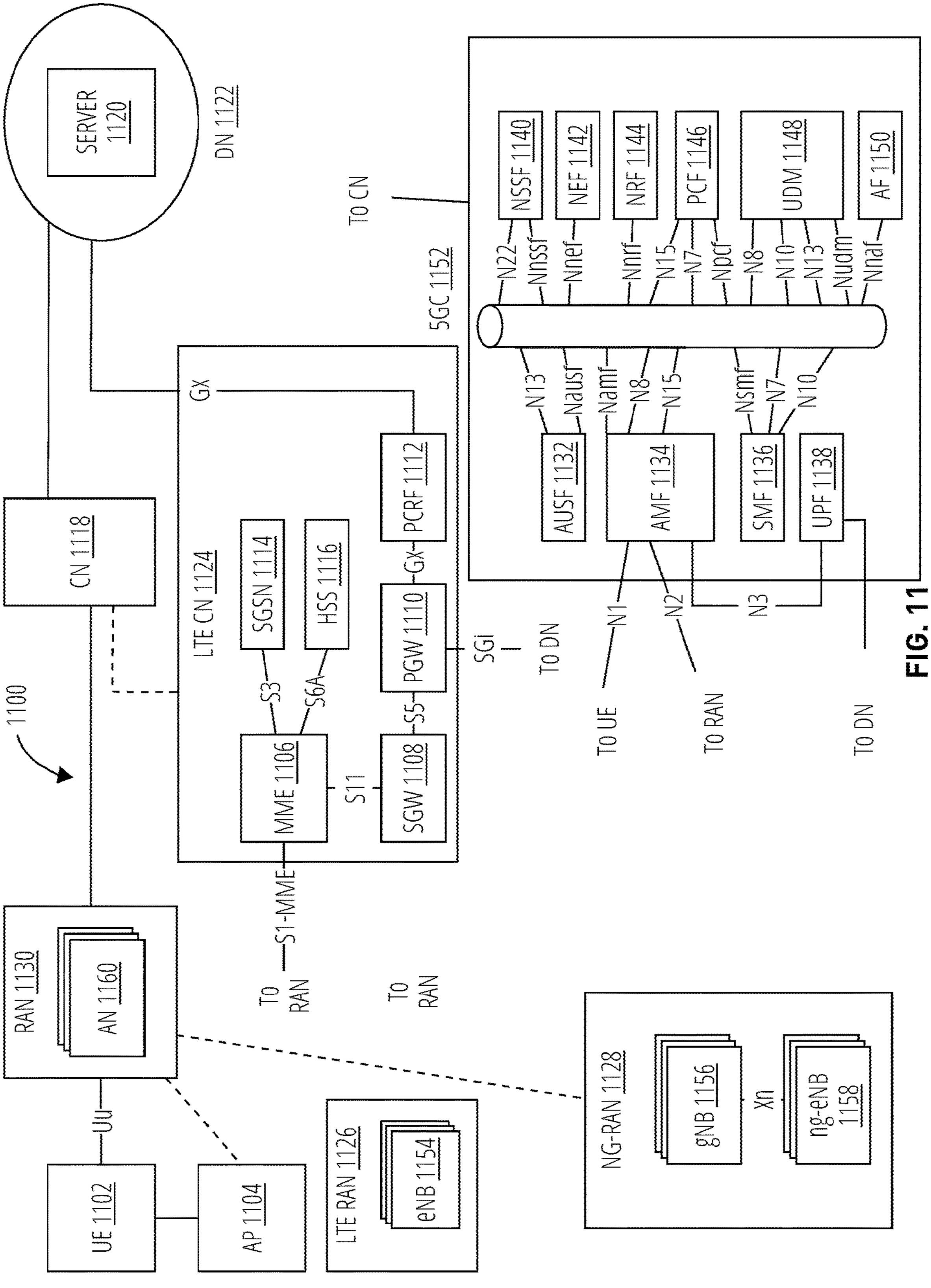
FIG. 11 illustrates wireless network in accordance with one embodiment.

FIG. 11 illustrates a network 1100 in accordance with various embodiments. The network 1100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1100 may include a UE 1102, which may include any mobile or non-mobile computing device designed to communicate with a RAN 1130 via an over-the-air connection. The UE 1102 may be communicatively coupled with the RAN 1130 by a Uu interface. The UE 1102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1102 may additionally communicate with an AP 1104 via an over-the-air connection. The AP 1104 may manage a WLAN connection, which may serve to offload some/all network traffic from the RAN 1130. The connection between the UE 1102 and the AP 1104 may be consistent with any IEEE 1102.11 protocol, wherein the AP 1104 could be a wireless fidelity (Wi-Fi®) router. In some embodiments, the UE 1102, RAN 1130, and AP 1104 may utilize cellular-WLAN aggregation (for example, LWA/LWIP). Cellular-WLAN aggregation may involve the UE 1102 being configured by the RAN 1130 to utilize both cellular radio resources and WLAN resources.

The RAN 1130 may include one or more access nodes, for example, AN 1160. AN 1160 may terminate air-interface protocols for the UE 1102 by providing access stratum protocols including RRC, PDCP, RLC, MAC, and LI protocols. In this manner, the AN 1160 may enable data/voice connectivity between CN 1118 and the UE 1102. In some embodiments, the AN 1160 may be implemented in a discrete device or as one or more software entities running on server computers as part of, for example, a virtual network, which may be referred to as a CRAN or virtual baseband unit pool. The AN 1160 be referred to as a BS, gNB, RAN node, eNB, ng-eNB, NodeB, RSU, TRxP, TRP, etc. The AN 1160 may be a macrocell base station or a low power base station for providing femtocells, picocells or other like cells having smaller coverage areas, smaller user capacity, or higher bandwidth compared to macrocells.

In embodiments in which the RAN 1130 includes a plurality of ANs, they may be coupled with one another via an X2 interface (if the RAN 1130 is an LTE RAN) or an Xn interface (if the RAN 1130 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1130 may each manage one or more cells, cell groups, component carriers, etc. to provide the UE 1102 with an air interface for network access. The UE 1102 may be simultaneously connected with a plurality of cells provided by the same or different ANs of the RAN 1130. For example, the UE 1102 and RAN 1130 may use carrier aggregation to allow the UE 1102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1130 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1102 or AN 1160 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1130 may be an LTE RAN 1126 with eNBs, for example, eNB 1154. The LTE RAN 1126 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1130 may be an NG-RAN 1128 with gNBs, for example, gNB 1156, or ng-eNBs, for example, ng-eNB 1158. The gNB 1156 may connect with 5G-enabled UEs using a 5G NR interface. The gNB 1156 may connect with a 5G core through an NG interface, which may include an N2 interface or an N3 interface. The ng-eNB 1158 may also connect with the 5G core through an NG interface, but may connect with a UE via an LTE air interface. The gNB 1156 and the ng-eNB 1158 may connect with each other over an Xn interface.

In some embodiments, the NG interface may be split into two parts, an NG user plane (NG-U) interface, which carries traffic data between the nodes of the NG-RAN 1128 and a UPF 1138 (e.g., N3 interface), and an NG control plane (NG-C) interface, which is a signaling interface between the nodes of the NG-RAN 1128 and an AMF 1134 (e.g., N2 interface).

The NG-RAN 1128 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FRI bands that include sub-6 GHz bands or FR2 bands that include bands from 24.25 GHz to 52.6 GHZ. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1102 can be configured with multiple BWPs where each BWP configuration has a different SCS. When a BWP change is indicated to the UE 1102, the SCS of the transmission is changed as well. Another use case example of BWP is related to power saving. In particular, multiple BWPs can be configured for the UE 1102 with different amount of frequency resources (for example, PRBs) to support data transmission under different traffic loading scenarios. A BWP containing a smaller number of PRBs can be used for data transmission with small traffic load while allowing power saving at the UE 1102 and in some cases at the gNB 1156. A BWP containing a larger number of PRBs can be used for scenarios with higher traffic load.

The RAN 1130 is communicatively coupled to CN 1118 that includes network elements to provide various functions to support data and telecommunications services to customers/subscribers (for example, users of UE 1102). The components of the CN 1118 may be implemented in one physical node or separate physical nodes. In some embodiments, NFV may be utilized to virtualize any or all of the functions provided by the network elements of the CN 1118 onto physical compute/storage resources in servers, switches, etc. A logical instantiation of the CN 1118 may be referred to as a network slice, and a logical instantiation of a portion of the CN 1118 may be referred to as a network sub-slice.

In some embodiments, the CN 1118 may be an LTE CN 1124, which may also be referred to as an EPC. The LTE CN 1124 may include MME 1106, SGW 1108, SGSN 1114, HSS 1116, PGW 1110, and PCRF 1112 coupled with one another over interfaces (or "reference points") as shown. Functions of the elements of the LTE CN 1124 may be briefly introduced as follows.

The MME 1106 may implement mobility management functions to track a current location of the UE 1102 to facilitate paging, bearer activation/deactivation, handovers, gateway selection, authentication, etc.

The SGW 1108 may terminate an S1 interface toward the RAN and route data packets between the RAN and the LTE CN 1124. The SGW 1108 may be a local mobility anchor point for inter-RAN node handovers and also may provide an anchor for inter-3GPP mobility. Other responsibilities may include lawful intercept, charging, and some policy enforcement.

The SGSN 1114 may track a location of the UE 1102 and perform security functions and access control. In addition, the SGSN 1114 may perform inter-EPC node signaling for mobility between different RAT networks; PDN and S-GW selection as specified by MME 1106; MME selection for handovers; etc. The S3 reference point between the MME 1106 and the SGSN 1114 may enable user and bearer information exchange for inter-3GPP access network mobility in idle/active states.

The HSS 1116 may include a database for network users, including subscription-related information to support the network entities' handling of communication sessions. The HSS 1116 can provide support for routing/roaming, authentication, authorization, naming/addressing resolution, location dependencies, etc. An S6a reference point between the HSS 1116 and the MME 1106 may enable transfer of subscription and authentication data for authenticating/authorizing user access to the LTE CN 1118.

The PGW 1110 may terminate an SGi interface toward a data network (DN) 1122 that may include an application/content server 1120. The PGW 1110 may route data packets between the LTE CN 1124 and the data network 1122. The PGW 1110 may be coupled with the SGW 1108 by an S5 reference point to facilitate user plane tunneling and tunnel management. The PGW 1110 may further include a node for policy enforcement and charging data collection (for example, PCEF). Additionally, the SGi reference point between the PGW 1110 and the data network 1122 may be an operator external public, a private PDN, or an intra-operator packet data network, for example, for provision of IMS services. The PGW 1110 may be coupled with a PCRF 1112 via a Gx reference point.

The PCRF 1112 is the policy and charging control element of the LTE CN 1124. The PCRF 1112 may be communicatively coupled to the app/content server 1120 to determine appropriate QoS and charging parameters for service flows. The PCRF 1110 may provision associated rules into a PCEF (via Gx reference point) with appropriate TFT and QCI.

In some embodiments, the CN 1118 may be a 5GC 1152. The 5GC 1152 may include an AUSF 1132, AMF 1134, SMF 1136, UPF 1138, NSSF 1140, NEF 1142, NRF 1144, PCF 1146, UDM 1148, and AF 1150 coupled with one another over interfaces (or "reference points") as shown. Functions of the elements of the 5GC 1152 may be briefly introduced as follows.

The AUSF 1132 may store data for authentication of UE 1102 and handle authentication-related functionality. The AUSF 1132 may facilitate a common authentication framework for various access types. In addition to communicating with other elements of the 5GC 1152 over reference points as shown, the AUSF 1132 may exhibit an Nausf service-based interface.

The AMF 1134 may allow other functions of the 5GC 1152 to communicate with the UE 1102 and the RAN 1130 and to subscribe to notifications about mobility events with respect to the UE 1102. The AMF 1134 may be responsible for registration management (for example, for registering UE 1102), connection management, reachability management, mobility management, lawful interception of AMF-related events, and access authentication and authorization. The AMF 1134 may provide transport for SM messages between the UE 1102 and the SMF 1136, and act as a transparent proxy for routing SM messages. AMF 1134 may also provide transport for SMS messages between UE 1102 and an SMSF. AMF 1134 may interact with the AUSF 1132 and the UE 1102 to perform various security anchor and context management functions. Furthermore, AMF 1134 may be a termination point of a RAN CP interface, which may include or be an N2 reference point between the RAN 1130 and the AMF 1134; and the AMF 1134 may be a termination point of NAS (N1) signaling, and perform NAS ciphering and integrity protection. AMF 1134 may also support NAS signaling with the UE 1102 over an N3 IWF interface.

The SMF 1136 may be responsible for SM (for example, session establishment, tunnel management between UPF 1138 and AN 1160); UE IP address allocation and management (including optional authorization); selection and control of UP function; configuring traffic steering at UPF 1138 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1134 over N2 to AN 1160; and determining SSC mode of a session. SM may refer to management of a PDU session, and a PDU session or "session" may refer to a PDU connectivity service that provides or enables the exchange of PDUs between the UE 1102 and the data network 1122.

The UPF 1138 may act as an anchor point for intra-RAT and inter-RAT mobility, an external PDU session point of interconnect to data network 1122, and a branching point to support multi-homed PDU session. The UPF 1138 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1138 may include an uplink classifier to support routing traffic flows to a data network.

The NSSF 1140 may select a set of network slice instances serving the UE 1102. The NSSF 1140 may also determine allowed NSSAI and the mapping to the subscribed S-NSSAIs, if needed. The NSSF 1140 may also determine the AMF set to be used to serve the UE 1102, or a list of candidate AMFs based on a suitable configuration and possibly by querying the NRF 1144. The selection of a set of network slice instances for the UE 1102 may be triggered by the AMF 1134 with which the UE 1102 is registered by interacting with the NSSF 1140, which may lead to a change of AMF. The NSSF 1140 may interact with the AMF 1134 via an N22 reference point; and may communicate with another NSSF in a visited network via an N31 reference point (not shown). Additionally, the NSSF 1140 may exhibit an Nnssf service-based interface.

The NEF 1142 may securely expose services and capabilities provided by 3GPP network functions for third party, internal exposure/re-exposure, AFs (e.g., AF 1150), edge computing or fog computing systems, etc. In such embodiments, the NEF 1142 may authenticate, authorize, or throttle the AFs. NEF 1142 may also translate information exchanged with the AF 1150 and information exchanged with internal network functions. For example, the NEF 1142 may translate between an AF-Service-Identifier and an internal 5GC information. NEF 1142 may also receive information from other NFs based on exposed capabilities of other NFs. This information may be stored at the NEF 1142 as structured data, or at a data storage NF using standardized interfaces. The stored information can then be re-exposed by the NEF 1142 to other NFs and AFs, or used for other purposes such as analytics. Additionally, the NEF 1142 may exhibit an Nnef service-based interface.

The NRF 1144 may support service discovery functions, receive NF discovery requests from NF instances, and provide the information of the discovered NF instances to the NF instances. NRF 1144 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1144 may exhibit the Nnrf service-based interface.

The PCF 1146 may provide policy rules to control plane functions to enforce them, and may also support unified policy framework to govern network behavior. The PCF 1146 may also implement a front end to access subscription information relevant for policy decisions in a UDR of the UDM 1148. In addition to communicating with functions over reference points as shown, the PCF 1146 exhibit an Npcf service-based interface.

The UDM 1148 may handle subscription-related information to support the network entities' handling of communication sessions, and may store subscription data of UE 1102. For example, subscription data may be communicated via an N8 reference point between the UDM 1148 and the AMF 1134. The UDM 1148 may include two parts, an application front end and a UDR. The UDR may store subscription data and policy data for the UDM 1148 and the PCF 1146, and/or structured data for exposure and application data (including PFDs for application detection, application request information for multiple UEs 1102) for the NEF 1142. The Nudr service-based interface may be exhibited by the UDR 221 to allow the UDM 1148, PCF 1146, and NEF 1142 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1148 may exhibit the Nudm service-based interface.

The AF 1150 may provide application influence on traffic routing, provide access to NEF, and interact with the policy framework for policy control.

In some embodiments, the 5GC 1152 may enable edge computing by selecting operator/3rd party services to be geographically close to a point that the UE 1102 is attached to the network. This may reduce latency and load on the network. To provide edge-computing implementations, the 5GC 1152 may select a UPF 1138 close to the UE 1102 and execute traffic steering from the UPF 1138 to data network 1122 via the N6 interface. This may be based on the UE subscription data, UE location, and information provided by the AF 1150. In this way, the AF 1150 may influence UPF (re)selection and traffic routing. Based on operator deployment, when AF 1150 is considered to be a trusted entity, the network operator may permit AF 1150 to interact directly with relevant NFs. Additionally, the AF 1150 may exhibit an Naf service-based interface.

The data network 1122 may represent various network operator services, Internet access, or third party services that may be provided by one or more servers including, for example, application/content server 1120.

Figure 12:
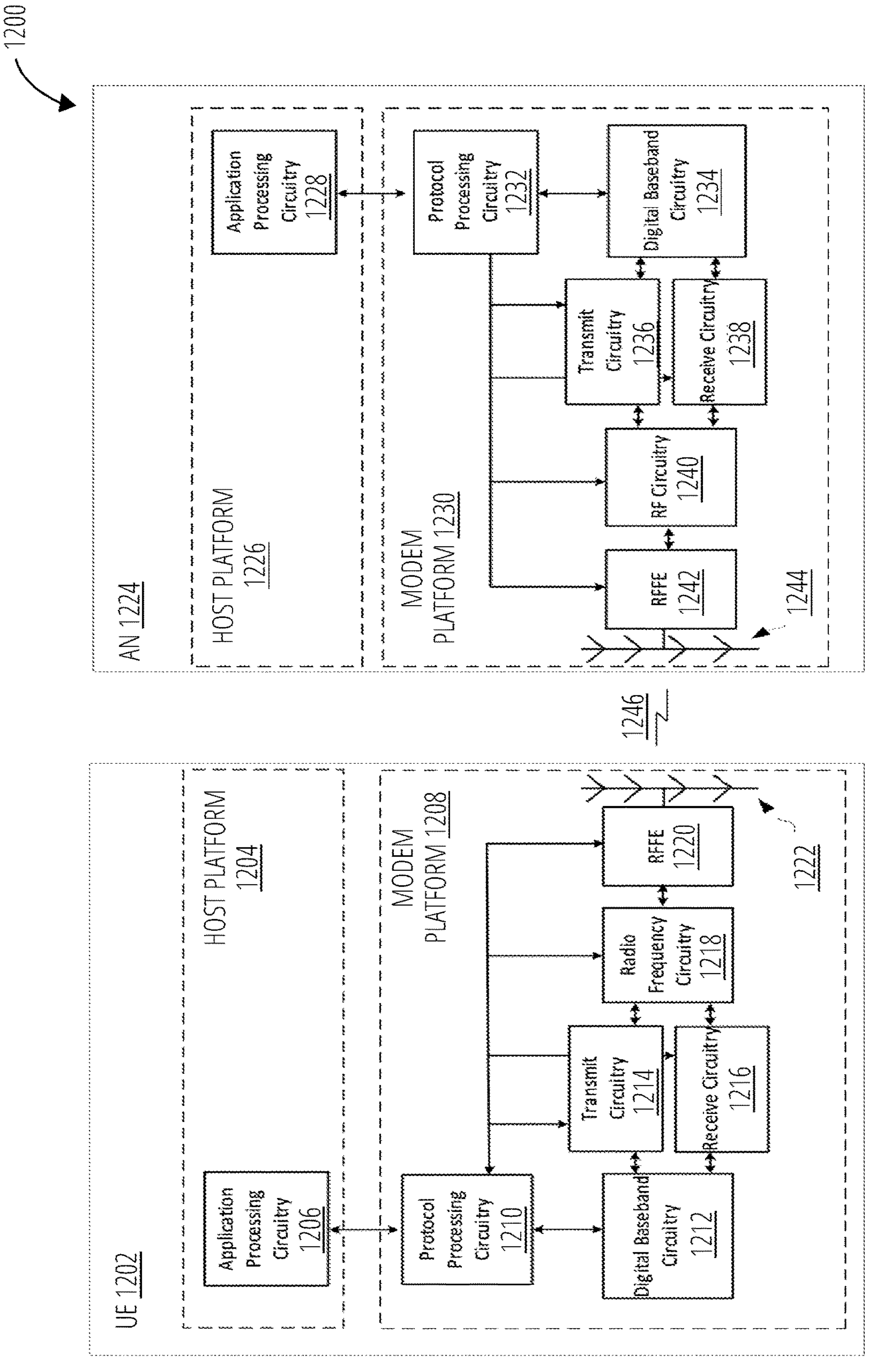
FIG. 12 illustrates wireless network in accordance with one embodiment.

FIG. 12 schematically illustrates a wireless network 1200 in accordance with various embodiments. The wireless network 1200 may include a UE 1202 in wireless communication with an AN 1224. The UE 1202 and AN 1224 may be similar to, and substantially interchangeable with, like-named components described elsewhere herein.

The UE 1202 may be communicatively coupled with the AN 1224 via connection 1246. The connection 1246 is illustrated as an air interface to enable communicative coupling, and can be consistent with cellular communications protocols such as an LTE protocol or a 5G NR protocol operating at mmWave or sub-6 GHZ frequencies.

The UE 1202 may include a host platform 1204 coupled with a modem platform 1208. The host platform 1204 may include application processing circuitry 1206, which may be coupled with protocol processing circuitry 1210 of the modem platform 1208. The application processing circuitry 1206 may run various applications for the UE 1202 that source/sink application data. The application processing circuitry 1206 may further implement one or more layer operations to transmit/receive application data to/from a data network. These layer operations may include transport (for example UDP) and Internet (for example, IP) operations The protocol processing circuitry 1210 may implement one or more of layer operations to facilitate transmission or reception of data over the connection 1246. The layer operations implemented by the protocol processing circuitry 1210 may include, for example, MAC, RLC, PDCP, RRC and NAS operations.

The modem platform 1208 may further include digital baseband circuitry 1212 that may implement one or more layer operations that are "below" layer operations performed by the protocol processing circuitry 1210 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1208 may further include transmit circuitry 1214, receive circuitry 1216, RF circuitry 1218, and RF front end (RFFE) 1220, which may include or connect to one or more antenna panels 1222. Briefly, the transmit circuitry 1214 may include a digital-to-analog converter, mixer, intermediate frequency (IF) components, etc.; the receive circuitry 1216 may include an analog-to-digital converter, mixer, IF components, etc.; the RF circuitry 1218 may include a low-noise amplifier, a power amplifier, power tracking components, etc.; RFFE 1220 may include filters (for example, surface/bulk acoustic wave filters), switches, antenna tuners, beamforming components (for example, phase-array antenna components), etc. The selection and arrangement of the components of the transmit circuitry 1214, receive circuitry 1216, RF circuitry 1218, RFFE 1220, and antenna panels 1222 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1210 may include one or more instances of control circuitry (not shown) to provide control functions for the transmit/receive components.

A UE reception may be established by and via the antenna panels 1222, RFFE 1220, RF circuitry 1218, receive circuitry 1216, digital baseband circuitry 1212, and protocol processing circuitry 1210. In some embodiments, the antenna panels 1222 may receive a transmission from the AN 1224 by receive-beamforming signals received by a plurality of antennas/antenna elements of the one or more antenna panels 1222.

A UE transmission may be established by and via the protocol processing circuitry 1210, digital baseband circuitry 1212, transmit circuitry 1214, RF circuitry 1218, RFFE 1220, and antenna panels 1222. In some embodiments, the transmit components of the UE 1224 may apply a spatial filter to the data to be transmitted to form a transmit beam emitted by the antenna elements of the antenna panels 1222.

Similar to the UE 1202, the AN 1224 may include a host platform 1226 coupled with a modem platform 1230. The host platform 1226 may include application processing circuitry 1228 coupled with protocol processing circuitry 1232 of the modem platform 1230. The modem platform may further include digital baseband circuitry 1234, transmit circuitry 1236, receive circuitry 1238, RF circuitry 1240, RFFE circuitry 1242, and antenna panels 1244. The components of the AN 1224 may be similar to and substantially interchangeable with like-named components of the UE 1202. In addition to performing data transmission/reception as described above, the components of the A 1204 may perform various logical functions that include, for example, RNC functions such as radio bearer management, uplink and downlink dynamic radio resource management, and data packet scheduling.

Figure 13:
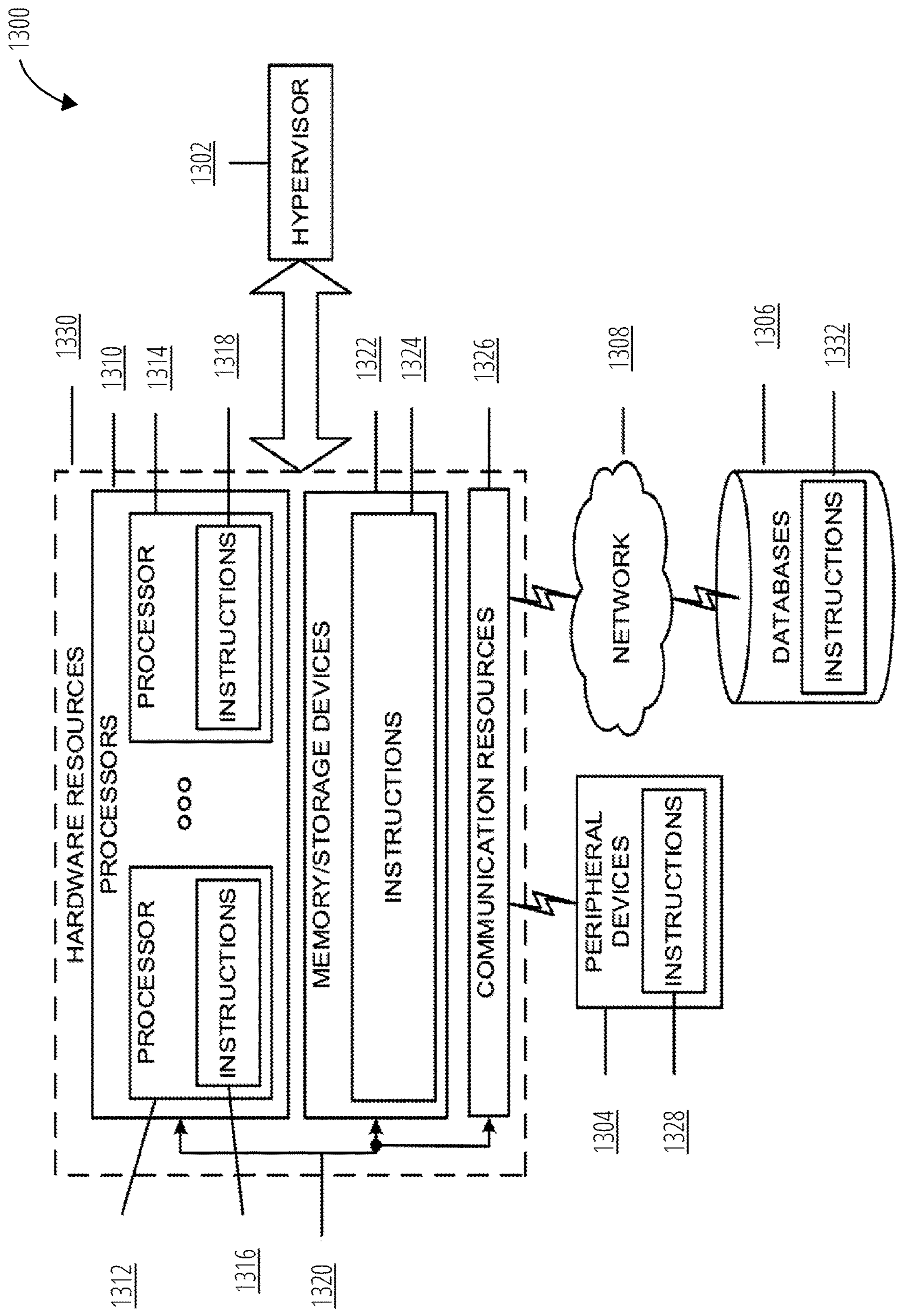
FIG. 13 illustrates an apparatus in accordance with one embodiment.

FIG. 13 is a block diagram illustrating an apparatus 1300 with various components, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1330 including one or more processors (or processor cores) 1310, one or more memory/storage devices 1322, and one or more communication resources 1326, each of which may be communicatively coupled via a bus 1320 or other interface circuitry. For embodiments where node virtualization (e.g., NFV) is utilized, a hypervisor 1302 may be executed to provide an execution environment for one or more network slices/sub-slices to utilize the hardware resources 1330.

The processors 1310 may include, for example, a processor 1312 and a processor 1314. The processors 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1322 may include main memory, disk storage, or any suitable combination thereof. The memory/storage devices 1322 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1326 may include interconnection or network interface controllers, components, or other suitable devices to communicate with one or more peripheral devices 1304 or one or more databases 1306 or other network elements via a network 1308. For example, the communication resources 1326 may include wired communication components (e.g., for coupling via USB, Ethernet, etc.), cellular communication components, NFC components, Bluetooth® (or Bluetooth® Low Energy) components, Wi-Fi® components, and other communication components.

Instructions 106, 1318, 1324, 1328, 1332 may comprise software, a program, an application, an applet, an app, or other executable code for causing at least any of the processors 1310 to perform any one or more of the methodologies discussed herein. The instructions 106, 1318, 1324, 1328, 1332 may reside, completely or partially, within at least one of the processors 1310 (e.g., within the processor's cache memory), the memory/storage devices 1322, or any suitable combination thereof. Furthermore, any portion of the instructions 106, 1318, 1324, 1328, 1332 may be transferred to the hardware resources 1330 from any combination of the peripheral devices 1304 or the databases 1306. Accordingly, the memory of processors 1310, the memory/storage devices 1322, the peripheral devices 1304, and the databases 1306 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 14:
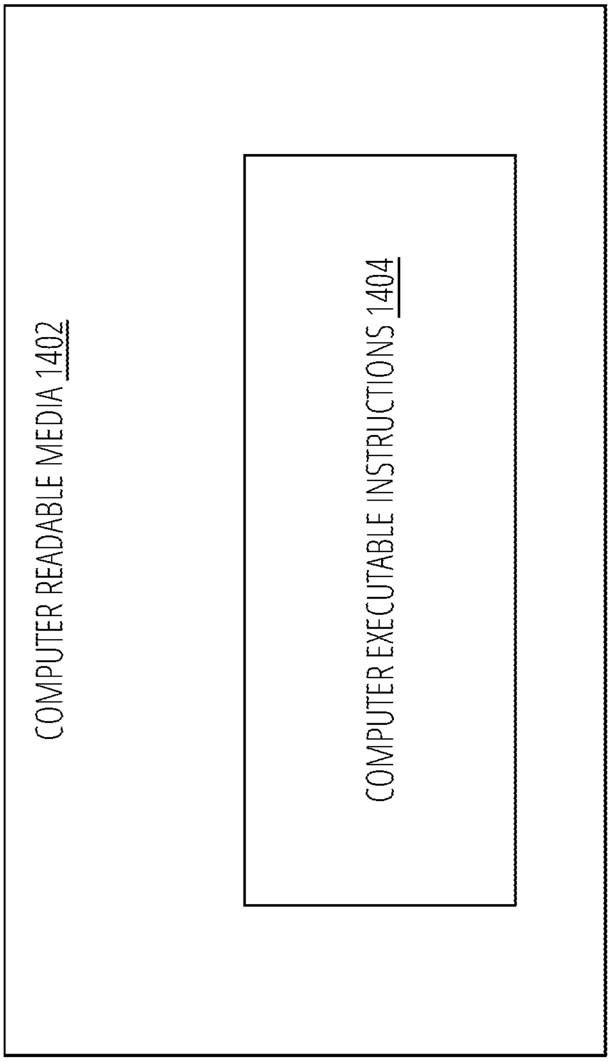
FIG. 14 illustrates a computer readable medium in accordance with one embodiment.

FIG. 14 illustrates a computer readable media 1402. The computer readable media 1402 may store one or more computer executable instructions 1404 to implemented one or more embodiments as described herein. Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable computer readable media 1402 can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer executable instructions 1404 or computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, the storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

While the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

A First Set of Examples

Example 1 may include an apparatus of a service producer supported by one or more processors that is configured to: obtain the raw performance measurements from UDM related to subscriber data management, or parameter provisioning; and generate and provide the performance measurements based on the triggered raw performance measurements.

Example 2 may include the apparatus of example 1 or some other example herein, where the service producer is located in UDM or in a management function.

Example 3 may include the apparatus of example 1 or some other example herein, wherein the performance measurement related to subscriber data management is number of subscription data getting requests, number of successful subscription data gettings, number of failed subscription data gettings, number of SDM subscribing requests, number of successful SDM subscribings, number of failed SDM subscribings, or number of subscription data notifications.

Example 4 may include the apparatus of example 3 or some other example herein, wherein the number of subscription data getting requests is triggered on receipt of an Nudm_SDM_Get request by the UDM from a consumer NF (e.g., AMF), each message increments the relevant subcounter per subscriber data type by 1 (see 3GPP TS 23.502 [7]);

The number of successful subscription data gettings is triggered on transmission of an Nudm_SDM_Get response by the UDM to a consumer NF (e.g., AMF) indicating a successful subscription data getting, each message increments the relevant subcounter per subscriber data type by 1 (see 3GPP TS 29.503 [x]);

The number of failed subscription data gettings is triggered on transmission of an Nudm_SDM_Get response by the UDM to a consumer NF (e.g., AMF) indicating a failed subscription data getting, each message increments the relevant subcounter per failure case by 1 (see 3GPP TS 29.503 [x]);

The number of SDM subscribing requests is triggered on receipt of an Nudm_SDM_Subscribe request by the UDM from a consumer NF (e.g., AMF), each message increments the relevant subcounter per subscriber data type by 1 (see 3GPP TS 23.502 [7]);

The number of successful SDM subscribings is triggered on transmission of an Nudm_SDM_Subscribe by the UDM to a consumer NF (e.g., AMF) indicating a successful SDM subscribings, each message increments the relevant subcounter per subscriber data type by 1 (see 3GPP TS 29.503 [x]);

The number of failed SDM subscribings is triggered on transmission of an Nudm_SDM_Subscribe response by the UDM to a consumer NF (e.g., AMF) indicating a failed SDM subscribings, each message increments the relevant subcounter per failure case by 1 (see 3GPP TS 29.503 [x]);

The number of subscription data notifications is triggered on transmission of an Nudm_SDM_Notification by the UDM from a consumer NF (e.g., AMF), each message increments the relevant subcounter per subscriber data type by 1 (see 3GPP TS 23.502 [7]).

Example 5 may include the apparatus of example 1 or some other example herein, wherein the performance measurement related to parameter provisioning is number of parameter creation requests, number of successful parameter creations, number of failed parameter creations, number of parameter update requests, number of successful parameter updates, or number of failed parameter updates, number of parameter deletion requests, number of successful parameter deletions, number of failed parameter deletions, number of parameter getting requests, number of successful parameter gettings, or number of failed parameter gettings.

Example 6 may include the apparatus of example 5 or some other example herein, wherein the number of parameter creation requests is triggered on receipt of an Nnef_ParameterProvision_Create request by the UDM from a consumer NF (e.g., NEF) (see 3GPP TS 23.502 [7]);

The number of successful parameter creations is triggered on transmission of an Nnef_ParameterProvision_Create response by the UDM to a consumer NF (e.g., AMF) indicating a successful parameter creation (see 3GPP TS 29.503 [x]);

The number of failed parameter creations is triggered on transmission of an Nnef_ParameterProvision_Create response by the UDM to a consumer NF (e.g., AMF) indicating a failed parameter creation, each message increments the relevant subcounter per failure case by 1 (see 3GPP TS 29.503 [x]);

The number of parameter update requests is triggered on receipt of an Nudm_ParameterProvision_Update request by the UDM from a consumer NF (e.g., NEF) (see 3GPP TS 23.502 [7]);

The number of successful parameter updates is triggered on transmission of an Nudm_ParameterProvision_Update response by the UDM to a consumer NF (e.g., AMF) indicating a successful parameter update (see 3GPP TS 29.503 [x]);

The number of failed parameter updates is triggered on transmission of an Nudm_ParameterProvision_Update response by the UDM to a consumer NF (e.g., AMF) indicating a failed parameter update, each message increments the relevant subcounter per failure case by 1 (see 3GPP TS 29.503 [x]);

The number of parameter deletion requests is triggered on receipt of an Nudm_ParameterProvision_Delete request by the UDM from a consumer NF (e.g., NEF) (see 3GPP TS 23.502 [7]);

The number of successful parameter deletions is triggered on transmission of an Nudm_ParameterProvision_Delete response by the UDM to a consumer NF (e.g., AMF) indicating a successful parameter deletion (see 3GPP TS 29.503 [x]);

The number of successful parameter deletions is triggered on transmission of an Nudm_ParameterProvision_Delete response by the UDM to a consumer NF (e.g., AMF) indicating a successful parameter deletion (see 3GPP TS 29.503 [x]);

The number of failed parameter deletions is triggered on transmission of an Nudm_ParameterProvision_Delete response by the UDM to a consumer NF (e.g., AMF) indicating a failed parameter deletion, each message increments the relevant subcounter per failure case by 1 (see 3GPP TS 29.503 [x]);

The number of parameter getting requests is triggered on receipt of an Nudm_ParameterProvision_Get request by the UDM from a consumer NF (e.g., NEF) (see 3GPP TS 23.502 [7]);

The number of successful parameter gettings is triggered on transmission of an Nudm_ParameterProvision_Get response by the UDM to a consumer NF (e.g., AMF) indicating a successful parameter getting (see 3GPP TS 29.503 [x]);

The number of failed parameter gettings is triggered on transmission of an Nudm_ParameterProvision_Get response by the UDM to a consumer NF (e.g., AMF) indicating a failed parameter getting, each message increments the relevant subcounter per failure case by 1 (see 3GPP TS 29.503 [x]).

Example 7 includes a method of a service producer, comprising: receiving a raw performance measurement from a network function (NF) comprising a unified data management (UDM) function, the raw performance measurement including subscriber data management information or parameter provisioning information associated with the UDM function; and determining a performance measurement based on the received raw performance measurement.

Example 8 includes the method of example 7 or some other example herein, wherein the method further includes sending the determined performance measurement to a consumer in communication with the service producer.

Example 9 includes the method of example 7 or some other example herein, wherein the service producer is implemented within the NF or in a separate management system.

Example 10 includes the method of example 7 or some other example herein, wherein the determined performance measurement includes an indication of: a number of subscription data getting requests received by the UDM function, a number of successful subscription data gettings at the UDM function, or a number of failed subscription data gettings at the UDM function.

Example 11 includes the method of example 7 or some other example herein, wherein the determined performance measurement includes an indication of: a number of subscriber data management (SDM) subscribing requests received by the UDM function, a number of successful SDM subscribings at the UDM function, or a number of failed SDM subscribings at the UDM function.

Example 12 includes the method of example 7 or some other example herein, wherein the determined performance measurement includes an indication of: a number of subscription data notifications sent by the UDM function, a number of parameter creation requests received by the UDM function, a number of successful parameter creations at UDM function, or a number of failed parameter creations at the UDM function.

Example 13 includes the method of example 7 or some other example herein, wherein the determined performance measurement includes an indication of: a number of parameter update requests received by the UDM function, number of successful parameter updates at the UDM function, a number of failed parameter updates at the UDM function, a number of parameter deletion requests received by the UDM function, a number of successful parameter deletions at the UDM function, or a number of failed parameter deletions at the UDM function.

Example 14 includes the method of example 7 or some other example herein, wherein the determined performance measurement includes an indication of: a number of parameter getting requests received by the UDM function, a number of successful parameter gettings at the UDM function, or a number of failed parameter gettings at the UDM function.

A Second Set of Examples

Example 1 may include a method of operating a wireless network that includes a control producer that is configured to: send createPmJobRequest to VNFM to create the PM job at NF (Network Function) to collect the VNFC measurements; and receive a notification from VNFM indicating the VNFC measurements are ready; and fetch the measurements from VNFM; and map the measured object of received measurement(s) from VNFC instance to the EASFunction, EESFunction, and ECSFunction MOI(s); and aggregate measurements received from VNFC instance(s) forming a VNF to generate the NF measurements; and send notifyFileReady to notify the consumer ASP that the measurements are ready.

Example 2 may include the method according to example 1 or some other example herein, wherein the NF may be EAS, EES, or ECS.

Example 3 may include the method according to example 1 or some other example herein, wherein the NF measurements are Data volume of incoming bytes to EAS, the Data volume of incoming bytes to EAS, Data volume of incoming packets to EAS, and the Data volume of incoming packets to EAS, Example 4 may include the method according to examples 1 and 2 or some other example herein, wherein the OM (Object Mapping) collection method is used to map the measured objects of received measurement(s) from VNFC instance(s) forming EAS, EES, and ECS to EASFunction, EESFunction, and ECSFunction MOI(s).

Example 5 may include the method according to example 1 or some other example herein, wherein the Data volume of incoming bytes to EAS measurement is generated by aggregating VNFC measurements ByteIncomingVnfExtCp received from VNFM.

Example 6 may include the method according to example 1 or some other example herein, wherein the Data volume of incoming bytes to EAS measurement is generated by aggregating VNFC measurements ByteIncoming VnfExtCp received from VNFM.

Example 7 may include the method according to example 1 or some other example herein, wherein the Data volume of outgoing bytes to EAS measurement is generated by aggregating VNFC measurements ByteOutgoing VnfExtCp received from VNFM.

Example 8 may include the method according to example 1 or some other example herein, wherein the Data volume of incoming packets to EAS measurement is generated by aggregating VNFC measurements PacketIncoming VnfExtCp received from VNFM.

Example 9 may include the method according to example 1 or some other example herein, wherein the Data volume of outgoing packets to EAS measurement is generated by aggregating VNFC measurements PacketOutgoingVnfExtCp received from VNFM.

Example 10 may include the method according to examples 5, 6, 7 and 8 or some other example herein, wherein the methods are applicable to EES and ECS.

Example 11 includes a method of a measurement job control service producer, comprising: receiving a raw performance measurement from a virtual network function component (VNFC), the raw performance measurement including a connection data volume measurement; and determining a performance measurement based on the received raw performance measurement.

Example 12 includes the method of example 11 or some other example herein, wherein the VNFC comprises a virtual network function manager (VNFM).

Example 13 includes the method of example 11 or some other example herein, further comprising receiving a notification from the VNFC indicating the raw performance measurement is ready for retrieval.

Example 14 includes the method of example 11 or some other example herein, further comprising mapping a measured object of the received raw measurement from the VNFC to an EASFunction managed object instance (MOI), EESFunction MOI, or ECSFunction MOI.

Example 15 includes the method of example 11 or some other example herein, further comprising aggregating measurements received from a plurality of VNFC instances forming a VNF to determine the performance measurement.

Example 16 includes the method of example 11 or some other example herein, further comprising sending a notification to a control service consumer that indicates the determined performance measurement is ready.

Example 17 includes the method of example 11 or some other example herein, wherein the determined performance measurement includes an indication of: a mean virtual CPU usage, a mean virtual memory usage, or a mean virtual disk usage.

A Third Set of Examples

In a first example, an apparatus for a network management component of a fifth generation (5G) system (5GS), includes a memory interface to send or receive, to or from a data storage device, performance measurements related to subscriber data management and parameter provisioning for a unified data management (UDM) system. The apparatus also includes processor circuitry communicatively coupled to the memory interface, the processor circuitry to obtain raw measurements of network functions communicatively coupled to one another via service based interfaces in a 5G core (5GC) of the 5GS, where one of the network functions is a UDM, generate performance measurements corresponding to one or more network functions based on the raw measurements, where the performance measurements are subscriber data management related measurements, and report the subscriber data management related measurements to a service consumer. The first example of an apparatus may also include any of the following apparatus examples in any combination.

The apparatus may include a radio frequency (RF) interface configured to provide, to RF circuitry, data for transmitting a communication of the report based on the performance measurements.

The apparatus may also include the processor circuitry to generate a subscriber data management related measurement for a subscription data getting, the subscription data getting to comprise a measurement for a number of subscription data getting requests, where the measurement provides the number of subscription data getting requests received by the UDM.

The apparatus may also include the processor circuitry to generate a subscriber data management related measurement for a subscription data getting, the subscription data getting to comprise a measurement for a number of successful subscription data gettings, where the measurement provides the number of subscription data gettings at the UDM.

The apparatus may also include the processor circuitry to generate a subscriber data management related measurement for a subscription data getting, the subscription data getting to comprise a measurement for a number of failed subscription data gettings, where the measurement provides the number of failed subscription data gettings at the UDM.

The apparatus may also include the processor circuitry to generate a subscriber data management related measurement for a subscriber data management (SDM) subscription, the SDM subscription to comprise a measurement for a number of SDM subscribing requests, where the measurement provides the number of SDM subscribing requests received by the UDM.

The apparatus may also include the processor circuitry to generate a subscriber data management related measurement for a subscriber data management (SDM) subscription, the SDM subscription to comprise a measurement for a number of successful SDM subscribings, where the measurement provides the number of successful SDM subscribings at the UDM.

The apparatus may also include the processor circuitry to generate a subscriber data management related measurement for a subscriber data management (SDM) subscription, the SDM subscription to comprise a measurement for a number of failed SDM subscribings, where the measurement provides the number of failed SDM subscribings at the UDM.

The apparatus may also include the processor circuitry to generate a subscriber data management related measurement for a subscription data notification, the subscription data notification to comprise a measurement for a number of subscription data notifications, where the measurement provides the number of subscription data notifications sent by the UDM.

The apparatus may also include the processor circuitry to generate a subscriber data management related measurement for parameter provisioning related measurements, the parameter provisioning related measurements to comprise parameter creations, the parameter creations to comprise a measurement for a number of parameter creation requests, where the measurement provides the number of parameter creation requests received by the UDM.

The apparatus may also include the processor circuitry to generate a subscriber data management related measurement for parameter provisioning related measurements, the parameter provisioning related measurements to comprise parameter creations, the parameter creations to comprise a measurement for a number of successful parameter creations, where the measurement provides the number of successful parameter creations by the UDM.

The apparatus may also include the processor circuitry to generate a subscriber data management related measurement for parameter provisioning related measurements, the parameter provisioning related measurements to comprise parameter creations, the parameter creations to comprise a measurement for a number of failed parameter creations, where the measurement provides the number of failed parameter creations at the UDM.

The apparatus may also include the processor circuitry to generate a subscriber data management related measurement for parameter updates, the parameter updates to comprise a measurement for a number of parameter update requests, where the measurement provides the number of parameter update requests received by the UDM.

The apparatus may also include the processor circuitry to generate a subscriber data management related measurement for parameter updates, the parameter updates to comprise a measurement for a number of successful parameter updates, where the measurement provides the number of successful parameter updates at the UDM.

The apparatus may also include the processor circuitry to generate a subscriber data management related measurement for parameter updates, the parameter updates to comprise a measurement for a number of failed parameter updates, where the measurement provides the number of failed parameter updates at the UDM.

The apparatus may also include the processor circuitry to generate a subscriber data management related measurement for parameter deletion, the parameter deletion to comprise a measurement for a number of parameter deletion requests, where the measurement provides the number of parameter deletion requests received by the UDM.

The apparatus may also include the processor circuitry to generate a subscriber data management related measurement for parameter deletion, the parameter deletion to comprise a measurement for a number of successful parameter deletions, where the measurement provides the number of successful parameter deletions at the UDM.

The apparatus may also include the processor circuitry to generate a subscriber data management related measurement for parameter deletion, the parameter deletion to comprise a measurement for a number of failed parameter deletions, where the measurement provides the number of failed parameter deletions at the UDM.

The apparatus may also include the processor circuitry to generate a subscriber data management related measurement for parameter getting, the parameter getting to comprise a measurement for a number of parameter getting requests, where the measurement provides the number of parameter getting requests received by the UDM.

The apparatus may also include the processor circuitry to generate a subscriber data management related measurement for parameter getting, the parameter getting to comprise a measurement for a number of successful parameter gettings, where the measurement provides the number of successful parameter gettings at the UDM.

The apparatus may also include the processor circuitry to generate a subscriber data management related measurement for parameter getting, the parameter getting to comprise a measurement for a number of failed parameter gettings, where the measurement provides the number of failed parameter gettings at the UDM.

The apparatus may also include where the subscriber data management related measurements are defined in accordance with a third generation partnership project (3GPP) technical specification (TS) 38.552. Other technical features may be readily apparent to one skilled in the art from the following figures, descriptions, and claims.

In a second example, a method for a network management component of a fifth generation (5G) system (5GS), includes obtaining raw measurements of network functions communicatively coupled to one another via service based interfaces in a 5G core (5GC) of the 5GS, where one of the network functions is a unified data management (UDM), generating performance measurements corresponding to one or more network functions based on the raw measurements, where the performance measurements are subscriber data management related measurements, and reporting the subscriber data management related measurements to a service consumer. The method of the second example may also include any of the following method examples in any combination.

The method may also include transmitting a communication of the report based on the performance measurements over a radio-frequency (RF) transceiver.

The method may also include generating one of the performance measurements as a subscriber data management related measurement for a subscription data getting, the subscription data getting to comprise a measurement for a number of subscription data getting requests, where the measurement provides the number of subscription data getting requests received by the UDM.

The method may also include generating one of the performance measurements as a subscriber data management related measurement for a subscription data getting, the subscription data getting to comprise a measurement for a number of successful subscription data gettings, where the measurement provides the number of subscription data gettings at the UDM.

The method may also include generating one of the performance measurements as a subscriber data management related measurement for a subscription data getting, the subscription data getting to comprise a measurement for a number of failed subscription data gettings, where the measurement provides the number of failed subscription data gettings at the UDM.

The method may also include generating one of the performance measurements as a subscriber data management related measurement for a subscriber data management (SDM) subscription, the SDM subscription to comprise a measurement for a number of SDM subscribing requests, where the measurement provides the number of SDM subscribing requests received by the UDM.

The method may also include generating one of the performance measurements as a subscriber data management related measurement for a subscriber data management (SDM) subscription, the SDM subscription to comprise a measurement for a number of successful SDM subscribings, where the measurement provides the number of successful SDM subscribings at the UDM.

The method may also include generating one of the performance measurements as a subscriber data management related measurement for a subscriber data management (SDM) subscription, the SDM subscription to comprise a measurement for a number of failed SDM subscribings, where the measurement provides the number of failed SDM subscribings at the UDM.

The method may also include generating one of the performance measurements as a subscriber data management related measurement for a subscription data notification, the subscription data notification to comprise a measurement for a number of subscription data notifications, where the measurement provides the number of subscription data notifications sent by the UDM.

The method may also include generating one of the performance measurements as a subscriber data management related measurement for parameter provisioning related measurements, the parameter provisioning related measurements to comprise parameter creations, the parameter creations to comprise a measurement for a number of parameter creation requests, where the measurement provides the number of parameter creation requests received by the UDM.

The method may also include generating one of the performance measurements as a subscriber data management related measurement for parameter provisioning related measurements, the parameter provisioning related measurements to comprise parameter creations, the parameter creations to comprise a measurement for a number of successful parameter creations, where the measurement provides the number of successful parameter creations by the UDM.

The method may also include generating one of the performance measurements as a subscriber data management related measurement for parameter provisioning related measurements, the parameter provisioning related measurements to comprise parameter creations, the parameter creations to comprise a measurement for a number of failed parameter creations, where the measurement provides the number of failed parameter creations at the UDM.

The method may also include generating one of the performance measurements as a subscriber data management related measurement for parameter updates, the parameter updates to comprise a measurement for a number of parameter update requests, where the measurement provides the number of parameter update requests received by the UDM.

The method may also include generating one of the performance measurements as a subscriber data management related measurement for parameter updates, the parameter updates to comprise a measurement for a number of successful parameter updates, where the measurement provides the number of successful parameter updates at the UDM.

The method may also include generating one of the performance measurements as a subscriber data management related measurement for parameter updates, the parameter updates to comprise a measurement for a number of failed parameter updates, where the measurement provides the number of failed parameter updates at the UDM.

The method may also include generating one of the performance measurements as a subscriber data management related measurement for parameter deletion, the parameter deletion to comprise a measurement for a number of parameter deletion requests, where the measurement provides the number of parameter deletion requests received by the UDM.

The method may also include generating one of the performance measurements as a subscriber data management related measurement for parameter deletion, the parameter deletion to comprise a measurement for a number of successful parameter deletions, where the measurement provides the number of successful parameter deletions at the UDM.

The method may also include generating one of the performance measurements as a subscriber data management related measurement for parameter deletion, the parameter deletion to comprise a measurement for a number of failed parameter deletions, where the measurement provides the number of failed parameter deletions at the UDM.

The method may also include generating one of the performance measurements as a subscriber data management related measurement for parameter getting, the parameter getting to comprise a measurement for a number of parameter getting requests, where the measurement provides the number of parameter getting requests received by the UDM.

The method may also include generating one of the performance measurements as a subscriber data management related measurement for parameter getting, the parameter getting to comprise a measurement for a number of successful parameter gettings, where the measurement provides the number of successful parameter gettings at the UDM.

The method may also include generating one of the performance measurements as a subscriber data management related measurement for parameter getting, the parameter getting to comprise a measurement for a number of failed parameter gettings, where the measurement provides the number of failed parameter gettings at the UDM.

The method may also include where the subscriber data management related measurements are defined in accordance with a third generation partnership project (3GPP) technical specification (TS) 38.552. Other technical features may be readily apparent to one skilled in the art from the following figures, descriptions, and claims.

In a third example, a non-transitory computer-readable storage medium, the computer-readable storage medium including instructions that when executed by a computer, cause the computer to obtain raw measurements of network functions communicatively coupled to one another via service based interfaces in a 5G core (5GC) of the 5GS, where one of the network functions is a unified data management (UDM), generate performance measurements corresponding to one or more network functions based on the raw measurements, where the performance measurements are subscriber data management related measurements, and report the subscriber data management related measurements to a service consumer. The third example of a computer-readable storage medium may also include any of the following computer-readable storage medium examples in any combination.

The computer-readable storage medium may also include instructions that when executed by the computer cause the computer to transmit a communication of the report based on the performance measurements over a radio-frequency (RF) transceiver.

The computer-readable storage medium may also include instructions that when executed by the computer cause the computer to generate one of the performance measurements as a subscriber data management related measurement for a subscription data getting, the subscription data getting to comprise a measurement for a number of subscription data getting requests, where the measurement provides the number of subscription data getting requests received by the UDM.

The computer-readable storage medium may also include instructions that when executed by the computer cause the computer to generate one of the performance measurements as a subscriber data management related measurement for a subscription data getting, the subscription data getting to comprise a measurement for a number of successful subscription data gettings, where the measurement provides the number of subscription data gettings at the UDM.

The computer-readable storage medium may also include instructions that when executed by the computer cause the computer to generate one of the performance measurements as a subscriber data management related measurement for a subscription data getting, the subscription data getting to comprise a measurement for a number of failed subscription data gettings, where the measurement provides the number of failed subscription data gettings at the UDM.

The computer-readable storage medium may also include instructions that when executed by the computer cause the computer to generate one of the performance measurements as a subscriber data management related measurement for a subscriber data management (SDM) subscription, the SDM subscription to comprise a measurement for a number of SDM subscribing requests, where the measurement provides the number of SDM subscribing requests received by the UDM.

The computer-readable storage medium may also include instructions that when executed by the computer cause the computer to generate one of the performance measurements as a subscriber data management related measurement for a subscriber data management (SDM) subscription, the SDM subscription to comprise a measurement for a number of successful SDM subscribings, where the measurement provides the number of successful SDM subscribings at the UDM.

The computer-readable storage medium may also include instructions that when executed by the computer cause the computer to generate one of the performance measurements as a subscriber data management related measurement for a subscriber data management (SDM) subscription, the SDM subscription to comprise a measurement for a number of failed SDM subscribings, where the measurement provides the number of failed SDM subscribings at the UDM.

The computer-readable storage medium may also include instructions that when executed by the computer cause the computer to generate one of the performance measurements as a subscriber data management related measurement for a subscription data notification, the subscription data notification to comprise a measurement for a number of subscription data notifications, where the measurement provides the number of subscription data notifications sent by the UDM.

The computer-readable storage medium may also include instructions that when executed by the computer cause the computer to generate one of the performance measurements as a subscriber data management related measurement for parameter provisioning related measurements, the parameter provisioning related measurements to comprise parameter creations, the parameter creations to comprise a measurement for a number of parameter creation requests, where the measurement provides the number of parameter creation requests received by the UDM.

The computer-readable storage medium may also include instructions that when executed by the computer cause the computer to generate one of the performance measurements as a subscriber data management related measurement for parameter provisioning related measurements, the parameter provisioning related measurements to comprise parameter creations, the parameter creations to comprise a measurement for a number of successful parameter creations, where the measurement provides the number of successful parameter creations by the UDM.

The computer-readable storage medium may also include instructions that when executed by the computer cause the computer to generate one of the performance measurements as a subscriber data management related measurement for parameter provisioning related measurements, the parameter provisioning related measurements to comprise parameter creations, the parameter creations to comprise a measurement for a number of failed parameter creations, where the measurement provides the number of failed parameter creations at the UDM.

The computer-readable storage medium may also include instructions that when executed by the computer cause the computer to generate one of the performance measurements as a subscriber data management related measurement for parameter updates, the parameter updates to comprise a measurement for a number of parameter update requests, where the measurement provides the number of parameter update requests received by the UDM.

The computer-readable storage medium may also include instructions that when executed by the computer cause the computer to generate one of the performance measurements as a subscriber data management related measurement for parameter updates, the parameter updates to comprise a measurement for a number of successful parameter updates, where the measurement provides the number of successful parameter updates at the UDM.

The computer-readable storage medium may also include instructions that when executed by the computer cause the computer to generate one of the performance measurements as a subscriber data management related measurement for parameter updates, the parameter updates to comprise a measurement for a number of failed parameter updates, where the measurement provides the number of failed parameter updates at the UDM.

The computer-readable storage medium may also include instructions that when executed by the computer cause the computer to generate one of the performance measurements as a subscriber data management related measurement for parameter deletion, the parameter deletion to comprise a measurement for a number of parameter deletion requests, where the measurement provides the number of parameter deletion requests received by the UDM.

The computer-readable storage medium may also include instructions that when executed by the computer cause the computer to generate one of the performance measurements as a subscriber data management related measurement for parameter deletion, the parameter deletion to comprise a measurement for a number of successful parameter deletions, where the measurement provides the number of successful parameter deletions at the UDM.

The computer-readable storage medium may also include instructions that when executed by the computer cause the computer to generate one of the performance measurements as a subscriber data management related measurement for parameter deletion, the parameter deletion to comprise a measurement for a number of failed parameter deletions, where the measurement provides the number of failed parameter deletions at the UDM.

The computer-readable storage medium may also include instructions that when executed by the computer cause the computer to generate one of the performance measurements as a subscriber data management related measurement for parameter getting, the parameter getting to comprise a measurement for a number of parameter getting requests, where the measurement provides the number of parameter getting requests received by the UDM.

The computer-readable storage medium may also include instructions that when executed by the computer cause the computer to generate one of the performance measurements as a subscriber data management related measurement for parameter getting, the parameter getting to comprise a measurement for a number of successful parameter gettings, where the measurement provides the number of successful parameter gettings at the UDM.

The computer-readable storage medium may also include instructions that when executed by the computer cause the computer to generate one of the performance measurements as a subscriber data management related measurement for parameter getting, the parameter getting to comprise a measurement for a number of failed parameter gettings, where the measurement provides the number of failed parameter gettings at the UDM.

The computer-readable storage medium may also include where the subscriber data management related measurements are defined in accordance with a third generation partnership project (3GPP) technical specification (TS) 38.552. Other technical features may be readily apparent to one skilled in the art from the following figures, descriptions, and claims.

In a fourth example, an apparatus for a network management component of a fifth generation (5G) system (5GS), includes a memory interface to send or receive, to or from a data storage device, one or more performance measurements related to one or more network functions supporting edge computing. The apparatus also includes processor circuitry communicatively coupled to the memory interface, the processor circuitry to obtain raw measurements of network functions communicatively coupled to one another via service based interfaces in a 5G core (5GC) of the 5GS, where one of the network functions is a virtualized network function with a virtualized resource (VR), generate performance measurements corresponding to one or more network functions based on the raw measurements, where the performance measurements are related to VR usage related measurements for the virtualized network function, and report the VR usage related measurements to a service consumer. The apparatus of the fourth example may also include any of the following apparatus examples in any combination.

The apparatus may also include a radio frequency (RF) interface configured to provide, to RF circuitry, data for transmitting a communication of the report based on the performance measurements.

The apparatus may also include where the VR is a virtual central processing unit (CPU), the processor circuitry to generate a VR usage related measurement for virtual CPU usage, the virtual CPU usage to comprise a measurement for a mean virtual CPU usage, where the measurement provides a mean usage of the virtual CPU for the virtualized network function.

The apparatus may also include where the VR is a virtual memory, the processor circuitry to generate a VR usage related measurement for virtual memory usage, the virtual memory usage to comprise a measurement for a mean virtual memory usage, where the measurement provides a mean usage of the virtual memory for the virtualized network function.

The apparatus may also include where the VR is a virtual disk, the processor circuitry to generate a VR usage related measurement for virtual disk usage, the virtual disk usage to comprise a measurement for a mean virtual disk usage, where the measurement provides a mean usage of the virtual disk for the virtualized network function.

The apparatus may also include where the VR is a virtual disk, the processor circuitry to generate a VR usage related measurement for virtual disk usage, the virtual disk usage to comprise a measurement for a mean virtual disk usage, where the measurement provides a mean usage of the virtual disk for the virtualized network function. Other technical features may be readily apparent to one skilled in the art from the following figures, descriptions, and claims.

In a fifth example, a method for a network management component of a fifth generation (5G) system (5GS), includes obtaining raw measurements of network functions communicatively coupled to one another via service based interfaces in a 5G core (5GC) of the 5GS, where one of the network functions is a virtualized network function with a virtualized resource (VR) to support edge computing, generating performance measurements corresponding to one or more network functions based on the raw measurements, where the performance measurements are related to VR usage related measurements for the virtualized network function, and reporting the VR usage related measurements to a service consumer. The method of fifth example may also include any of the following method examples in any combination.

The method may also include providing, to radio-frequency (RF) circuitry, data for transmitting a communication of the report based on the performance measurements via a transceiver.

The method may also include where the VR is a virtual central processing unit (CPU), includes generating a VR usage related measurement for virtual CPU usage, the virtual CPU usage to comprise a measurement for a mean virtual CPU usage, where the measurement provides a mean usage of the virtual CPU for the virtualized network function.

The method may also include where the VR is a virtual memory, includes generating a VR usage related measurement for virtual memory usage, the virtual memory usage to comprise a measurement for a mean virtual memory usage, where the measurement provides a mean usage of the virtual memory for the virtualized network function.

The method may also include where the VR is a virtual disk, includes generating a VR usage related measurement for virtual disk usage, the virtual disk usage to comprise a measurement for a mean virtual disk usage, where the measurement provides a mean usage of the virtual disk for the virtualized network function.

The method may also include where the VR is a virtual disk, includes generating a VR usage related measurement for virtual disk usage, the virtual disk usage to comprise a measurement for a mean virtual disk usage, where the measurement provides a mean usage of the virtual disk for the virtualized network function. Other technical features may be readily apparent to one skilled in the art from the following figures, descriptions, and claims.

In a sixth example, a non-transitory computer-readable storage medium, the computer-readable storage medium including instructions that when executed by a computer, cause the computer to obtain raw measurements of network functions communicatively coupled to one another via service based interfaces in a 5G core (5GC) of the 5GS, where one of the network functions is a virtualized network function with a virtualized resource (VR) to support edge computing, generate performance measurements corresponding to one or more network functions based on the raw measurements, where the performance measurements are related to VR usage related measurements for the virtualized network function, and report the VR usage related measurements to a service consumer. The computer-readable storage medium of the sixth example may further include any of the following computer-readable storage medium examples in any combination.

The computer-readable storage medium may also include instructions that when executed by the computer cause the computer to provide, to RF circuitry, data for transmitting a communication of the report based on the performance measurements.

The computer-readable storage medium may also include where the VR is a virtual central processing unit (CPU), includes instructions that when executed by the computer cause the computer to generate a VR usage related measurement for virtual CPU usage, the virtual CPU usage to comprise a measurement for a mean virtual CPU usage, where the measurement provides a mean usage of the virtual CPU for the virtualized network function.

The computer-readable storage medium may also include where the VR is a virtual memory, includes instructions that when executed by the computer cause the computer to generate a VR usage related measurement for virtual memory usage, the virtual memory usage to comprise a measurement for a mean virtual memory usage, where the measurement provides a mean usage of the virtual memory for the virtualized network function.

The computer-readable storage medium may also include where the VR is a virtual disk, includes instructions that when executed by the computer cause the computer to generate a VR usage related measurement for virtual disk usage, the virtual disk usage to comprise a measurement for a mean virtual disk usage, where the measurement provides a mean usage of the virtual disk for the virtualized network function.

The computer-readable storage medium may also include where the VR is a virtual disk, includes instructions that when executed by the computer cause the computer to generate a VR usage related measurement for virtual disk usage, the virtual disk usage to comprise a measurement for a mean virtual disk usage, where the measurement provides a mean usage of the virtual disk for the virtualized network function. Other technical features may be readily apparent to one skilled in the art from the following figures, descriptions, and claims.

In a seventh example, an apparatus for a network management component of a fifth generation (5G) system (5GS), includes a memory interface to send or receive, to or from a data storage device, one or more performance measurements related to one or more network functions supporting edge computing. The apparatus also includes processor circuitry communicatively coupled to the memory interface, the processor circuitry to obtain raw measurements of network functions communicatively coupled to one another via service based interfaces in a 5G core (5GC) of the 5GS, where one of the network functions is performed by an edge application server (EAS) in an edge data network, generate performance measurements corresponding to one or more network functions based on the raw measurements, where the performance measurements are related to connection data volume related measurements for the network function performed by the EAS, and report the connection data volume related measurements to a service consumer. The apparatus of the seventh example may also include any of the following apparatus examples in any combination.

The apparatus may also include a radio frequency (RF) interface configured to provide, to RF circuitry, data for transmitting a communication of the report based on the performance measurements.

The apparatus may also include the processor circuitry to generate a connection data volume related measurement for connection data volumes of a network function, the connection data volumes of a network function to comprise a measurement for a data volume of incoming bytes to the EAS, where the measurement provides a number of incoming bytes received by the EAS in the edge data network.

The apparatus may also include the processor circuitry to generate a connection data volume related measurement for connection data volumes of a network function, the connection data volumes of a network function to comprise a measurement for a data volume of outgoing bytes to the EAS, where the measurement provides a number of outgoing bytes transmitted from the EAS in the edge data network.

The apparatus may also include the processor circuitry to generate a connection data volume related measurement for connection data volumes of a network function, the connection data volumes of a network function to comprise a measurement for a data volume of incoming packets to the EAS, where the measurement provides a number of incoming packets received by the EAS in the edge data network.

The apparatus may also include the processor circuitry to generate a connection data volume related measurement for connection data volumes of a network function, the connection data volumes of a network function to comprise a measurement for a data volume of outgoing packets to the EAS, where the measurement provides a number of outgoing packets received by the EAS in the edge data network.

The apparatus may also include the processor circuitry to generate a connection data volume related measurement for connection data volumes of a network function, the connection data volumes of a network function to comprise a measurement for a data volume of outgoing packets to the EAS, where the measurement provides a number of outgoing packets transmitted from the EAS in the edge data network.

The apparatus may also include where the connection data volume related measurements for the network function performed by the EAS are applicable to an edge enabler server (EES) or an edge configuration server (ECS), the processor circuitry to map a measured object of a virtual network function (VNF) component (VNFC) measurement to an EES function or an ECS function 3GPP managed object instance (MOI) or an ETSI Industry Specification Group (ISG) Measurement Ontology for Internet Protocol Traffic (MOI). Other technical features may be readily apparent to one skilled in the art from the following figures, descriptions, and claims.

In an eighth example, a method for a network management component of a fifth generation (5G) system (5GS), includes obtaining raw measurements of network functions communicatively coupled to one another via service based interfaces in a 5G core (5GC) of the 5GS, where one of the network functions is performed by an edge application server (EAS) in an edge data network, generating performance measurements corresponding to one or more network functions based on the raw measurements, where the performance measurements are related to connection data volume related measurements for the network function performed by the EAS, and reporting the connection data volume related measurements to a service consumer. The method of the eighth example may also include any of the following method examples in any combination.

The method may also include providing, to radio frequency (RF) circuitry, data for transmitting a communication of the report based on the performance measurements.

The method may also include generating a connection data volume related measurement for connection data volumes of a network function, the connection data volumes of a network function to comprise a measurement for a data volume of incoming bytes to the EAS, where the measurement provides a number of incoming bytes received by the EAS in the edge data network.

The method may also include generating a connection data volume related measurement for connection data volumes of a network function, the connection data volumes of a network function to comprise a measurement for a data volume of outgoing bytes to the EAS, where the measurement provides a number of outgoing bytes transmitted from the EAS in the edge data network.

The method may also include generating a connection data volume related measurement for connection data volumes of a network function, the connection data volumes of a network function to comprise a measurement for a data volume of incoming packets to the EAS, where the measurement provides a number of incoming packets received by the EAS in the edge data network.

The method may also include generating a connection data volume related measurement for connection data volumes of a network function, the connection data volumes of a network function to comprise a measurement for a data volume of outgoing packets to the EAS, where the measurement provides a number of outgoing packets received by the EAS in the edge data network.

The method may also include generating a connection data volume related measurement for connection data volumes of a network function, the connection data volumes of a network function to comprise a measurement for a data volume of outgoing packets to the EAS, where the measurement provides a number of outgoing packets transmitted from the EAS in the edge data network.

The method may also include where the connection data volume related measurements for the network function performed by the EAS are applicable to an edge enabler server (EES) or an edge configuration server (ECS), includes mapping a measured object of a virtual network function (VNF) component (VNFC) measurement to an EES function or an ECS function 3GPP managed object instance (MOI) or an ETSI Industry Specification Group (ISG) Measurement Ontology for Internet Protocol Traffic (MOI). Other technical features may be readily apparent to one skilled in the art from the following figures, descriptions, and claims.

In a ninth example, a non-transitory computer-readable storage medium, the computer-readable storage medium including instructions that when executed by a computer, cause the computer to obtain raw measurements of network functions communicatively coupled to one another via service based interfaces in a 5G core (5GC) of the 5GS, where one of the network functions is performed by an edge application server (EAS) in an edge data network, generate performance measurements corresponding to one or more network functions based on the raw measurements, where the performance measurements are related to connection data volume related measurements for the network function performed by the EAS, and report the connection data volume related measurements to a service consumer. The computer-readable storage medium of the ninth example may also include any of the following computer-readable medium examples in any combination.

The computer-readable storage medium may also include instructions that when executed by the computer cause the computer to provide, to radio frequency (RF) circuitry, data for transmitting a communication of the report based on the performance measurements.

The computer-readable storage medium may also include instructions that when executed by the computer cause the computer to generate a connection data volume related measurement for connection data volumes of a network function, the connection data volumes of a network function to comprise a measurement for a data volume of incoming bytes to the EAS, where the measurement provides a number of incoming bytes received by the EAS in the edge data network.

The computer-readable storage medium may also include instructions that when executed by the computer cause the computer to generate a connection data volume related measurement for connection data volumes of a network function, the connection data volumes of a network function to comprise a measurement for a data volume of outgoing bytes to the EAS, where the measurement provides a number of outgoing bytes transmitted from the EAS in the edge data network.

The computer-readable storage medium may also include instructions that when executed by the computer cause the computer to generate a connection data volume related measurement for connection data volumes of a network function, the connection data volumes of a network function to comprise a measurement for a data volume of incoming packets to the EAS, where the measurement provides a number of incoming packets received by the EAS in the edge data network.

The computer-readable storage medium may also include instructions that when executed by the computer cause the computer to generate a connection data volume related measurement for connection data volumes of a network function, the connection data volumes of a network function to comprise a measurement for a data volume of outgoing packets to the EAS, where the measurement provides a number of outgoing packets received by the EAS in the edge data network.

The computer-readable storage medium may also include instructions that when executed by the computer cause the computer to generate a connection data volume related measurement for connection data volumes of a network function, the connection data volumes of a network function to comprise a measurement for a data volume of outgoing packets to the EAS, where the measurement provides a number of outgoing packets transmitted from the EAS in the edge data network.

The computer-readable storage medium may also include where the connection data volume related measurements for the network function performed by the EAS are applicable to an edge enabler server (EES) or an edge configuration server (ECS), includes instructions that when executed by the computer cause the computer to map a measured object of a virtual network function (VNF) component (VNFC) measurement to an EES function or an ECS function 3GPP managed object instance (MOI) or an ETSI Industry Specification Group (ISG) Measurement Ontology for Internet Protocol Traffic (MOI). Other technical features may be readily apparent to one skilled in the art from the following figures, descriptions, and claims.

In some examples, some or all of the exemplary apparatus claims may be implemented as means plus function claims. For instance, an apparatus for a network management component of a fifth generation (5G) system (5GS), may comprise a means for sending or receiving, to or from a data storage device, performance measurements related to subscriber data management and parameter provisioning for a unified data management (UDM) system; means for obtaining raw measurements of network functions communicatively coupled to one another via service based management interfaces of the 5GS, wherein one of the network functions is a UDM; means for generating performance measurements corresponding to one or more network functions based on the raw measurements, wherein the performance measurements are subscriber data management related measurements; and means for reporting the subscriber data management related measurements to a service consumer. Other examples are described and claimed.

What is claimed is:

1. An apparatus for a network management component of a fifth generation (5G) system (5GS), comprising:

a memory interface to send or receive, to or from a data storage device, performance measurements related to subscriber data management and parameter provisioning for a unified data management (UDM) system; and processor circuitry communicatively coupled to the memory interface, the processor circuitry to:

obtain raw measurements of network functions communicatively coupled to one another via service based management interfaces of the 5GS, wherein one of the network functions is a UDM;

generate performance measurements corresponding to one or more network functions based on the raw measurements, wherein the performance measurements are subscriber data management related measurements; and report the subscriber data management related measurements to a service consumer.

2. The apparatus of claim 1, the processor circuitry to generate a subscriber data management related measurement for a subscription data getting, the subscription data getting to comprise:

a measurement for a number of subscription data getting requests, wherein the measurement provides the number of subscription data getting requests received by the UDM;

a measurement for a number of successful subscription data gettings, wherein the measurement provides the number of subscription data gettings at the UDM; or a measurement for a number of failed subscription data gettings, wherein the measurement provides the number of failed subscription data gettings at the UDM.

3. The apparatus of claim 1, the processor circuitry to generate a subscriber data management related measurement for a subscriber data management (SDM) subscription, the SDM subscription to comprise:

a measurement for a number of SDM subscribing requests, wherein the measurement provides the number of SDM subscribing requests received by the UDM;

a measurement for a number of successful SDM subscribings, wherein the measurement provides the number of successful SDM subscribings at the UDM; or a measurement for a number of failed SDM subscribings, wherein the measurement provides the number of failed SDM subscribings at the UDM.

4. The apparatus of claim 1, the processor circuitry to generate a subscriber data management related measurement for a subscription data notification, the subscription data notification to comprise a measurement for a number of subscription data notifications, wherein the measurement provides the number of subscription data notifications sent by the UDM.

5. The apparatus of claim 1, the processor circuitry to generate a subscriber data management related measurement for parameter provisioning related measurements, the parameter provisioning related measurements to comprise parameter creations, the parameter creations to comprise:

a measurement for a number of parameter creation requests, wherein the measurement provides the number of parameter creation requests received by the UDM;

a measurement for a number of successful parameter creations, wherein the measurement provides the number of successful parameter creations by the UDM; or a measurement for a number of failed parameter creations, wherein the measurement provides the number of failed parameter creations at the UDM.

6. The apparatus of claim 1, the processor circuitry to generate a subscriber data management related measurement for parameter updates, the parameter updates to comprise:

a measurement for a number of parameter update requests, wherein the measurement provides the number of parameter update requests received by the UDM;

a measurement for a number of successful parameter updates, wherein the measurement provides the number of successful parameter updates at the UDM; or a measurement for a number of failed parameter updates, wherein the measurement provides the number of failed parameter updates at the UDM.

7. The apparatus of claim 1, the processor circuitry to generate a subscriber data management related measurement for parameter deletion, the parameter deletion to comprise:

a measurement for a number of parameter deletion requests, wherein the measurement provides the number of parameter deletion requests received by the UDM;

a measurement for a number of successful parameter deletions, wherein the measurement provides the number of successful parameter deletions at the UDM; or a measurement for a number of failed parameter deletions, wherein the measurement provides the number of failed parameter deletions at the UDM.

8. The apparatus of claim 1, the processor circuitry to generate a subscriber data management related measurement for parameter getting, the parameter getting to comprise:

a measurement for a number of parameter getting requests, wherein the measurement provides the number of parameter getting requests received by the UDM;

a measurement for a number of successful parameter gettings, wherein the measurement provides the number of successful parameter gettings at the UDM; or a measurement for a number of failed parameter gettings, wherein the measurement provides the number of failed parameter gettings at the UDM.

9. The apparatus of claim 1, comprising a radio frequency (RF) interface configured to provide, to RF circuitry, data for transmitting a communication of the report based on the performance measurements.

10. The apparatus of claim 1, wherein the UDM manages subscription-related information for a subscriber associated with a user equipment (UE), the UDM to comprise an application front end (FE) and a uniform data repository (UDR) to store subscription data and policy data for the UDM.

11. An apparatus for a network management component of a fifth generation (5G) system (5GS), comprising:

a memory interface to send or receive, to or from a data storage device, one or more performance measurements related to one or more network functions supporting edge computing; and processor circuitry communicatively coupled to the memory interface, the processor circuitry to:

obtain raw measurements of network functions communicatively coupled to one another via service based management interfaces of the 5GS, wherein one of the network functions is a virtualized network function with a virtualized resource (VR);

generate performance measurements corresponding to one or more network functions based on the raw measurements, wherein the performance measurements are related to VR usage related measurements for the virtualized network function; and report the VR usage related measurements to a service consumer.

12. The apparatus of claim 11, wherein the VR is a virtual central processing unit (CPU), the processor circuitry to generate a VR usage related measurement for virtual CPU usage, the virtual CPU usage to comprise a measurement for a mean virtual CPU usage, wherein the measurement provides a mean usage of the virtual CPU for the virtualized network function.

13. The apparatus of claim 11, wherein the VR is a virtual memory, the processor circuitry to generate a VR usage related measurement for virtual memory usage, the virtual memory usage to comprise a measurement for a mean virtual memory usage, wherein the measurement provides a mean usage of the virtual memory for the virtualized network function.

14. The apparatus of claim 11, wherein the VR is a virtual disk, the processor circuitry to generate a VR usage related measurement for virtual disk usage, the virtual disk usage to comprise a measurement for a mean virtual disk usage, wherein the measurement provides a mean usage of the virtual disk for the virtualized network function.

15. The apparatus of claim 11, comprising a radio frequency (RF) interface configured to provide, to RF circuitry, data for transmitting a communication of the report based on the performance measurements.

16. The apparatus of claim 11, wherein the performance measurements are related to an edge application server (EAS) and the service consumer is an application service provider (ASP) to collect the EAS measurements to evaluate EAS performance.

17. An apparatus for a network management component of a fifth generation (5G) system (5GS), comprising:

a memory interface to send or receive, to or from a data storage device, one or more performance measurements related to one or more network functions supporting edge computing; and processor circuitry communicatively coupled to the memory interface, the processor circuitry to:

obtain raw measurements of network functions communicatively coupled to one another via service based management interfaces of the 5GS, wherein one of the network functions is performed by an edge application server (EAS) in an edge data network;

generate performance measurements corresponding to one or more network functions based on the raw measurements, wherein the performance measurements are related to connection data volume related measurements for the network function performed by the EAS; and report the connection data volume related measurements to a service consumer.

18. The apparatus of claim 17, the processor circuitry to generate a connection data volume related measurement for connection data volumes of a network function, the connection data volumes of a network function to comprise a measurement for a data volume of incoming bytes to the EAS, wherein the measurement provides a number of incoming bytes received by the EAS in the edge data network.

19. The apparatus of claim 17, the processor circuitry to generate a connection data volume related measurement for connection data volumes of a network function, the connection data volumes of a network function to comprise a measurement for a data volume of outgoing bytes to the EAS, wherein the measurement provides a number of outgoing bytes transmitted from the EAS in the edge data network.

20. The apparatus of claim 17, the processor circuitry to generate a connection data volume related measurement for connection data volumes of a network function, the connection data volumes of a network function to comprise a measurement for a data volume of incoming packets to the EAS, wherein the measurement provides a number of incoming packets received by the EAS in the edge data network.

* * * * *